(12) United States Patent
McAlpine et al.

(10) Patent No.: US 11,741,854 B2
(45) Date of Patent: Aug. 29, 2023

(54) 3D PRINTED ORGAN MODEL WITH INTEGRATED ELECTRONIC DEVICE

(71) Applicant: Regents of the University of Minnesota, Minneapolis, MN (US)

(72) Inventors: Michael Cary McAlpine, Minneapolis, MN (US); Kaiyan Qiu, Minneapolis, MN (US); Ghazaleh Haghiashtiani, Minneapolis, MN (US); Robert M. Sweet, Edina, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 1352 days.

(21) Appl. No.: 16/162,627

(22) Filed: Oct. 17, 2018

(65) Prior Publication Data
US 2019/0122584 A1 Apr. 25, 2019

Related U.S. Application Data

(60) Provisional application No. 62/573,558, filed on Oct. 17, 2017.

(51) Int. Cl.
| | |
|---|---|
| *G09B 23/30* | (2006.01) |
| *C09D 11/102* | (2014.01) |
| *C09D 11/107* | (2014.01) |
| *B33Y 10/00* | (2015.01) |
| *B33Y 70/00* | (2020.01) |
| *B33Y 80/00* | (2015.01) |

(Continued)

(52) U.S. Cl.
CPC ............ *G09B 23/30* (2013.01); *B29C 64/118* (2017.08); *B33Y 10/00* (2014.12); *B33Y 70/00* (2014.12); *B33Y 80/00* (2014.12); *C09D 11/102* (2013.01); *C09D 11/107* (2013.01); *C09D 11/30* (2013.01); *G09B 23/28* (2013.01); *B29L 2031/40* (2013.01)

(58) Field of Classification Search
CPC ....................................................... G09B 23/28
See application file for complete search history.

(56) References Cited

U.S. PATENT DOCUMENTS

| | | |
|---|---|---|
| 7,419,376 B2 | 9/2008 | Sarvazyan et al. |
| 8,480,407 B2 | 7/2013 | Campbell et al. |
| (Continued) | | |

OTHER PUBLICATIONS

Adams, Fabian, et al., "Soft 3D-printed phantom of the human kidney with collecting system", Ann. Biomed. Eng. 45, (2017), 963-972.

(Continued)

*Primary Examiner* — Ian A Rummel
(74) *Attorney, Agent, or Firm* — Schwegman Lundberg & Woessner, P.A.

(57) ABSTRACT

An organ model comprises a polymer body formed from one or more selectively deposited substructures of a printable polymer-based ink composition, wherein the one or more selectively deposited substructures form a printed geometrical structure that corresponds to at least a portion of an anatomical structure of an organ, wherein a formulation of the printable polymer-based ink is selected such that the printed geometrical body has one or more material properties that match or substantially match one or more corresponding tissue material properties of an organ tissue, and an electronic device integrated onto a surface or into a structure of the printed geometrical structure.

20 Claims, 56 Drawing Sheets

(51) Int. Cl.

| | |
|---|---|
| B29C 64/118 | (2017.01) |
| C09D 11/30 | (2014.01) |
| G09B 23/28 | (2006.01) |
| B29L 31/40 | (2006.01) |

(56) References Cited

U.S. PATENT DOCUMENTS

| | | | |
|---|---|---|---|
| 8,608,483 B2 | 12/2013 | Trotta et al. | |
| 2009/0061404 A1* | 3/2009 | Toly | G09B 23/285 434/262 |
| 2016/0218287 A1 | 7/2016 | Mcalpine et al. | |
| 2016/0319150 A1 | 11/2016 | Shepherd et al. | |
| 2017/0043533 A1* | 2/2017 | Chang | B01F 33/84 |

OTHER PUBLICATIONS

An, G., et al., "Accuracy and efficiency of computer-aided anatomical analysis using 3D visualization software based on semi-automated and automated segmentations", Ann. Anat., vol. 210, (Mar. 2017), 76-83.

Bouguet, Jean-Yves, "Camera Calibration Toolbox for Matlab", [online]. [archived Dec. 31, 2004]. Retrieved from the Internet: <URL: web/20041231190926/http://www.vision.caltech.edu/bouguetj/calib_doc/index.html>, (2004), 5 pgs.

Brock. K. K., et al., "Accuracy of finite element model-based multi-organ deformable image registration", Med. Phys., 32(6), (2005), 1647-1659.

Brown, Duane C., "Close-Range Camera Calibration", Photogrammetric Engineering, vol. 37, (1971), 855-866.

Bruno, Thomas J., et al., "CRC Handbook of Fundamental Spectroscopic Correlation Charts", (C) 2006, CRC Press, Boca Raton, FL, (2006), 223 pgs.

Cao, Rui, et al., "Tissue mimicking materials for the detection of prostate cancer using shear wave elastography: A validation study", Medical Physics, 40(2): 022903, (Feb. 2013), 9 pgs.

Dagdeviren, C., et al., "Conformal piezoelectric systems for clinical and experimental characterization of soft tissue biomechanics", Nat. Mater. 14(7), (2015), 728-736.

Dewall, Ryan J., et al., "Compression-Dependent Viscoelastic Behavior of Human Cervix Tissue", Ultrasonic Imaging, 32, (2010), 214-228.

Ebenstein, D. M., et al., "Nanoindentation of soft hydrated materials for application to vascular tissues", J. Biomed. Mater. Res. A 69A(Issue 2), (2004), 222-232.

Farooqi, Kanwal M., et al., "Blood Pool Segmentation Results in Superior Virtual Cardiac Models than Myocardial Segmentation for 3D Printi", Pediatr. Cardiol. 37, (2016), 1028-1036.

Fryer, John G., et al., "Lens Distortion for Close-Range Photogrammetry", Photogrammetric Engineering and Remote Sensing, 52(1), (Jan. 1986), 51-58.

Gomez-Ciriza, Gorka, et al., "Potential of 3D-printed models in planning structural interventional procedures", Interv. Cardiol. 7, (2015), 345-352.

Hassanipour-Azgomi, S., et al., "Incidence and mortality of prostate cancer and their relationship with the Human Development Index worldwide", Prostate Int., 4(3), (2015), 118-124.

He, M., et al., "A new family of functional biodegradable arginine-based polyester urea urethanes: synthesis, chracterization and biodegradation", Polymer, 54(15), (2013), 4112-4125.

Heikkila, J., et al., "Calibration procedure for short focal length off-the-shelf CCD cameras", Proceedings of the 13th International Conference on Pattern Recognition, (1996), 166-170.

Heikkila, Janne, et al., "A four-step camera calibration procedure with implicit image correction", Proceedings of IEEE Conference on Computer Vision and Pattern Recognition (CVPR), (1997), 7 pgs.

Holzapfel, G. A., et al., "A structural model for the viscoelastic behavior of arterial walls: continuum formulation and finite element analysis", Eur. J. Mech. A-Solid., 21, (2002), 441-463.

Huijing, P. A., et al., "Muscle as a collagen fiber reinforced composite: a review of force transmission in muscle and whole limb", J. Biomech. 32, (1999), 329-345.

Karademir, Ibrahim, et al., "Prostate volumes derived from MRI and volume-adjusted serum prostate-specific antigen: correlation with gleason score of prostate cancer", AJR. Am. J. Roentgenology, 201(5), (2013), 1041-1048.

Kim, Beomkeun, et al., "A Comparison Among Neo-Hookean Model, Mooney-Rivlin Model, and Ogden Model for Chloroprene Rubber", Int. J. Precis. Eng. Man. 13(5), (2012), 759-764.

Komai, Yoshinobu, et al., "Patient-specific 3-dimensional printed kidney designed for "4D" surgical navigation: a novel aid to facilitate minimally invasive off-clamp partial nephrectomy in complex tumor cases", Urology, vol. 91, (2016), 226-233.

Krouskop, T. A., et al., "Elastic Moduli of Breast and Prostate Tissues Under Compression", Ultrason. Imaging, 20, (1998), 260-274.

Kusaka, M., et al., "Initial experience with a tailor-made simulation and navigation program using a 3-D printer model of kidney transplantation surgery", Transplant. Proc., 47(3), (2015), 596-599.

Laufer, Shlomi, et al., "Fabric Force Sensors for the Clinical Breast Examination Simulator", HHS Public Access, Author Manuscript, published in final form as: Stud. Health Technol. Inform. 220, (2016), 193-198, (2016), 8 pgs.

Li, Pan, et al., "Biomaterial characteristics and application of silicone rubber and PVA hydrogels mimicked in organ groups for prostate brachytherapy", Journal of the Mechanical Behavior of Biomedical Materials, vol. 49, (2015), 220-234.

Lind, Johan U., et al., "Instrumented cardiac microphysiological devices via multimaterial three-dimensional printing", Nat. Mater. 16, (2017), 303-308.

Makary, Martin A., et al., "Medical error—the third leading cause of death in the US", BMJ 353, (2016), 5 pgs.

Mccurry, Matthew R., et al., "The sensitivity of biological finite element models to the resolution of surface geometry: a case study of crocodilian crania", PeerJ 3: e988, (2015).

Mcghee, John, "3-D visualization and animation technologies in anatomical imaging", J. Anat., 216, (2010), 264-270.

Mottl-Link, S., et al., "Physical Models Aiding in Complex Congenital Heart Surgery", Ann. Thorac. Surg., 86, (2008), 273-277.

Ogden, R., et al., "Large deformation isotropic elasticity—on the correlation of theory and experiment for incompressible rubberlike solids", Proc. R. Soc. A 326, (1972), 565-584.

Poniatowski, L. H., et al., "Validity and acceptability of a high-fidelity physical simulation model for training of laparoscopic pyeloplasty", J. Endourol., 28(4), (Apr. 2014), 393-398.

Qui, Kaiyan, et al., "3D Printed Organ Models with Physical Properties of Tissue and Integrated Sensors", HHS Public Access, Author Manuscript, published in final edited form as: Advanced Materials Technologies, 3(3): 1799235, (2018), 17 pgs.

Rengier, F., et al., "3D printing based on imaging data: review of medical applications", J. Comput. Assist. Radiol. Surg. 5, (2010), 335-341.

Robinson, Sanlin S., et al., "Integrated Soft Sensors and Elastomeric Actuators for Tactile Machines with Kinesthetic Sense", Extreme Mechanics, vol. 5. (Dec. 2015), 47-53, (2015), 16 pgs.

Schuster, G. A., et al., "The relative amount of epithelium, muscle, connective tissue and lumen in prostatic hyperplasia as a function of the mass of tissue resected", J. Urol., 161(4), (1999), 1168-1173.

Shui, W., et al., "The production of digital and printed resources from multiple modalities using visualization and three-dimensional printing techniques", Int. J. Comput. Assist. Radiol. Surg. 12, (2017), 13-23.

Sparks, J. L., et al., "Use of Silicone Materials to Simulate Tissue Biomechanics as Related to Deep Tissue Injury", Advances in Skin & Wound Care, (2015), 59-68.

Sun, J.-Y., et al., "Ionic skin", Adv. Mater. 26(45), (2014), 7608-7614.

Sweet, Robert M., et al., "The CREST simulation development process: training the next generation", J. Endourol. 31 (Suppl. 1), (2016), S-69-S-75.

Thiels, Cornelius A., et al., "Surgical never events and contributing human factors", Surgery 158(2), (2015), 515-521.

(56) References Cited

OTHER PUBLICATIONS

Truby, R. L., et al., "Printing soft matter in three dimensions", Nature, 540(7633), (2016), 371-378.

Von Rundstedt, Friedrich-Carl, et al., "Utility of patient-specific silicone renal models for planning and rehearsal of complex tumour resections prior to robot-assisted laparoscopic partial nephrectomy", BJU International, 119(4), (2016), 598-604.

Wake, N., et al., "Application of anatomically accurate, patient-specific 3D printed models from MRI data in urological oncology", Clin. Radiol. 71, (2016), 610-614.

Wells, Peter N. T., et al., "Medical ultrasound: imaging of soft tissue strain and elasticity", J. R. Soc. Interface 8, (2011), 1521-1549.

Xu, Lizhi, et al., "3D multifunctional integumentary membranes for spatiotemporal cardiac measurements and stimulation across the entire epicardium", Nat. Commun, 5(1): 3329, (2014), 1-10.

Zein, Nizar N., et al., "Three-dimensional print of a liver for preoperative planning in living donor liver transplantation", Liver Transpl. 19, (2013), 1304-1310.

Zhang, Man, et al., "Quantitative characterization of viscoelastic properties of human prostate correlated with histology", Ultrasound Med. Biol. 34(7), (2008), 1033-1042.

Zhang, Zhengyou, "Flexible Camera Calibration by Viewing a Plane from Unknown Orientations", Proc. 7th IEEE Int. Conf. Computer Vision, (1999), 666-673.

Zysset, Philippe K., et al., "Elastic modulus and hardness of cortical and trabecular bone lamellae measured by nanoindentation in the human femur", J. Biomech., 32(10), (1999), 1005-1012.

\* cited by examiner

3D PRINTED ORGAN MODEL WITH INTEGRATED ELECTRONIC DEVICE

CROSS-REFERENCE TO RELATED APPLICATION

This patent application claims the benefit of priority to U.S. Provisional Application Ser. No. 62/573,558, entitled "3D PRINTED ORGAN MODEL," filed Oct. 17, 2017, which is incorporated by reference herein in its entirety.

STATEMENT REGARDING FEDERALLY SPONSORED RESEARCH OR DEVELOPMENT

This invention was made with Government support under 1DP2EB020537 awarded by National Institutes of Health. The government has certain rights in the invention.

BACKGROUND

In recent years, preoperative planning and rehearsal has become a more important part of the overall treatment procedure performed by surgeons and other surgical personnel. One reason for this is so that the surgeons and surgical personnel can maximize their effectiveness performing the procedure in question and also to minimize errors, and in particular to minimize errors that result in negative patient outcomes. A 2016 study found that medical errors are the third leading cause of death in the United States. In addition, over 4,000 of so-called "never event" surgical mistakes occur annually—referred to as "never events" because they are mistakes that "should never happen" (including performing the wrong surgical procedure, performing the procedure on the wrong patient or on the wrong part of the patient's body, leaving a foreign object in the patient, etc.). Although the complete elimination of errors in clinical procedures is impossible, effective preoperative planning and rehearsal can play an important role in decreasing their occurrence.

SUMMARY

The present disclosure describes methods for producing customizable tissue-like materials as well as organ model systems that are formed from those methods. The resulting organ models can exhibit a high fidelity to the physical properties of the organ or other tissues for which the organ models are designed to simulate. In some examples, the systems and methods described herein result in patient-specific organ models with a high degree of fidelity to a particular patient's organ or other tissue being simulated. The present disclosure also describes 3D printing methods and systems that are able to produce the organ models described herein. The present disclosure further describes one or more integrated electronic devices that can be produced in conjunction with the customized organ models in order to provide the ability to evaluate performance of surgical tasks on the organ model.

In an example, the present disclosure describes an organ model comprising a polymer body formed from one or more selectively deposited substructures of a printable polymer-based ink composition, wherein the one or more selectively deposited substructures form a printed geometrical structure that corresponds to at least a portion of an anatomical structure of an organ, wherein a formulation of the printable polymer-based ink is selected such that the printed geometrical body has one or more material properties that match or substantially match one or more tissue material properties corresponding to those of an organ tissue; and an electronic device integrated onto a surface or into a structure of the printed geometrical structure.

In another example, the present disclosure describes a method of producing an organ model configured to simulate an organ, the method comprising: determining one or more tissue material properties of a tissue of the organ; formulating a printable polymer-based ink composition; selectively depositing the printable polymer-based ink composition into a printed geometrical structure, wherein the printed geometrical structure corresponds to at least a portion of an anatomical structure of the organ; after the selectively depositing, solidifying the polymer-based ink composition to form a solid or substantially solid polymer body, wherein the polymer body has one or more corresponding material properties; and integrating an electronic device onto a surface or into a structure of the polymer body. The formulating of the printable polymer-based ink composition includes selecting a formulation such that when the printable polymer-based ink composition is selectively deposited and solidified, the one or more corresponding material properties match or substantially match the one or more tissue material properties.

The design and development of the novel methodologies and systems described herein for producing customized materials in order to fabricate patient-specific 3D printed organ models exhibiting the physical properties of the organ or other tissue being simulated including, in some examples, the sensing capabilities described herein, can yield substantial improvements in surgical preparation aids that can be used by surgeons and other surgical personnel for more effective preoperative planning and rehearsal than can be achieved by existing imaging technology and existing organ-simulation structures.

This summary is intended to provide an overview of subject matter of the present disclosure. It is not intended to provide an exclusive or exhaustive explanation of the invention. The detailed description is included to provide further information about the present disclosure.

BRIEF DESCRIPTION OF THE FIGURES

The drawings illustrate generally, by way of example, but not by way of limitation, various embodiments discussed in the present document.

DETAILED DESCRIPTION

Figure 1A:
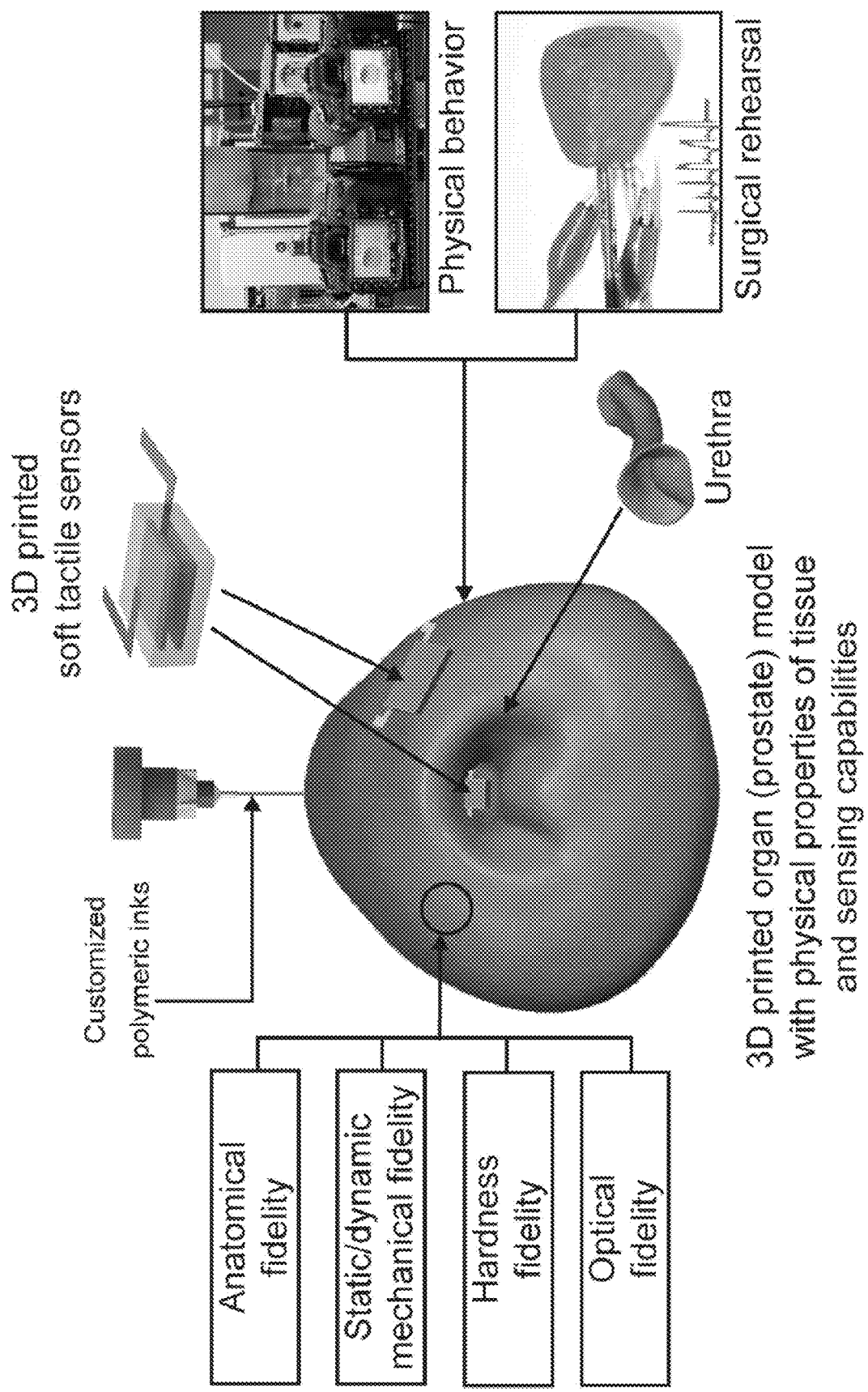
FIG. 1A is a conceptual schematic diagram of an overall method for producing a high-fidelity organ model, such as the example of a human prostate model that is shown in FIG. 1A, in accordance with various embodiments of the present disclosure.
Figure 1B:
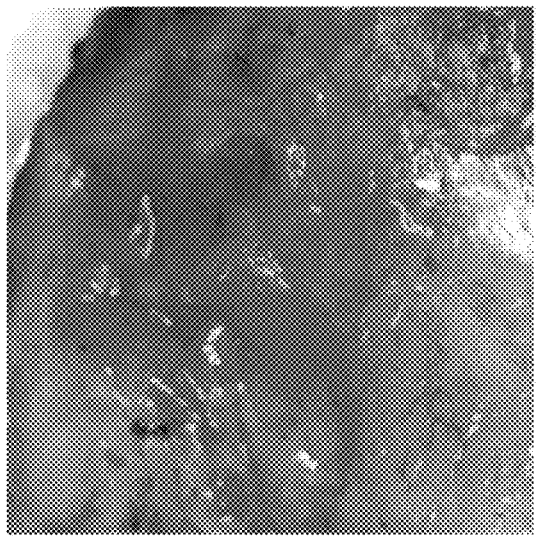
FIG. 1B includes photographs of various material property tests that can be performed on actual tissue, such as actual human prostate tissue, to determine a specified set of materials in order to guide formulation of a printable polymeric ink for 3D printing of the organ model material, including static and dynamic mechanical tests, one or more hardness tests, and one or more optical tests, in accordance with various embodiments of the present disclosure.
Figure 1B:
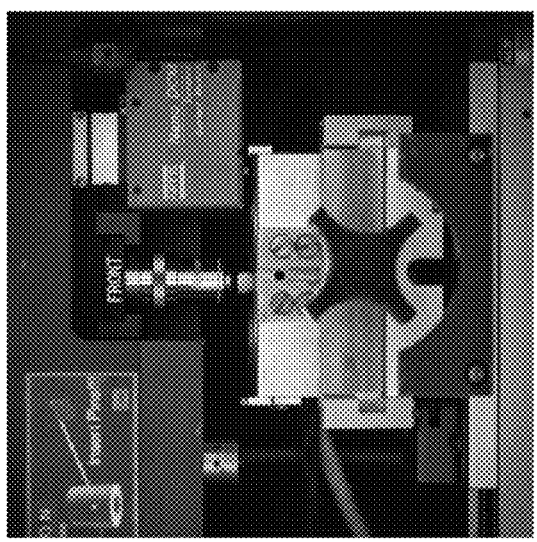
Figure 1B:
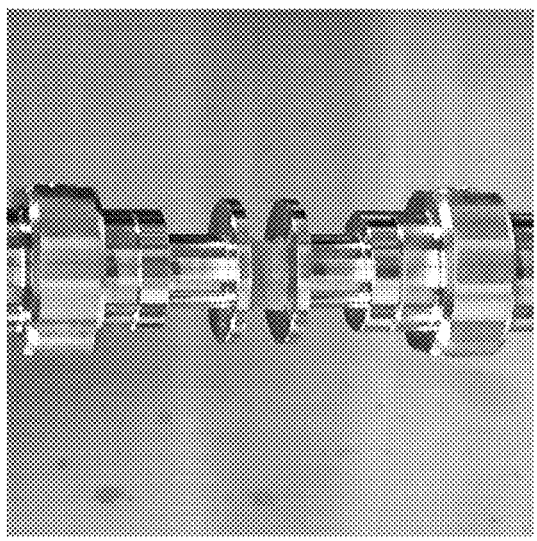

The following detailed description includes references to the accompanying drawings, which form a part of the detailed description. The drawings show, by way of illustration, specific embodiments of systems and methods of producing a three-dimensional ("3D") printed model for an organ or other tissue, and specific embodiments of tissue or organ models that result therefrom. These models are referred to herein as "organ models" for simplicity. However, those of skill in the art will understand that the concepts described herein with respect to an "organ model" can be used to form a model structure that simulates or mimics a tissue structure that may or may not be considered an "organ" in the medical sense of the word. In other words, an "organ model," as described herein, can refer to a model structure with a geometry that corresponds to all or part of a tissue structure that is medically recognized as an "organ," as with the specific example of a prostate model described in more detail below. But, the term "organ model" can also refer to a model structure corresponding to a more amorphous anatomical structure that would not medically be considered an "organ," such as connective tissue structures, supporting tissue structures, other tissue structure types, or a model structure that corresponds to only a portion of an organ.

These embodiments, which are also referred to herein as "examples," are described in enough detail to enable those skilled in the art to practice the concepts described herein. The example embodiments may be combined, other embodiments may be utilized, or structural or logical changes may be made without departing from the scope of the present disclosure.

It is to be understood that the phraseology or terminology employed herein, and not otherwise defined, is for the purpose of description only and not of limitation. Any use of section headings is intended to aid reading of the document and is not to be interpreted as limiting, and information that is relevant to a section heading may occur within or outside of that particular section. While the disclosed subject matter will be described in conjunction with the enumerated claims, it will be understood that the exemplified subject matter is not intended to limit the claims to the disclosed subject matter. The following detailed description is, therefore, not to be taken in a limiting sense, and the scope of the present invention is defined by the appended claims and their equivalents.

References in the specification to "one embodiment", "an embodiment," "an example embodiment," "an example," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In this document, the terms "a," "an," or "the" are used to include one or more than one unless the context clearly dictates otherwise. The term "or" is used to refer to a nonexclusive "or" unless otherwise indicated. Unless indicated otherwise, the statement "at least one of" when referring to a listed group is used to mean one or any combination of two or more of the members of the group. For example, the statement "at least one of A, B, and C" can have the same meaning as "A; B; C; A and B; A and C; B and C; or A, B, and C," or the statement "at least one of D, E, F, and G" can have the same meaning as "D; E; F; G; D and E; D and F; D and G; E and F; E and G: F and G; D, E, and F; D, E, and G; D, F, and G; E, F, and G; or D, E, F, and G." A comma can be used as a delimiter or digit group separator to the left or right of a decimal mark; for example, "0.000,1"" is equivalent to "0.0001."

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In the methods described herein, the acts can be carried out in any order without departing from the principles of the disclosed method, except when a temporal or operational sequence is explicitly recited. Furthermore, specified acts can be carried out concurrently unless explicit language recites that they be carried out separately. For example, a recited act of doing X and a recited act of doing Y can be conducted simultaneously within a single operation, and the resulting process will fall within the literal scope of the process. Recitation in a claim to the effect that first a step is performed, then several other steps are subsequently performed, shall be taken to mean that the first step is performed before any of the other steps, but the other steps can be performed in any suitable sequence, unless a sequence is further recited within the other steps. For example, a disclosed or claimed method that recites "Step A, Step B, Step C, Step D, and Step E" can be conducted with Step A first and with Steps B, C, D, and E being carried out in any sequence after (or concurrent with) Step A, and the resulting process will fall within the literal scope of the method. Furthermore, specified steps can be carried out concurrently unless explicit claim language recites that they be carried out separately. For example, separately recited or claimed Steps X and Y can be conducted simultaneously within a single operation, and the resulting process will fall within the literal scope of the process. A given step or sub-set of steps may also be repeated.

The term "about" as used herein can allow for a degree of variability in a value or range, for example, within 10%, within 5%, within 1%, within 0.5%, within 0.1%, within 0.05%, within 0.01%, within 0.005%, or within 0.001% of a stated value or of a stated limit of a range, and includes the exact stated value or range.

The term "substantially" as used herein refers to a majority of, or mostly, such as at least about 50%, 60%, 70%, 80%, 90%, 95%, 96%, 97%, 98%, 99%, 99.5%, 99.9%, 99.99%, or at least about 99.999% or more, or 100%.

All publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

The present disclosure describes examples of models that can be used to simulate tissues, such as soft tissues, for example to simulate one or more specific organs and/or tissues associated with the one or more organs, which will be referred to hereinafter as "organ models" for brevity. The example organ models described herein can be formed by 3D printing of one or more customizable printable polymeric inks that can be formulated so that the resulting organ model will have a high degree of fidelity to the actual biological tissue that it is simulating, including a high degree of fidelity with respect to one or more physical properties and one or more optical properties. As used herein, the phrase "high degree of fidelity" with respect to a specific material property, as well as other terms or phrases that compare the organ model to the organ or tissue that it is simulating, refers to the specified material property of the organ model material being within a specified threshold of the same material property for the actual biological tissue (i.e., a Young's modulus of an example human prostate model can be considered to have a high degree of fidelity if it is measured at a value that is within a specified threshold of the Young's modulus measured on an actual sample of human prostate tissue). In some examples, the organ model is considered to have a high degree of fidelity if two or more of a specified set of material properties are each within a specified threshold of values measured in counterpart biological tissues, such as three or more material properties, four or more material properties, and so on. In some examples, the specified threshold can be satisfied if the difference between the value of the material property measured for the actual biological tissue and that measured for the organ model is 20% or less, such as 15% or less, for example 14% or less, 13% or less, 12% or less, 11% or less, 10% or less, 9% or less, 8% or less, 7.5% or less, 7% or less, 6% or less, 5% or less, 4% or less, 3% or less, 2.5% or less, 2% or less, 1% or less, 0.9% or less, 0.8% or less, 0.7% or less, 0.6% or less, 0.5% or less, 0.4% or less, 0.4% or less, 0.2% or less, or 0.1% or less.

The present disclosure also describes systems and methods of forming the tissue or organ model, including systems and/or methods for producing one or more customizable printable polymeric inks, formulating the one or more customizable printable polymeric inks, and 3D printing the one or more customizable printable polymeric inks to form the organ model. The present inventors have found that the systems and methods described herein, as well as the resulting organ models formed thereby, can address the above-mentioned limitations on existing methods and commercially-available organ models. For example, the organ models described herein can be formed with physical properties that closely match those of the native tissue that they are simulating (as demonstrated via the formation of an example human prostate model that has a high degree of fidelity to at least some of the physical properties of human prostate tissue). The organ models described herein can also include integrated sensing capabilities that can be used for advanced surgical aid applications.

The Figures show various aspects of methods and systems for producing an organ model, and in some examples for producing a customized organ model with one or more structures that are specific to a particular patient. The discussion of the Figures will focus on describing a specific example of organ model and on specific systems and methods of producing that specific human organ model. The specific example organ model described herein is a model of the human prostate, which was chosen as a proof-of-principle organ model due to its relatively simple geometry. Also, surgical procedures performed on the human prostate are known to have inherent risks for damaging the urethral sphincter and neurovascular bundle (NVB) during prostate removal, and therefore, proper preoperative planning and rehearsal via a 3D printed prostate model may have implications for surgical outcomes in millions of patients worldwide. Therefore, the term "prostate model" may be used interchangeably herein with the term "organ model." Those of skill in the art will appreciate, however, that the concepts described herein are not limited to the development and production of prostate models, but rather can be used to form a model for the simulation of virtually any type of tissue including, but not limited to, fat, connective tissue, nerve, artery, vein, muscle, tendon, ligaments, renal artery tissue, kidney tissue, ureter tissue, bladder tissue, prostate tissue, urethra tissue, bleeding aorta tissue, airway tissue, tongue tissue, hand tissue, general skin tissue, specific face skin tissue, eye tissue, brain tissue, vaginal wall tissue, breast tissue, nasal tissue, cartilage, colon tissue, stomach tissue, liver tissue, rectal tissue, heart tissue, bowel tissue, pancreas tissue, gallbladder tissue, liver tissue, inferior vena cava tissue, aortic tissue, lung tissue, bronchial tissue, soft palate tissue, larynx tissue, pharynx tissue, epidermis tissue, dermis tissue, lip tissue, mucosal membrane tissue, or adhesion tissue, to name just a few.

System and Method of Producing a Printed Organ Model

FIG. 1A shows an overview of the concepts involved with producing an example organ model described herein in the context of the specific prostate model. FIG. 1A also shows two examples of surgical aid procedures for which an organ model produced by the overall method can be used: organ physical behavior prediction and quantitative surgical rehearsal.

In an example, a method of developing an organ model such as the prostate model shown in FIG. 1 includes one or more of the following steps: (a) collecting and analyzing the anatomical structure of the organ and/or tissues to be simulated by the organ model, i.e., analysis of the anatomical structure of the prostate that the prostate model is simulating; (b) determining one or more material properties of the organ tissue, i.e., the prostate tissue, which can include one or more of: one or more static mechanical properties; one or more dynamic mechanical properties; hardness; and optical reflection (FIG. 1B shows examples of material property tests that can be performed on the tissue and equipment that can be used to perform the material property testing); (c) formulating one or more customizable compositions based on the one or more material properties determined in step (b); and (d) forming the organ model from the one or more customizable compositions into a three dimensional geometry that matches or substantially matches at least a portion of the anatomical structure of the organ or other tissues, such as by 3D printing the one or more compositions into the three dimensional geometry that matches or substantially matches the anatomical structure of the prostate. Because the primary method contemplated by the present inventors for forming the organ model is via 3D printing, the customizable compositions will also be referred to herein as "customizable printable compositions" (or simply as "printable compositions") or as "customizable printable inks" (or simply "inks").

In some examples, the step of determining the one or more material properties of the organ tissue can include determining one or more of: one or more mechanical properties (such as one or more static mechanical properties; one or more dynamic mechanical properties, one or more viscoelastic properties, one or more nanoindentive properties, strain rate insensitivity, compressibility, stress-strain curves, Young's modulus, yield stress, tear point, deformability, hardness, and the like); one or more optical properties (such as optical reflection); one or more electroconductive properties; one or more thermoconductive properties; one or more chemical properties; and one or more anisotropic properties. Some examples of specific properties that can be determined for the organ being simulated are described in more detail below, including Young's modulus, stress-strain relationship curves, storage modulus, loss modulus, hardness, and light reflection intensity. Further details of some other examples of material properties that may be determined from the organ or tissue being simulated (and thus that can be matched or substantially matched by the final polymer material that is used to form the organ model) are described in U.S. patent application Ser. No. 13/630,715, filed on Sep. 28, 2012, entitled "SIMULATED, REPRESENTATIVE HIGH-FIDELITY ORGANOSILICATE TISSUE MODELS," which was published as U.S. Publication No. 2013/0085736 A1 on Aug. 4, 2013, the disclosure of which is incorporated by reference herein in its entirety.

In some examples, after printing, the printable ink forms a polymeric material to form at least a portion of the organ model. This resulting polymeric material will be referred to herein as the "printed polymer" or the "final printed polymer" to distinguish it from the composition of the printable ink. For brevity, the customizable printable composition (e.g., the printable ink composition) that forms at least a portion of the organ model may also be referred to as a "customizable polymeric ink," a "printable polymeric ink," "polymeric ink," or simply as "printable ink" or just "ink." In some examples, described in more detail below, the printable ink comprises a formulation of one or more precursor compounds or agents that undergo a chemical or physical transformation after being printed in order to form the final printed polymer that makes up at least a portion of the structure of the organ model. The term "precursor," as used herein to refer to the one or more compounds or agents in the printable ink, is not limited to monomer or oligomer compounds that are later polymerized to form the final polymer structure, as may be suggested by the term "precursor," but can also include compositions where the primary structural molecules are fully-formed (that is, fully or substantially fully polymerized compounds) in the printable ink and are converted to the final polymer material via curing, such as crosslinking with one or more crosslinking agents. After printing, the chemical or physical transformation of the precursor compounds converts the printed ink into the final printed polymer of the organ model.

While the remainder of the present disclosure will focus on concepts related to 3D printing of one or more printable ink compositions, those of skill in the art will appreciate that formulations of the inks described herein may be used with other forming techniques in order to form at least a portion of the organ model, such as via other liquid-based manufacturing processes including, but not limited to: molding, casting, coating (e.g., spin coating, spray coating, dip coating, roll-to-roll coating, etc.), full part extrusion, or composite formation (i.e., as a component of a laminate structure or as the polymer matrix portion of a reinforced polymer composite such as a fiber-reinforced polymer composite).

The method can also include (e) evaluating the use of the organ model as a surgical aid and, in some examples, (f) modifying the formulation of the one or more customizable printable inks based on the evaluation in step (e) in order to improve fidelity of the organ model for the use as the surgical aid, and (g) forming a replacement organ model with the one or more modified printable ink formulations. In some examples, the step of evaluating the organ model for use as a surgical aid (step (e)) includes evaluating the use of the organ model for the purpose of quantitative prediction of organ physical behavior, which can include, in some examples, comparing the physical behavior of the organ model with that of one or more corresponding finite elemental method (FEM) simulations. In some examples, the step of evaluating the organ model for use as a surgical aid (step (e)) includes applying one or more tools to the organ model (such as one or more diagnostics tools or one or more surgical tools) and measuring or otherwise evaluating the response of the organ model to the application of the one or more tools.

In some examples, the method also includes (h) integrating one or more electronic devices (such as one or more of a sensor, an actuator, or an energy harvesting device) onto or into one or more surfaces of the organ model or onto or into an interior of the organ model, or both. In some examples, one or more sensors are integrated into or onto the organ model to measure or evaluate a response by the organ model during a step of evaluating the organ model for use as a surgical aid (i.e., in step (e)).

In some examples, the step of formulating the one or more customizable printable inks (step (c)) can include analyzing one or more properties related to printability of the specific printable inks formulated, which can include viscosity of the one or more printable inks, density of the printable ink, or whether the formulation results in an ink that is Newtonian or non-Newtonian (e.g., shear-thickening or shear-thinning). Formulating the one or more customizable printable inks (step (c)) can also include analyzing the printed material that is formed from the one or more printable ink formulations to compare the printed material to the material properties of the organ tissue that was analyzed and determined in step (b). If one or more specified material properties of the printed material are outside of a specified threshold away from the one or more specified material properties of the organ tissue, then the step of formulating the one or more printable inks (step (c)) can include reformulating the one or more printable inks by adjusting one or more components within the ink formulation (such as by changing one or more of the components to an alternative compound or composition or changing the relative amount of one or more of the components in the ink formulation).

As mentioned above, a goal of the step of formulating the one or more customizable printable inks (step (c)) can be to adequately mimic the organ tissue or other tissues being simulated by the organ model, i.e., to mimic patient prostate tissue in the case of the prostate model. Factors that can be important in the formulation of a printable ink include, but are not limited to: the ability to adjust the formulation in order to adjust the final properties that the resulting material exhibits; good printability; the ability to maintain stable three-dimensional structures and stable properties during and after printing; the ability to be set (i.e., further polymerized or crosslinked to produce a more stable and durable material), preferably at a temperature that is at or very close to room temperature (e.g., about 20° C. (about 68° F.) to about 25° C. (about 77° F.), such as about 22° C. (about 72° F.)); and convenient preparation (e.g., without the need for highly specialized equipment).

Customizable Printable Ink Composition

Figure 2A:
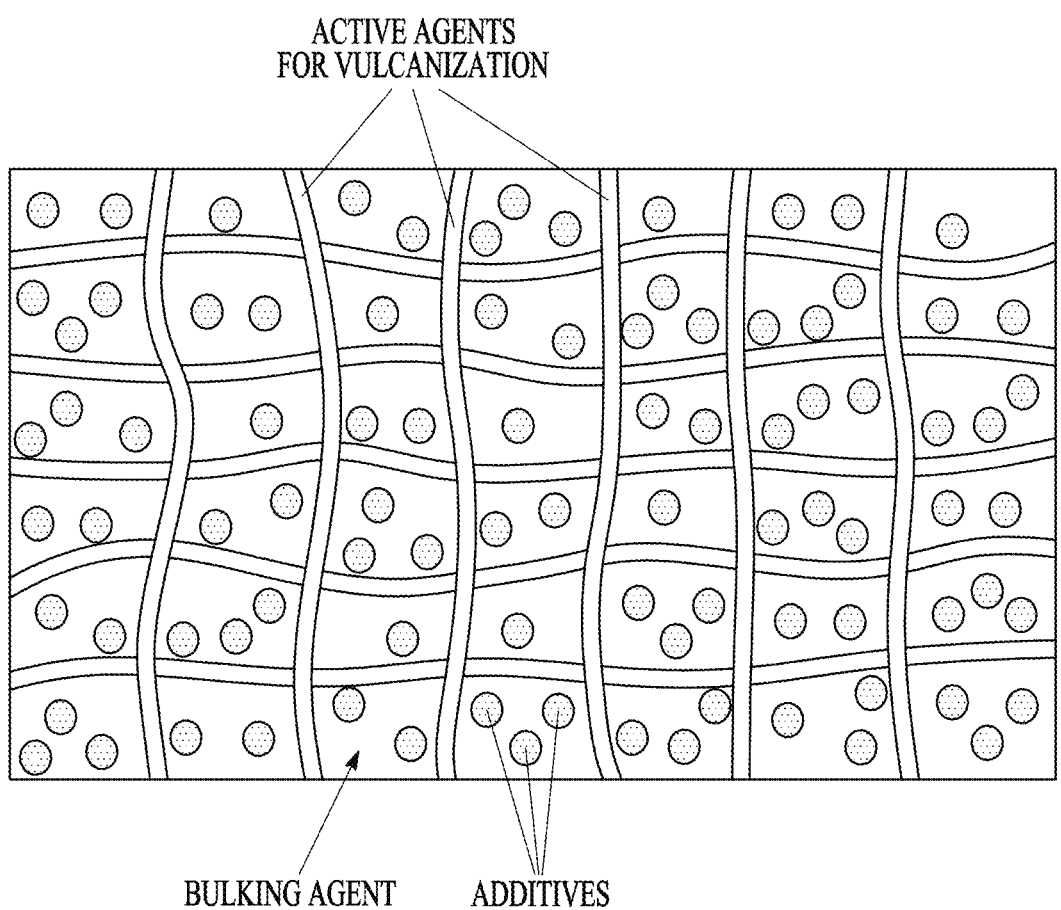
FIG. 2A is a conceptual schematic diagram of an example customizable printable polymeric ink that can be used for 3D printing of the organ models, such as in the method shown in FIG. 1A, in accordance with various embodiments of the present disclosure.

The present inventors have developed a customizable printable ink that can achieve one or more of these factors, and in some examples that can achieve all of these factors in the same composition. In an example, this customizable printable ink comprises a general composition of three primary components, shown conceptually in FIG. 2A: (1) an active agent that is able to be set under controllable conditions, (2) a bulking agent that modifies properties of the printed material formed from the printable ink, including by improving softness (e.g., reducing hardness) or improving flexibility, or both; and (3) one or more additives to adjust one or more properties of the material that results from after 3D printing the printable ink, such as one or more additives to modify a color of the printed material or to modify printability properties of the printable ink (i.e., to modify viscosity, sag, etc.). In some examples, the composite nature of the general composition of the printable ink is analogous to human tissue.

As used herein, the term "set" or "the ability to be set" (or similar terms), when referring to the ink generally and to the active agent of the ink more specifically, refers to the active agent undergoing a physical or chemical change after printing resulting in one or more of: the ink becoming more dense, the ink becoming harder, the active agent forming or joining molecules with an increased number average molecular weight (e.g., further polymerization of the active agent), or cross-linking between molecules of the active agent or between the active agent and one or more other compounds within the ink. The concept of "setting" a polymer will be understood by those in the art of polymers and polymerization.

In some examples, the printable ink is a viscous, paste-like composition that can be fed to and extruded from a printer nozzle of an extrusion-type 3D printer as a printed bead of the ink. After printing, one or more components of the ink composition (e.g., the one or more active agents) undergo chemical reaction or a physical change to form the final polymeric material of the organ model (such as cross-linking reactions between molecules of the active agent) or a physical conversion into the final form of the final polymeric material of the organ model. In this way, the method of printing the printable ink is similar to polymer extrusion 3D printing, such as fused deposition modeling ("FDM") or fused filament fabrication ("FFF") printing (except that extrusion printing of the customizable printable inks described herein does not require extrusion of a fully formed (that is, fully or nearly fully polymerized or fully or nearly fully set) polymer in its molten state and is then allowed to cool to form the final solidified part, as is typical with FDM-type printing, but rather can include compositions wherein the one or more active agents include a prepolymer or precursor compound that undergoes a chemical or physical transformation after being printed to form the final polymer, although some examples of customizable printable ink could be formulated as a meltable polymer) or to so-called "robocasting" type 3D printing.

Figure 2B:
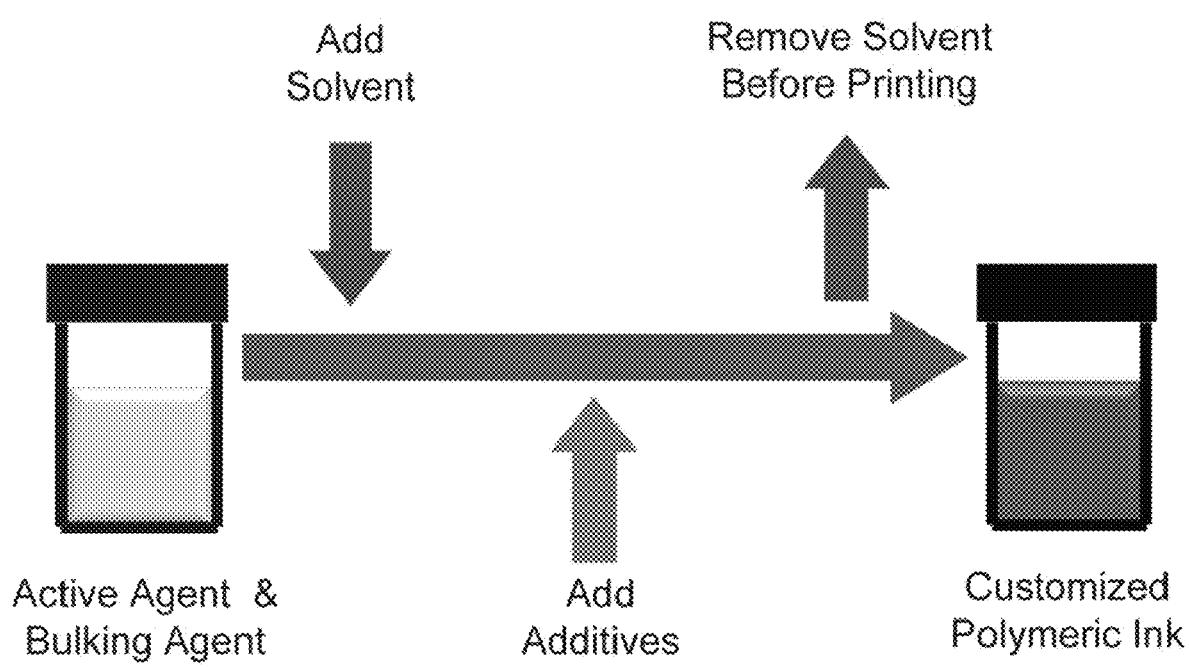
FIG. 2B is a schematic flow diagram of an example method of producing a customizable printable polymeric ink, such as the example printable polymeric ink of FIG. 2A, in accordance with various embodiments of the present disclosure.

To ensure clarity, the present disclosure will use the following terms to describe the material that will become the final printed polymeric material (or one of the plurality of polymeric materials) that form at least a portion of the organ model: the term "printable ink" refers to the ink formulation that has yet to be printed (e.g., the ink formulation in a storage of feed container such as that shown on the right of FIG. 2B); the terms "printed ink" "printed bead," and the like refer to ink that has been printed (e.g., extruded from a printing nozzle of a 3D printer) into a printed substructure (e.g., a bead or droplet "pixel"), but that has not undergone the chemical or physical transformation to form the final polymeric material or where only a small or insubstantial portion of the components of the printed ink has undergone the chemical or physical transformation so that the printed ink is still in a liquid, semi-liquid, or paste-like state; and the terms "final printed polymer" or "final polymer" refer to the polymeric material after at least a majority of the components of the ink has undergone the chemical or physical transformation to the final polymeric material, and preferably where all or substantially all of the components of the ink have undergone the chemical or physical transformation to the final polymeric material.

In some examples, the "active agent" can comprise two or more separate compounds, such as one or more primary compounds that will form the main physical structure of the printable ink and of the final polymer of the organ model and one or more crosslinking agents that can crosslink the one or more primary compounds to form a larger molecular structure. The one or more crosslinking agents begin reacting and crosslinking between the one or more primary compounds when a triggering condition occurs. The triggering condition can include, but is not limited to, one or more of: a specified amount of a solvent evaporating away from the printed ink (e.g., a concentration or weight percentage of the solvent falling below a threshold value), which in turn results in sufficient chemical contact of the active agent for crosslinking to occur to a sufficient enough degree that a matrix is formed; the printed ink being heated or cooled to a specified temperature that initiates crosslinking; exposure to light or another energy source that triggers a crosslinking initiation reaction; exposure to air, where one or more components of the air triggers a crosslinking initiation reaction (typically either water vapor in the air or oxygen gas ($O_2$) in the air). The one or more crosslinking agents can be in the form of reactive side chains or branches off of a main structure of one or more primary compounds or they can be in the form of separate molecules that react with two or more molecules of the one or more primary compounds to form the cross-linked network of the final polymer.

In an example, the active agent is a silicone-based material, such as a silicone sealant. In some examples, the active agent is a silicon-based material that is crosslinkable, e.g., that has been modified for crosslinking between primary silicone molecules. In an example, the active agent comprises a silicone-based composition that is able to be crosslinked at or around room temperature. A non-limiting example of a commercially available silicone-based material that can be used as the active agent is the silicone sealant sold under the trade name LOCTITE SI 595 (also referred to as LOCTITE SI 595 CL or LOCTITE SUPERFLEX CLEAR RTV Silicone Adhesive/Sealant) by the Henkel Corp., Rocky Hill, Conn., USA. Other types of materials that can be used as the active agent include, but are not limited to: polymer compounds with different functional groups (such as polyurethane or polyurethane based compositions, polyvinyl chloride or polyvinyl chloride-based polymer compositions, polyvinyl alcohol or polyvinyl alcohol-based polymer compositions, nylon or nylon-based compositions, polytetrafluoroethylene (PTFE) or polytetrafluoroethylene-based polymer compositions, or hydrogel compositions) or those with different molecular weights.

In an example, the bulking agent comprises a compound that modifies one or more physical properties of the printable ink or of the final printed polymer, or both. In some examples, the bulking agent increases an overall volume of one or both of the printable ink or the final printed polymer compared to the volume that the ink or the final polymer would have in a comparable composition that does not include the bulking agent. In some examples, the bulking agent can also improve one or more viscoelastic properties—such as by increasing flexibility, reducing the Young's modulus, or reducing hardness—of the printable ink or of the final printed polymer, or both. In an example, the bulking agent is a silicone-based material, because it offers good compatibility with the silicone-based material of the active agent, such as a silicone grease or other relatively viscous or thick silicone-based composition. A non-limiting example of a commercially-available material that can be used as the bulking agent is the silicone lubricant sold under the trade name LP20 Silicone Grease by the Trident Diving Equipment, Chatsworth, Calif., USA. Silicone-based materials were selected for some examples because they typically exhibit one or more of: shear thinning behavior; resistance to polymer creep before setting (e.g., before crosslinking, vulcanization, or further polymerization); and acceptable elasticity after setting (e.g., after being crosslinked, vulcanized, or further polymerized). However, materials other than silicone-based materials can be used for the bulking agent, including, but not limited to cellulose or starch.

In some examples, formulating the printable ink includes mixing the active agent and the bulking agent in a specified weight ratio, for example in a mixing container such as the container shown on the left side of FIG. 2B. In an example, described in more detail below, the specified weight ratio is selected so that when the ink is printed and allowed to solidify, the resulting material will have one or more material properties that match or substantially match corresponding material properties of the tissue of the organ that the material is intended to simulate.

Next, as shown in FIG. 2B, a solvent is added to the mixture of the active agent and the bulking agent. The solvent that is added to the mixture is a solvent that is capable of at least partially dissolving the active agent and the bulking agent to form a solution of the active agent and the bulking agent (also referred to as the "active/bulking agent solution"). In some examples, the solvent is also capable of at least partially dissolving the additives that are also to be added to the printable ink. A non-limiting example of a solvent that can be used to formulate the printable ink is dichloromethane (DCM). After the solvent is added to the mixture of the active agent and the bulking agent to form the active/bulking agent solution, the method of formulating the printable ink can include adding one or more additives to the active/bulking agent solution to form a solution or mixture that includes the active agent, the bulking agent, and the one or more additives (also referred to herein as the "pre-ink solution"). In some examples, at least a portion of the solvent is then removed from the pre-ink solution to provide a ready-to-print customizable ink, as shown in FIG. 2B.

Figure 2C:
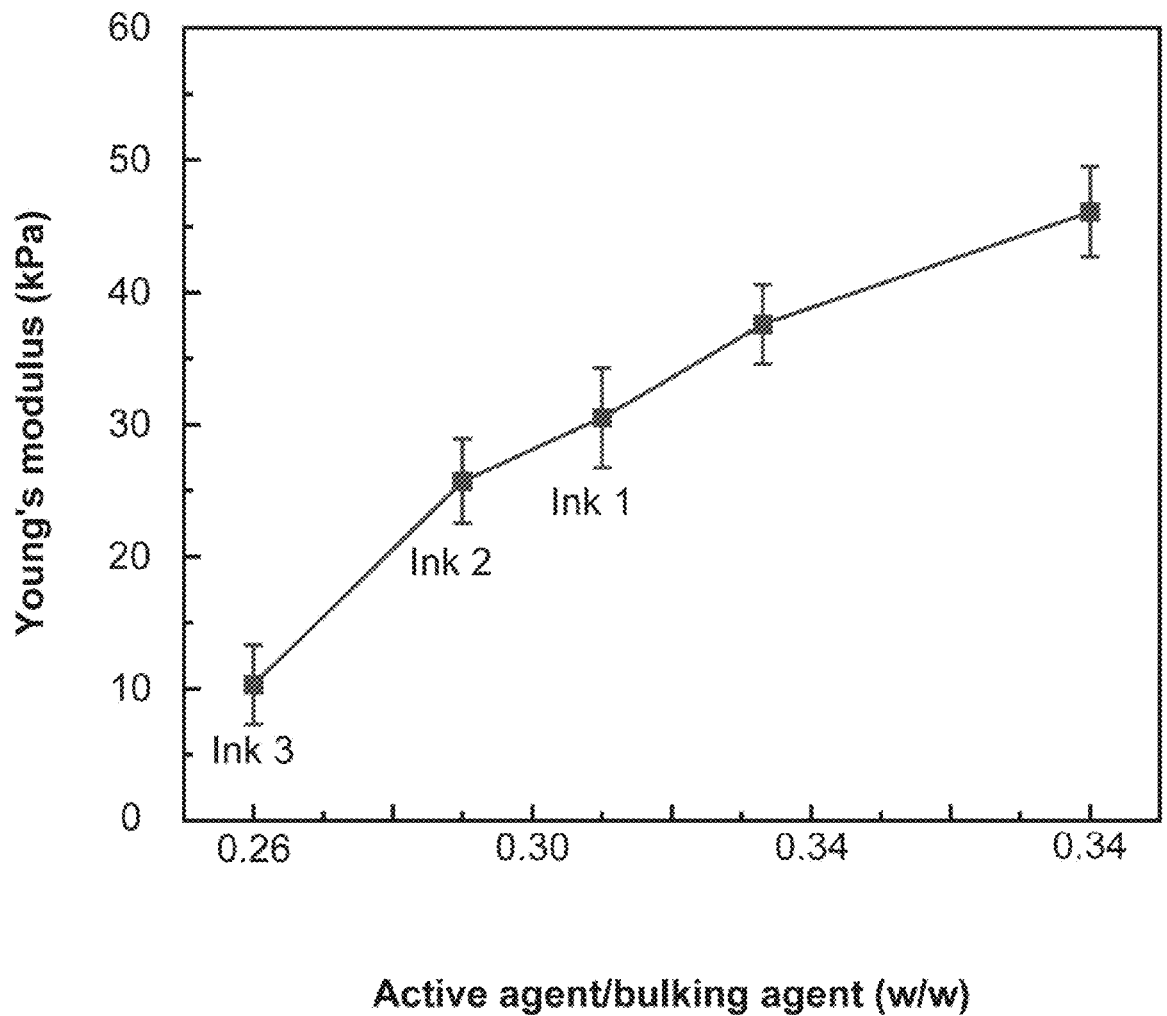
FIG. 2C is a graph of the Young's modulus for the final printed polymer having various weight ratios of a primary reactive component (also referred to as "the active agent") relative to a bulking agent in the formulation of the customizable printable polymeric ink of FIG. 2A, in accordance with various embodiments of the present disclosure.

In some examples, the step of formulating the printable ink (step (c)) includes adjusting a ratio (such as a weight/weight ratio) of the primary components in a particular printable ink formulation, and in particular by adjusting a ratio of the active agent relative to the bulking agent, in order to achieve a value for one or more specified material properties in the final printed material that is within a specified range (which, in turn, can be based on a value of the same physical property measured for the specific organ or tissue being simulated). Printability of the printable ink can be optimized, and other properties of the printable inks and the resulting final printed polymer materials can be tuned to match or substantially match different mechanical properties. In an example, three separate ink formulations were formed, e.g., Ink #1 (relative weight of the active agent to the bulking agent of about 0.31 (0.95:3.05)), Ink #2 (relative weight of the active agent to the bulking agent of about 0.29 (0.90:3.10)), and Ink #3 (relative weight of the active agent to the bulking agent of about 0.26 (0.82:3.18). The three ink formulations were then used to print a test structure and were allowed to set to form final printed polymers, and the Young's modulus of each final printed polymer was measured. A summary of the three ink formulations and the measured Young's modulus of the printed polymers are provided in Table 1 below. As can be seen in Table 1, by increasing the relative weight of the active agent to the bulking agent (from 0.26 (0.82/3.18) in Ink #3 to 0.31 (0.95/3.05) in Ink #1), the corresponding values of Young's moduli increase (e.g., from 10.3±3.0 kPa to 30.5±3.8 kPa). This trend continued with other example ink formulations, as shown by FIG. 2C. In some examples, this trend correlates with an increase in crosslinking density of the final polymer, which can be used to tailor the mechanical properties of the inks of the final printed polymers that result therefrom. Thus, the relationship between the weight ratio of the active agent relative to the bulking agent and the resulting polymer modulus can be used as a reference for adjusting the composition of the printable inks so that the final printed polymer will match or substantially match one or more mechanical properties of the organ tissue being simulated, such as the human prostate for the prostate model shown in the Figures, including the Young's modulus of the organ tissue.

TABLE 1

Formulations of Customized Printable Inks and Resulting Young's Modulus

| (w/w/w) | Active Agent | Bulking Agent | Additives (Coloring) | Young's Modulus (kPa) |
|---|---|---|---|---|
| Ink 1 | 0.95 | 3.05 | 0.002 | 30.5 ± 3.8 |
| Ink 2 | 0.90 | 3.10 | 0.002 | 25.7 ± 3.2 |
| Ink 3 | 0.82 | 3.18 | 0.002 | 10.3 ± 3.0 |

In an example, a composition of the printable ink that was found to be particularly useful for 3D printing to form simulated human organs and other tissues, such as human prostate tissue, was a formulation comprising from about 70 wt. % to about 80 wt. % of the bulking agent, for example from about 74 wt. % to about 79 wt. %, such as from about 77 wt. % to about 78 wt. % bulking agent, for example about 77.5 wt. % bulking agent; from about 20 wt. % to about 30 wt. % of the active agent, for example from about 21 wt. % to about 24 wt. % active agent, such as from about 22 wt. % to about 23 wt. % active agent, for example about 22.5 wt. % active agent; and optionally about 0.2 wt. % or less of the additives, such as about 0.1 wt. % or less of the additives, for example about 0.05 wt. % or less of the additives. In an example, it was found that a ratio of the weight percentage of the active agent relative to that of the bulking agent of from about 0 to about 4 was useful for 3D printing to form simulated human organs and other tissues. In some specific examples, such as when printing an organ model that will simulate a soft-tissue, such as a prostate model, a ratio of the active agent relative to the bulking agent was from about 0.2 to about 0.4, for example from about 0.25 to about 0.35, such as from about 0.25 to about 0.3, for example about 0.29 (e.g., the ratio in Ink #2 of Table 1 and FIG. 2C).

Figure 2D:
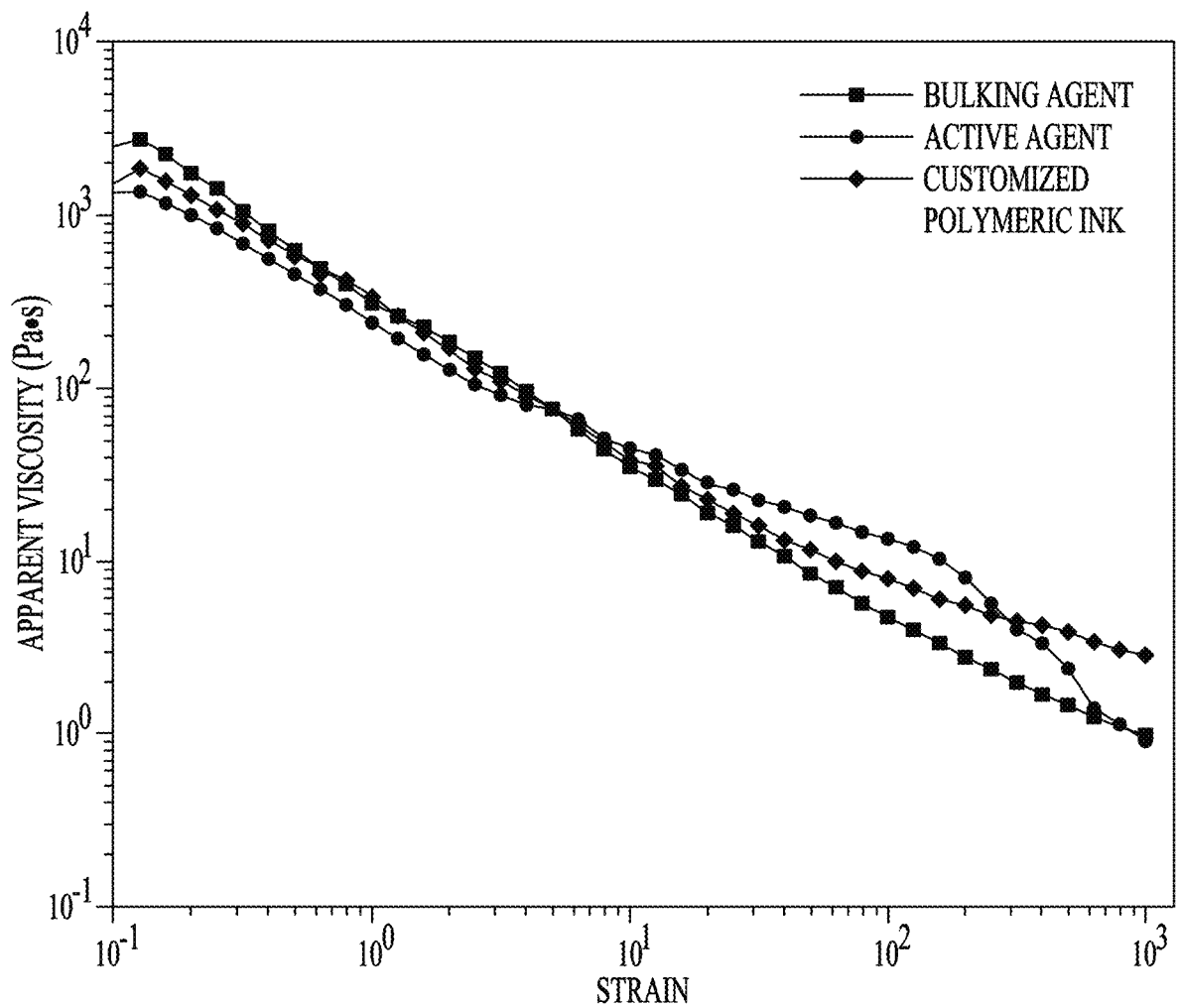
FIG. 2D is a log-log graph of apparent viscosity relative to shear rate for various examples of the customizable printable polymeric ink of FIG. 2A, in accordance with various embodiments of the present disclosure.

Rheological properties of the two main components of the example printable inks (e.g., the active agent and the bulking agent) were used as a reference for adjusting printability of the printable ink. Specifically, the apparent viscosity at various shear rates was measured for the customized ink with the formulation of Ink #2 in Table 1 and FIG. 2C and for an active agent by itself (i.e., the LOCTITE SI 595 CL silicone sealant described above) and of a bulking agent by itself (i.e., the LP20 silicone grease described above) as controls. FIG. 2D is a log-log plot of the resulting apparent viscosities relative to the shear rate for each composition tested, which shows that as the shear rate increased from $10^{-1}$ s$^{-1}$ to $10^3$ s$^{-1}$, the apparent viscosity of the printable ink decreased from $10^3$ Pa·s to 10 Pa·s or less. This confirms that the printable inks that have been found to be useful for 3D printing organ models described herein exhibit shear thinning behavior, which can allow the customizable printable inks described herein to flow well through fine nozzles (e.g., nozzles with small opening diameters) during the 3D printing process.

As described above, preoperative planning and rehearsal is being used more and more by the surgical professions to improve overall performance and to reduce the likelihood of errors. Medical professionals often rely on magnetic resonance imaging (MRI), computed tomography (CT), or 3D virtual visualization to develop an understanding of a particular patient's unique anatomy and disease state. While advances in these imaging techniques have been rapid and often dramatic, they rely on a patchwork of spatial senses and still only allow surgeons and other medical professionals to form a mental image of the patient. These techniques can also fail to provide information regarding the intricate orientations, dimensions, and kinesthetic feedback of a patient's organs and other tissues. Thus, while advanced imaging technology can be an important tool for medical personnel, it still has its limitations.

Physical organ models have become more common, including those made from polymers or other synthetic materials that are intended to more faithfully represent physical properties and structures of organs and tissues that are the subject of surgical procedures. Physical organ models can offer a more effective option for representing the three-dimensional structure of organs and other tissues. However, polymeric organ models, which typically have been formed by molding off-the-shelf, or slightly modified polymeric materials, often lack patient-specificity and exhibit inaccurate or poorly-adjustable physical properties. Recently, patient-specific 3D-printed organ models have been introduced as tools for providing accurate anatomical details of the patient organs for preoperative planning, foreseeing intraoperative complications, and reducing the operation time for improving patient safety and surgical outcomes. Even these patient-specific models, however, are typically hard plastic or rubber-like models that do not realistically accommodate manipulation by surgical tools nor do they accurately simulate other surgical tasks such as cutting.

In addition, the use of 3D printed organ models as advanced surgical aids is currently hampered in at least two primary respects. First, existing commercially-available 3D printed organ models, while anatomically correct, lack precise mimicry of the physical properties of real tissue. This limits their application for accurate prediction and replication of organ physical behavior, such as deformation and reaction force during surgical handling. For example, existing commercially-available organ models are typically printed using commercial plastics (such as polylactic acid, polystyrene, NINJAFLEX™ polymer, etc.). There are significant differences in tactile sensation, mechanical properties and color of these materials compared to their biological counterparts, thus limiting their effectiveness in preoperative planning and rehearsal. Ideally, a 3D printed organ model would match the mechanical and physical properties of the real organ and tissue, including viscoelasticity (such as Young's modulus and other viscoelastic properties) and hardness.

Second, existing commercially-available organ models lack the ability to collect quantitative feedback on organ and tissue handling. This important metric is an indicator of surgical performance, and its omission is a drawback of most commercially-available models of organs and other tissues. Thus, medical professionals are not able to quantify and control the force ranges they apply to the organ when they do preoperative rehearsal and training. Recent reports have suggested or demonstrated the integration of electronics into devices and organ models for more advanced functionalities.

Quantitative Analysis of Printable Ink Compositions and Final Printed Polymer

Following the formulation of the one or more customizable printable inks, a quantitative analysis can be performed to quantify fidelity of the physical properties exhibited by the resulting final printed polymer to the tissue being simulated. Examples of properties that can be compared in this type of analysis include, but are not limited to: static compression; dynamic compression; hardness; and optical reflection characteristics between the final printed polymers and their corresponding tissue samples. The examples of material property analysis described below, which generally describes comparison of various compression properties, are not intended to be limiting. Those of skill in the art will appreciate that other material properties can be analyzed using techniques similar to those described below, including, but not limited to, tensile properties, thermodynamic properties, or optical properties.

Static Compression Analysis

Figure 2E:
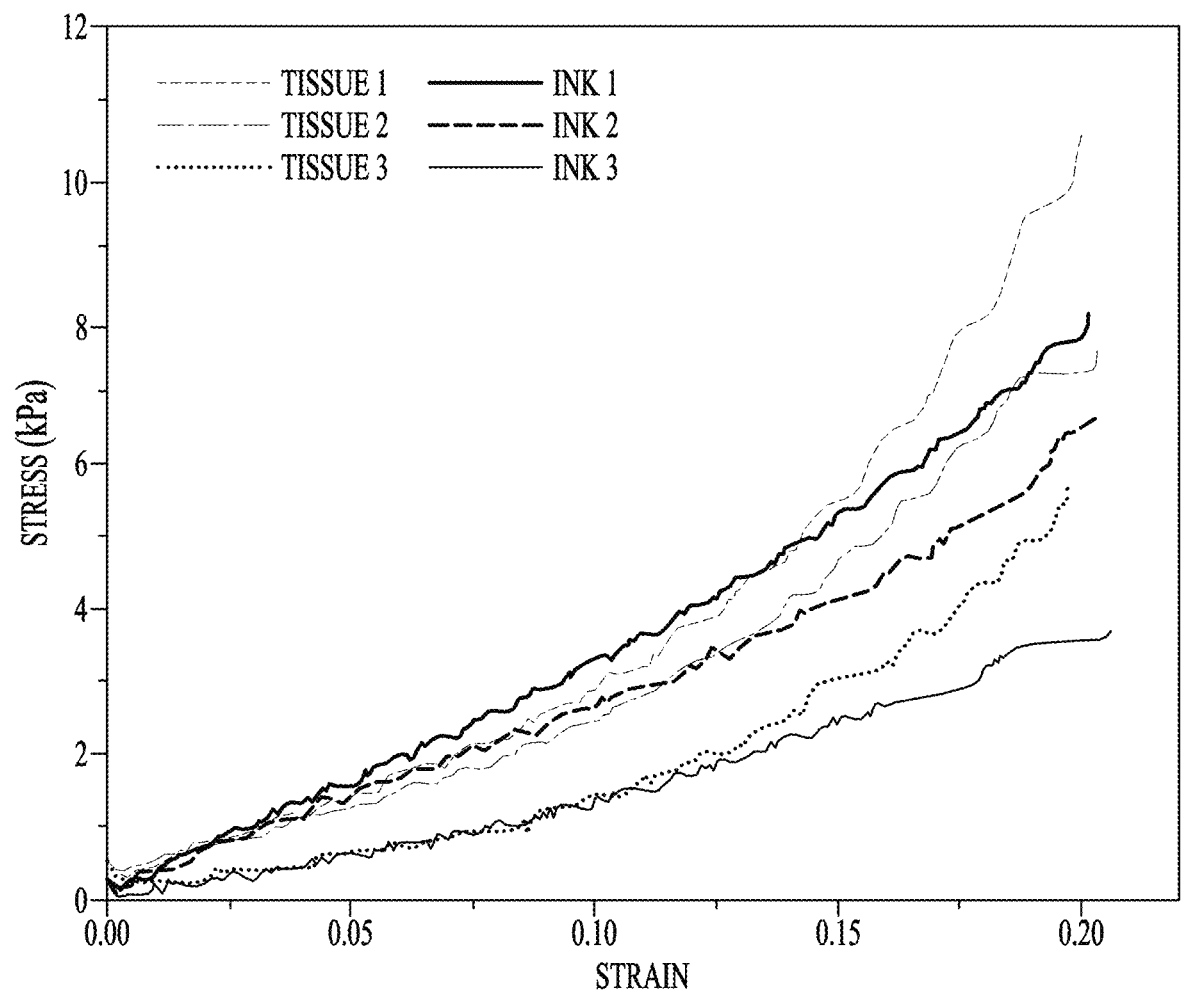
FIG. 2E is a graph of the stress relative to the strain of three human prostate tissue samples and three comparable polymeric materials that have been 3D printed from three comparable examples of the customizable printable polymeric ink of FIG. 2A, in accordance with various embodiments of the present disclosure.
Figure 5A:
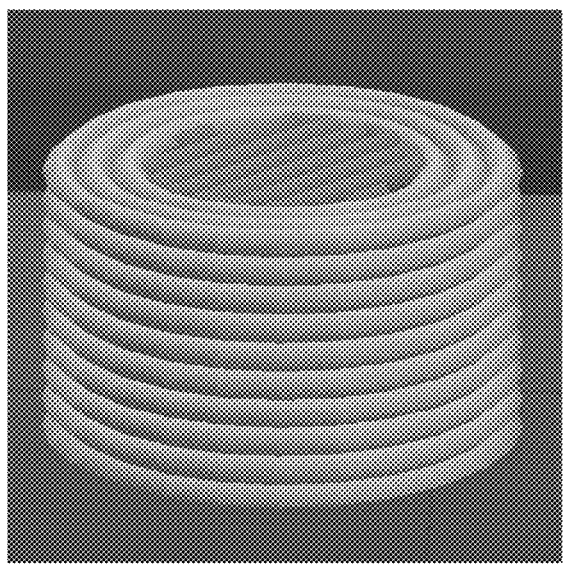
FIG. 5A is a computer drawing of a stereolithographic (STL) model of a cylindrical 3D printed body, in accordance with various embodiments of the present disclosure.
Figure 5B:
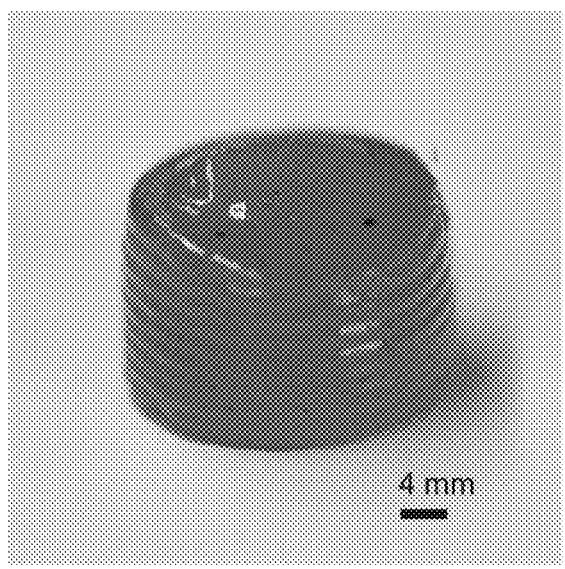
FIG. 5B is a photograph of a physical 3D printed cylindrical sample formed by printing a test ink formulation of the customizable printable polymeric ink of FIG. 2A according to the STL model of FIG. 5A, in accordance with various embodiments of the present disclosure.
Figure 5C:
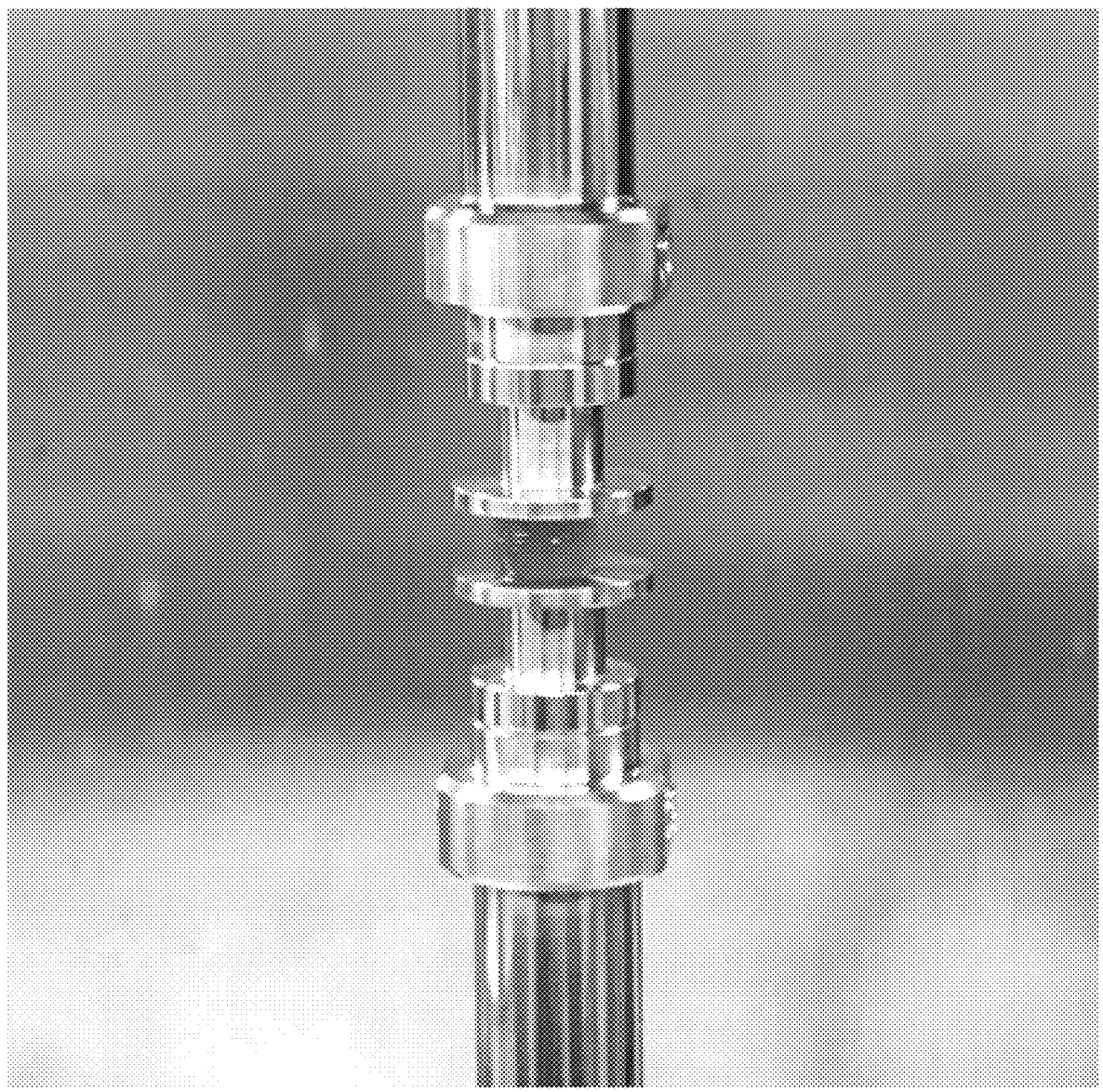
FIG. 5C is a photograph showing an apparatus used for static and dynamic testing of the 3D printed cylindrical sample of FIG. 5B to test mechanical properties of the 3D printed cylindrical sample that results from the test ink formulation, which can be used to adjust the ink formulation in order to adjust the mechanical properties of the ink or of the resulting 3D printed organ model, or both, in accordance with various embodiments of the present disclosure.
Figure 5D:
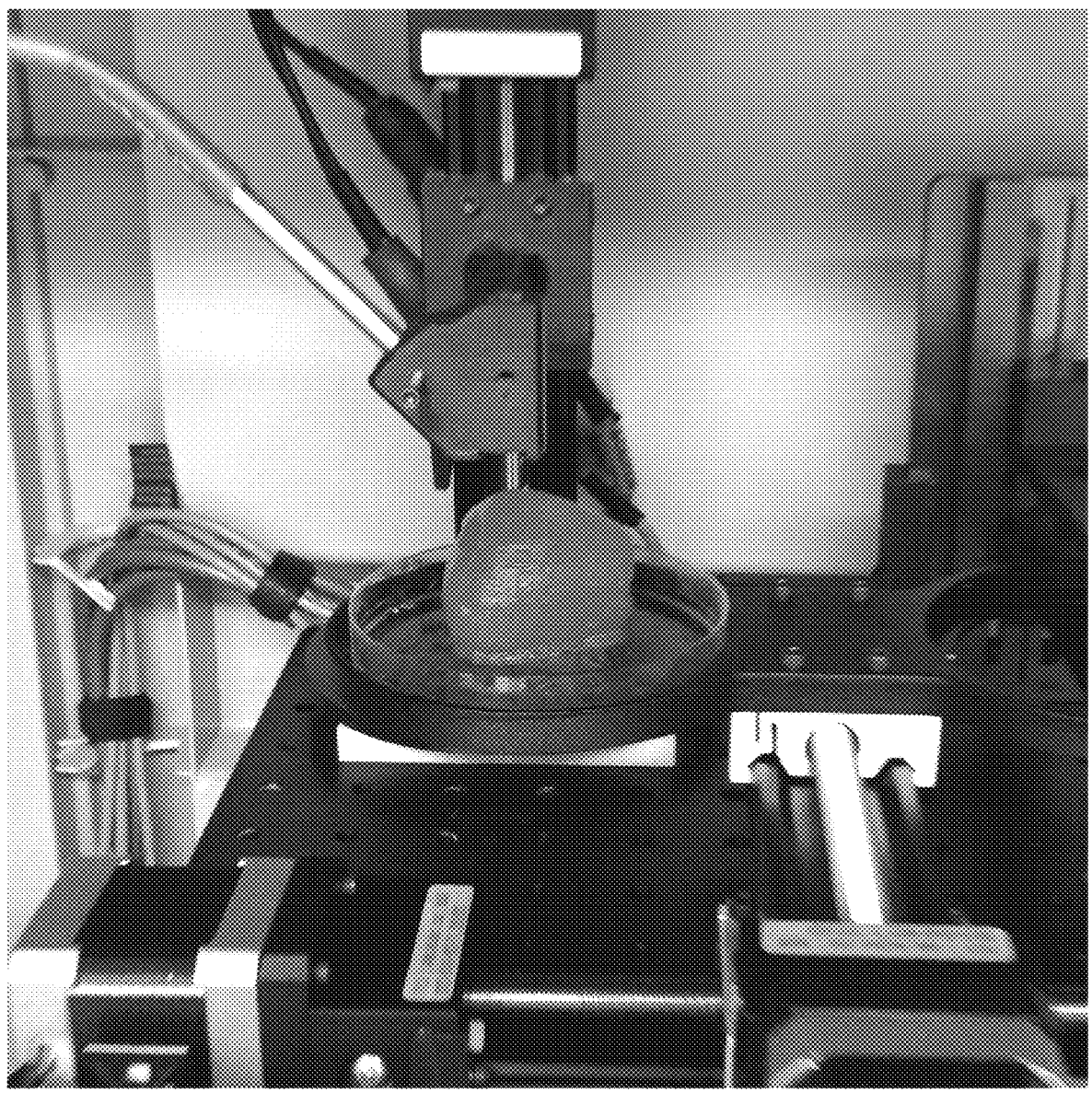
FIG. 5D is a photograph of an apparatus used for an optical reflection test of the 3D printed cylindrical sample of FIG. 5B formed by printing the test ink formulation, which can be used to adjust the ink formulation in order to adjust optical reflectivity of the 3D printed organ model using the customizable printable polymeric ink, in accordance with various embodiments of the present disclosure.

In an example, quantitative analysis of the fidelity of the final printed polymer with respect to static compression properties includes comparing the stress-strain curve of a sample of the tissue being simulated to that of the final printed polymer for a particular ink formulation. In the example for the development of a prostate model, as in the Figures, three cylindrical samples of patient prostate tissue (Tissue 1, Tissue 2, and Tissue 3) were collected and a stress-strain curve for each tissue sample was determined. Three cylindrical test structures were printed from the three ink formulations in Table 1 and FIG. 2C (i.e., Ink 1, Ink 2, and Ink 3), discussed above. Examples of the cylindrical test structures are shown in FIGS. 5A and 5B (discussed in more detail below). Stress-strain curves were also determined for each of the test structures formed from the three ink formulations. FIG. 2E shows the stress-strain curves for each of the tissue samples (labeled as "Tissue 1," "Tissue 2," and "Tissue 3" in FIG. 2E) and for the test structures printed from each of the ink formulations (labeled "Ink 1," "Ink 2," and "Ink 3" in FIG. 2E). As can be seen in FIG. 2E, in the 0-0.15 strain range (which corresponds to a normally acceptable range for most surgical tasks performed on the prostate), the final printed polymer that resulted from printing the customized printable Inks 1, 2 and 3 closely matched the general trends of the stress-strain curves obtained from prostate Tissue Sample 1, 2, and 3, respectively, suggesting patient-specificity for the ink formulation and for the resulting final polymer. The Young's moduli for strains less than 10% for representative samples of structures printed from Ink 1 (31.6 kPa), Ink 2 (26.0 kPa), and Ink 3 (12.4 kPa) (see Table 1 and FIG. 2C, discussed above) are analogous to those determined for Tissue Sample 1 (25.7 kPa), Tissue Sample 2 (20.3 kPa), and Tissue Sample 3 (10.9 kPa). As is also shown in FIG. 2E, for higher strains, the modulus values increase in a nonlinear fashion for the issue samples, which is believed to be due to viscoelastic, poroelastic, and anisotropic properties of the soft tissue like prostate tissue. The modulus values also increased in a nonlinear fashion for the final polymers printed from the printable ink samples, which is believed to be due to viscoelastic behavior of the final printed polymer. The values obtained for Young's moduli are also comparable to reports for the prostate tissue samples in medical literature. More importantly, the Young's modulus values that were determined for the structures printed from the customizable printable inks are well below what has been typical for other polymers and rubber-like materials that have previously been formed via 3D printing.

Figure 6:
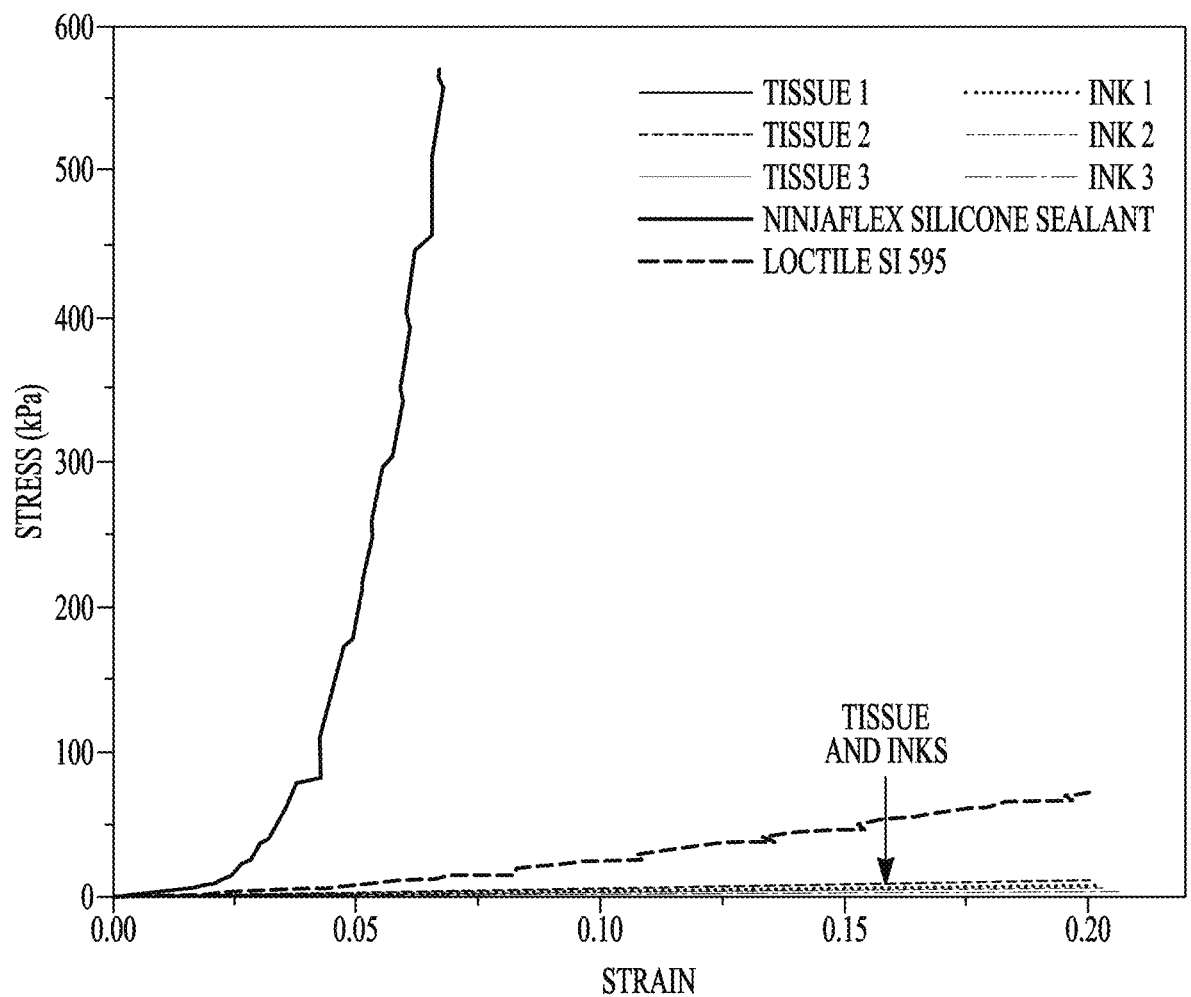
FIG. 6 is a graph of stress relative to strain of various human prostate tissue samples, corresponding 3D printed materials formed from various customizable printable polymeric ink formulations to simulate each corresponding prostate tissue sample, a commercially available polymer that has been used as an organ model material, and of the silicone sealant material that is used as the active agent in the customizable printable polymeric ink formulations, in accordance with various embodiments of the present disclosure.

In addition, at strains of less than about 10%, the Young's moduli for the final printed polymers made from the customizable printable inks described herein are much closer to those of actual soft tissue like prostate tissue when compared to that of a commercially-available 3D printable polymer that has been used to make organ models. For example, at strains of less than 10%, the printable polyurethane filament sold under the trade name NINJAFLEX 3D PRINTING FILAMENT by Ninjatek, Manheim, Pa., USA has a Young's modulus that is hundreds of times larger than that of the final printed polymers formed from the customizable printable inks described herein, as well as being hundreds of times larger than that which is typical for human soft tissue. For example, at 10% or less strain, the final printed polymer formed from Ink #2 had a Young's modulus of about 26 kilopascals (kPa) (as shown in Table 1 and FIG. 2C), the corresponding prostate Tissue Sample 2 had a Young's modulus of about 20.3 kilopascals (kPa), while the NINJAFLEX polymer has a Young's modulus of about 15.2 megapascals, or about 15,200 kilopascals (about 585 times greater than that of the final polymer printed from Ink 2, and almost 750 times greater than that of Tissue Sample 2). Surprisingly, the final polymers printed from the customizable printable inks described herein were even found to be as much as an order of magnitude lower than that of the commercially available silicone sealant that was used as the active agent for the example printable inks described here (i.e., LOCTITE 595 CL silicone sealant), which has a small-strain Young's modulus of about 0.24 MPa at a strain of 10% or less, which is almost ten times greater than that of the final polymer printed from Ink 2 and is more than ten times greater than that of Tissue Sample 2. FIG. 6 graphically represents this dramatic difference between the final printed polymers described herein and the tissue samples and that of the commercially-available NINJAFLEX and LOCTITE products.

Dynamic Compression Analysis

In an example, quantitative analysis of the fidelity of the final printed polymer with respect to dynamic compression properties includes comparing one or more mechanical responses of the tissue itself and of the final polymer when dynamic compression is applied thereto. In the example for the development of a prostate model as in the Figures, one or more mechanical responses to an applied dynamic compression regimen by one of the final polymers printed from a specified formulation of the customizable printable ink can be evaluated and compared to the mechanical responses of a prostate tissue sample to the same applied dynamic compression cylindrical samples under applied dynamic compression regimen. In an example, the formulation of Ink 2 (described above with respect to Table 1 and FIG. 2C) was used to print a cylindrical test structure. The cylindrical test structure and a cylindrical sample of the same prostate Tissue Sample 2 (described above with respect to FIG. 2E) were each subjected to oscillating compression cycles, which was used to determine a corresponding storage modulus (E') and loss modulus (E") for the polymer test structure printed from Ink 2 and for Tissue Sample 2. The polymer test structure and Tissue Sample 2 were both tested at strain values of $\varepsilon=0.05$, $\varepsilon=0.10$, and $\varepsilon=0.20$ at various frequencies.

Figure 2F:
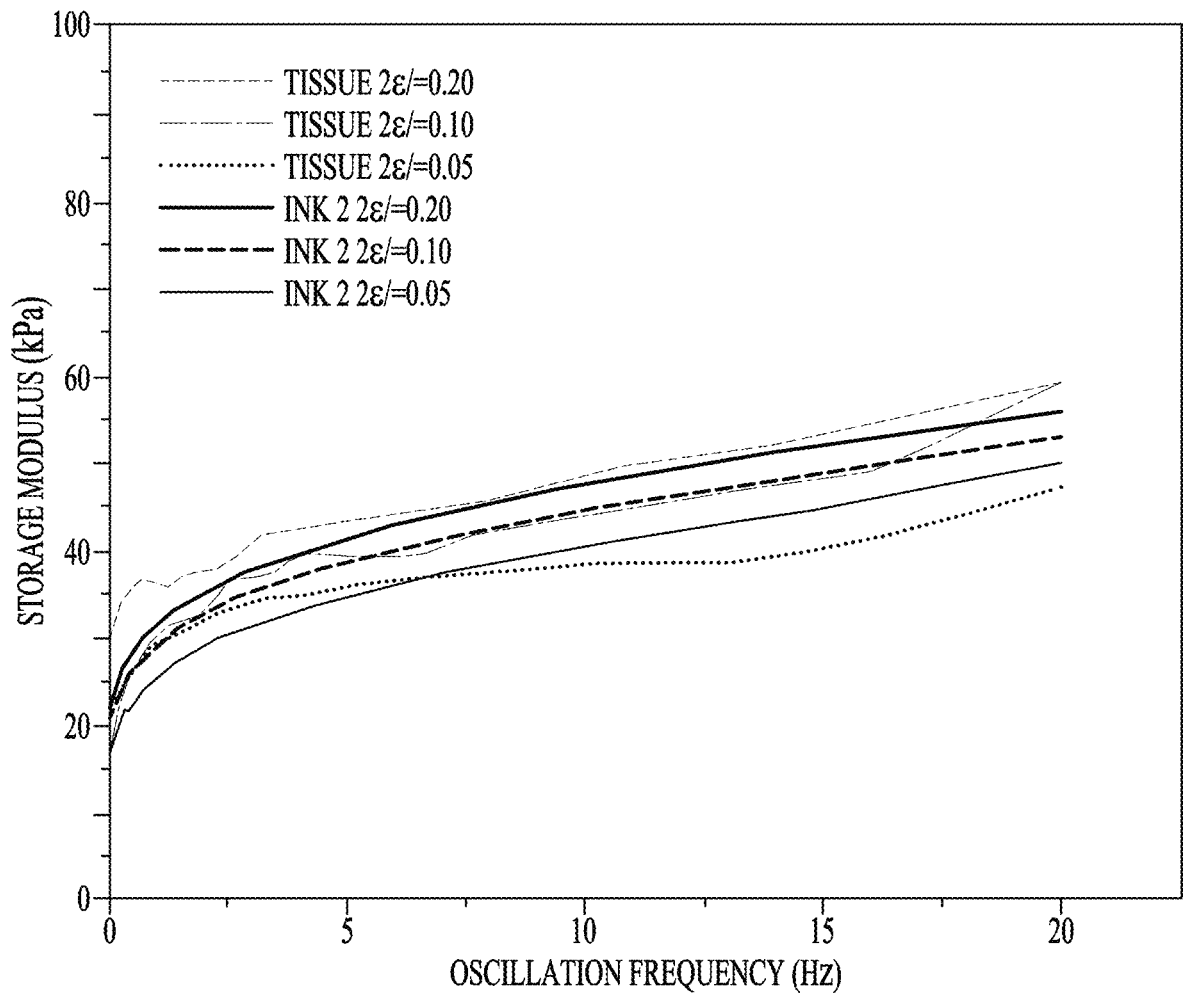
FIG. 2F is a graph of storage modulus relative to frequency of dynamic oscillating compression at various specified strains for one of the human prostate tissue samples from the graph of FIG. 2E and its comparable polymeric material printed from the comparable example of the customizable printable polymeric ink of FIG. 2A, in accordance with various embodiments of the present disclosure.
Figure 2G:
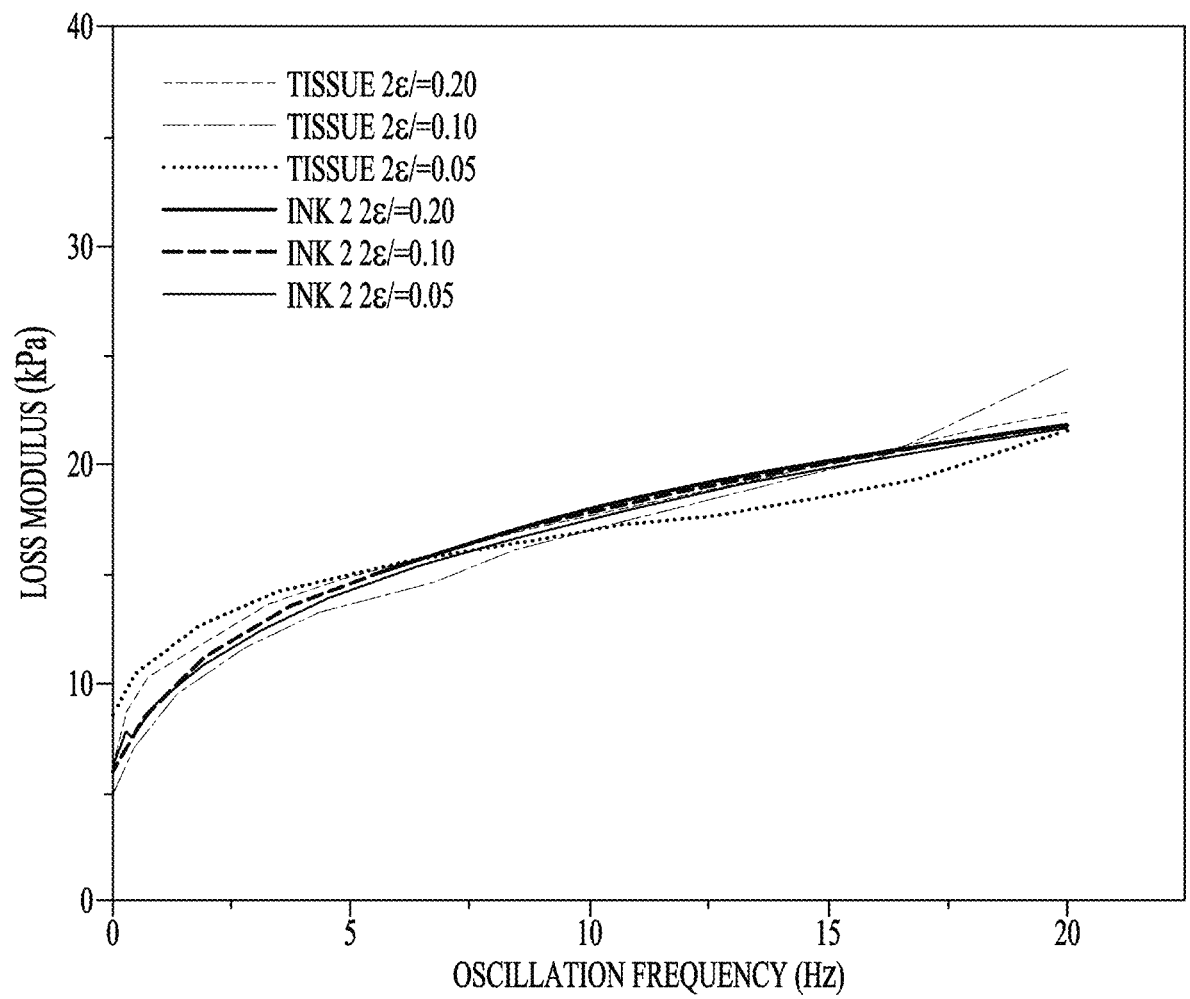
FIG. 2G is a graph of loss modulus relative to frequency of dynamic oscillating compression at various specified strains for the same human prostate tissue sample and the same polymeric material printed from the same customizable printable polymeric ink as in the graph of FIG. 2F, in accordance with various embodiments of the present disclosure.

FIG. 2F graphs the storage moduli results for the dynamic compression testing. As can be seen in FIG. 2F, both Tissue Sample 2 and the final polymer printed from Ink 2 showed an increase in storage modulus as the frequency increased (e.g., from 0.1 Hz to 20 Hz), and both also showed an increase in the storage modulus as the strain increased (e.g., from 0.05 to 0.20). These results for the prostate Tissue Sample 2 are similar to previously reported results for other biological tissue, such as human cervix tissue, which exhibit viscoelastic properties. FIG. 2G graphs the loss moduli results from the dynamic compression testing. As can be seen in FIG. 2G, both the final polymer printed from Ink 2 and the Tissue Sample 2 show a clear increase in loss modulus as the oscillation frequency increases, but the results do not seem to indicate one way or the other whether there is also a change in loss modulus associated with the increase in strain.

Hardness

Figure 2H:
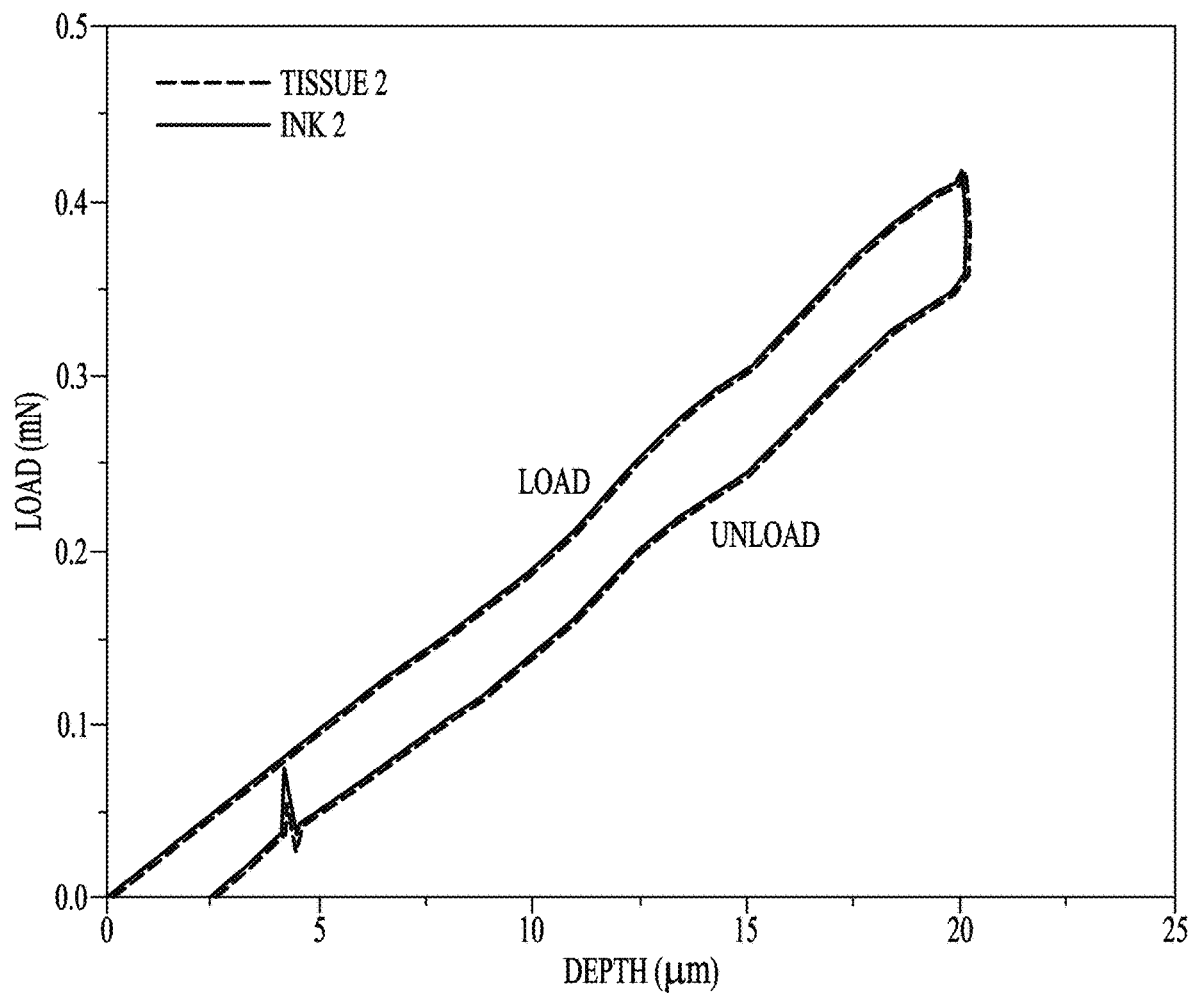
FIG. 2H is a graph of load relative to depth for both loading and unloading of the same human prostate tissue sample and the same polymeric material printed from the same customizable printable polymeric ink as in the graph of FIGS. 2F and 2G, in accordance with various embodiments of the present disclosure.

In an example, quantitative analysis of the fidelity of the final printed polymer with respect to hardness can include performing indentation testing of a tissue sample and a corresponding polymer printed from a specified customizable ink formulation and comparing the indentation testing results. In the example for the development of a prostate model as in the Figures, a nanoindentation methodology was applied. As with the other quantitative analyses described above, the formulation of Ink 2 (described above with respect to Table 1 and FIG. 2C) was used to print a cylindrical test structure, which was subjected to the same nanoindentation regime as a cylindrical sample of the same prostate Tissue Sample 2 (described above with respect to FIG. 2E). FIG. 2H shows the load-depth curves for Tissue Sample 2 and for the final polymer printed from Ink 2. As can be seen in FIG. 2H, the load-depth curves for the prostate Tissue Sample 2 and the polymer printed from Ink 2 substantially overlap, with a difference of only about 0.1% of the tissue hardness at the maximum nanoindenter load and a difference of about 7.8% of the tissue hardness for the average hardness value for these specific tests, which indicates a high degree of hardness fidelity between the prostate tissue and the final printed polymer.

Optical Properties

Figure 2I:
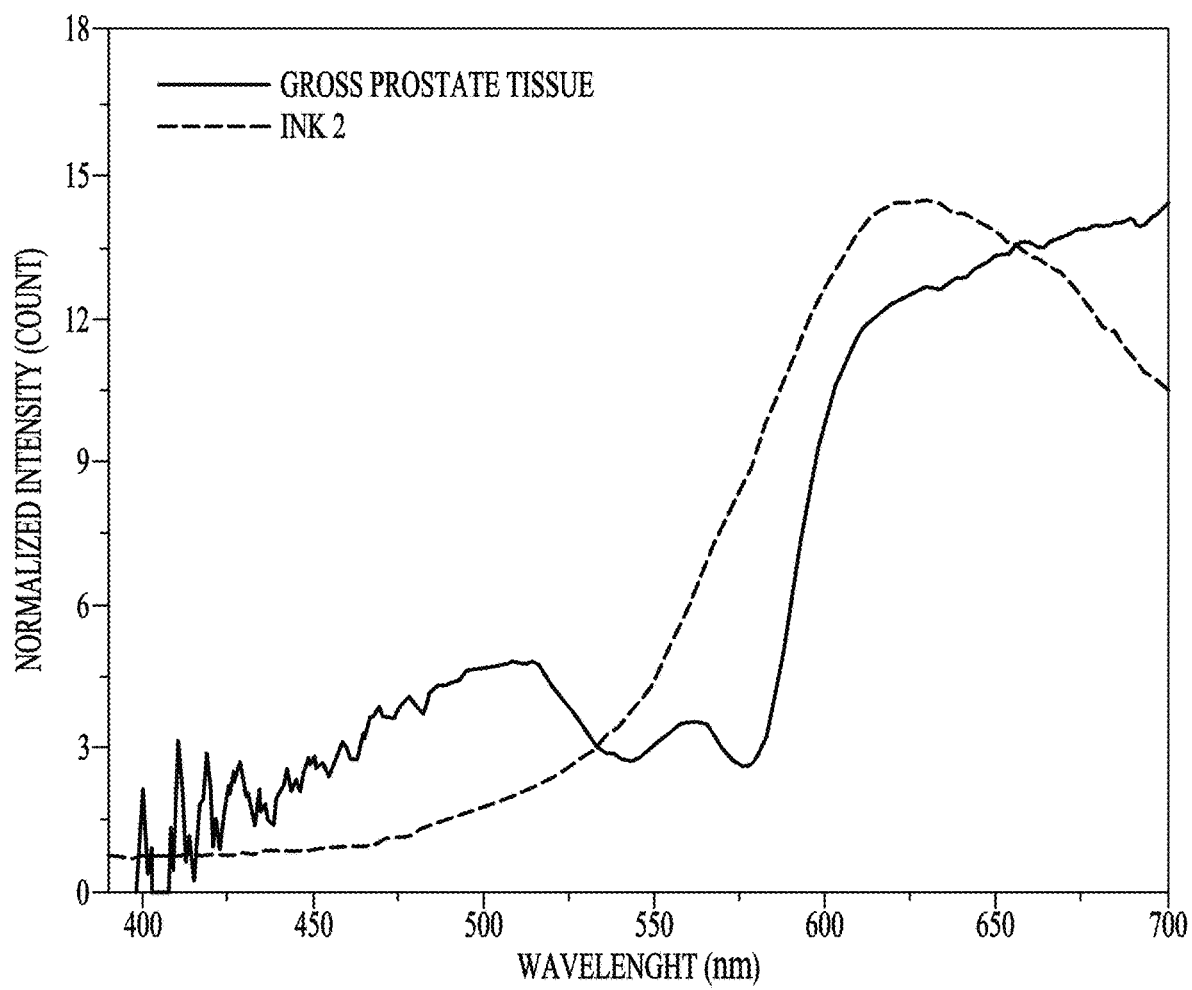
FIG. 2I is a graph of normalized reflection intensity relative to incident light wavelength for the same human prostate tissue sample and the same polymeric material printed from the same customizable printable polymeric ink as in the graph of FIGS. 2F-2H, in accordance with various embodiments of the present disclosure.

In an example, quantitative analysis of the fidelity of the final printed polymer with respect to optical properties can include comparing optical reflections at an outer surface of a structure printed from a specified customizable printable ink formulation and of a tissue sample. In the example for the development of a prostate model as in the Figures, optical reflections at the outer surface of a sample of the same prostate Tissue Sample 2 (described above with respect to FIG. 2E) and a test structure of polymer printed from Ink 2 (described above with respect to Table 1 and FIG. 2C) were measured at various light wavelengths. FIG. 2I shows the results of the optical reflection testing. As can be seen in FIG. 2I, both the prostate Tissue Sample 2 and the final polymer printed from Ink 2 possess the strongest reflection at wavelengths of from about 590 to about 700 nanometers (nm) (e.g., orange and red), which indicates good optical fidelity.

Density

In an example, quantitative analysis of the fidelity of the final printed polymer with respect to density can include weighing and measuring a volume of samples of the tissue and of a polymer printed from a specified customizable printable ink formula and calculating the density from the measured weight and volume. In the example for the development of a prostate model is in the Figures, this method was used to determine densities of several sample polymer structures printed from Ink 2 (described above with respect to Table 1 and FIG. 2C), as were several samples of the same prostate Tissue Sample 2 (described above with respect to FIG. 2E). The average density of the polymer structures printed from Ink 2 was $1.05 \pm 0.07$ g/cm$^3$, which is essentially identical to that which was measured for the samples of the Tissue Sample 2 and with density values for human prostate tissue as reported in literature, which is also 1.05 g/cm$^3$.

Printing Apparatus

In an example, the printable ink, which can be custom formulated as described above, can be printed from a 3D printing system (also referred to as a "3D printer" or simply "a printer") that deposits the printable ink as one or more relatively small and relatively simple geometrical microstructures that cooperatively build up the overall structure of the final printed polymer. As used herein, the term "microstructures" when referred to the structure of the printed ink does not mean that the structures are on the micrometer scale, although they could be, but rather is a term of relative size compared to the overall polymer structure, which can be referred to as being a "macrostructure." Because these microstructures form a part of the overall printed polymer macrostructure, they may also be referred to herein as "substructures."

In an example, the 3D printer is configured to extrude the printable ink to form the one or more substructures. In such an example, the 3D printer can include one or more extrusion nozzles, also referred to as "3D printing nozzles," "print heads," or "extrusion heads," from which the one or more substructures of the ink are extruded. In an example, the 3D printer can be configured to form an elongated and substantially continuous substructure of the printed ink, often referred to as a "bead." Each bead of the printed ink can be formed with a relatively high aspect ratio, which can be defined as the length of the bead (in its elongated direction) relative to the lateral width across the bead (which is also referred to as the size of the bead below). In an example, the 3D printer can extrude one or more beads of the ink in a predetermined pattern that forms sequential layers that build upon one another, with each sequential layer corresponding to a specified cross-sectional portion of the overall printed structure of the final printed polymer.

In an example, an extrusion-based 3D printer includes one or more print heads that each include at least one extrusion opening with a specified opening size. As used herein, the term "size" when referred to an opening through which a material is extruded from an extrusion nozzle refers to the resulting distance measured laterally across the printed ink bead that is extruded from the opening (which may be larger or smaller than the lateral distance across the gate itself). For example, if the extrusion head produces a printed ink bead having a circular or substantially circular cross-sectional shape, then the opening size is equal to the diameter of the circular or substantially circular printed ink bead. In an example, the 3D printer that extrudes a bead of the printable ink has an opening size of about 1.54 millimeters (mm) or less, which is equal to about 1540 micrometers (μm) or less, such as about 1000 μm (1 mm) or less, about 900 μm (0.9 mm) or less, about 800 μm (0.8 mm) or less, about 750 μm (0.75 mm) or less, about 700 μm (0.7 mm) or less, about 600 μm (0.6 mm) or less, about 500 μm (0.5 mm) or less, about 400 μm (0.4 mm) or less, about 300 μm (0.3 mm) or less, about 250 μm (0.25 mm) or less, about 200 μm (0.2 mm) or less, or even about 100 μm (0.1 mm) or less. Moreover, further advances in 3D printing and/or extrusion technology will likely make even smaller "resolutions" of the printed ink bead possible over time.

Conventional extrusion-type 3D printers (such as those used for conventional fused deposition modeling ("FDM") or fused filament fabrication ("FFF") printing) have typically used heating to enable extrusion of a thermoplastic printing material, such as thermoplastic filaments that are at least partially melted and extruded to form a molten printed bead. In an example, the 3D printer that is used to print the printable inks described here is configured with one or more adjustable pressure settings that allow the 3D printer to apply adjustable pressure to the printable ink at one or more locations within the 3D printer, in particular at the extrusion head. This adjustable pressure capability allows the 3D printer to compensate for and handle the shear thinning properties of the printable ink, and to do so at or near room temperature (e.g., about 20° C. (about 68° F.) to about 25° C. (about 77° F.), such as about 22° C. (about 72° F.)). In an example, the 3D printer takes advantage of the shear thinning behavior of the ink by applying a relatively high pressure to the ink during printing so that it will more readily flow from the extrusion head during printing, but once the printed substructure (e.g., a bead) is formed, the higher pressure is no longer being applied by the 3D printer so that the printed ink in the substructure is more viscous and will retain its shape more readily, allowing the ink to undergo the chemical or physical transformation to the final polymer. This process is sometimes referred to as "robocasting" or "direct ink writing (DIW)" (although that term has typically been used for the printing of other types of materials). Further details of an example 3D printer that could be used for extrusion-type printing of the customizable printable inks described herein is disclosed in U.S. patent application Ser. No. 15/003,198, filed on Jan. 21, 2016, entitled "3D PRINTED ACTIVE ELECTRONIC MATERIALS AND DEVICES," which was published on Jul. 28, 2016 as U.S. Publication No. 2016/0218287 A1, the disclosure of which is incorporated by reference herein in its entirety.

In another example, the 3D printer can be configured to form substructures in the form of a plurality of continuous or substantially continuous sheets or films of the ink, with each film having a lateral size that is larger than the opening sizes and printed ink bead sizes described above, e.g., the sheets or films can be printed with a much lower aspect ratio than that of the bead (although each sheet or film may have a height that is similar to the height of a printed ink bead). The 3D printer can be configured to form layers of the printed structure, with each layer being formed from one or more of the sheets or films, and wherein sequential layers of the printed sheets of films collectively form the overall printed structure (similar to the sequential layers formed from the one or more printed ink beads described above). In yet another example, the 3D printer can be configured to form substructures that are much smaller in the length direction than either the bead or sheet types of substructures described above. In some examples, an aspect ratio of this type of substructure can be equal or substantially equal to one (1), meaning the substructure is generally as "long" as it is "wide." In other words, in some examples the 3D printer may be configured to form "droplets" of the ink, which is sometimes referred to as "inkjet-type 3D printing." As with the bead or sheet examples, the 3D printer can be configured to place the droplets of the ink in a predetermined pattern that corresponds to the overall printed structure of the final polymer, such as by forming a plurality of sequential layers of the droplets, similar to the layers formed by the one or more beads or the layers formed by the sheets or films.

As will be appreciated by those of skill in the art, the 3D printer can form or deposit each substructure onto one or more support surfaces that will support the weight of the printed ink substructure until the one or more components of the printed ink is able to undergo the chemical or physical transformation described above to form the final polymer. As used herein, the term "support surface" refers to any surface that is capable of supporting at least a portion of the weight of a printed ink substructure deposited or formed by the 3D printer. A support surface can be a surface of a dedicated supporting structure, such as a build area substrate or supporting structure that is specially formed to act as a support for one or more portions of the printed ink substructures until it has undergone enough of the chemical or physical transformation described above to form a sufficient stable and self-supporting polymer structure. In an example, the 3D printer is configured to print one or more support structures from a separate support material. For example, the 3D printer can include a second extrusion head that can deposit one or more support material substructures in a similar layer-by-layer manner in order to print one or more support structures that can provide support for printed ink substructures (such as printed ink beads) while the one or more active agents in the printed ink undergo the chemical or physical transformation and the printed ink substructures combined to form the overall final printed polymer structure.

In an example, the one or more support structures are made from a material that is configured to be removable after the printed ink has become sufficiently structurally stable and self-supporting polymer structure, which is typically referred to as a "sacrificial material." In some examples, this sufficiently structurally stable and self-supporting polymer structure might not occur until after the desired final polymer has completely formed (e.g., when the one or more active agents in the printed ink have completed all of the crosslinking necessary so that the final polymer possesses the material properties specified to be considered to match or substantially match the organ or other tissue being simulated). However, this may not be required in all examples. Rather, in some examples, the printed ink may experience an intermediate state that is sufficiently structurally stable and sufficiently self-supporting, even if the one or more precursor components of the ink has not completed the transformation to the final polymer (e.g., where the percentage of crosslinking between the one or more active agents in the ink is less than the total amount of crosslinking necessary for the final polymer to possess the material properties specified to match or substantially match the organ or other tissue being simulated.)

In one example, the sacrificial material that forms the one or more supporting structures is a material that will liquefy at a temperature at which the final polymer printed from the customizable printable ink formulations remains solid or substantially solid. For example, the support material can have a melting temperature that is lower than the melting temperature of the final polymer so that the sacrificial material can be removed by heating the combined structure above the sacrificial materials melting temperature but below a melting temperature of the final polymer once the printed ink is sufficiently structurally stable and self-supporting. Or the sacrificial supporting material can comprise a pluronic material that can be printed at room temperature or higher temperatures as a supporting gel, but that forms a liquid-like solution at lower temperatures. For example, PLURONIC F-127 (sold by Sigma-Aldrich Corp.) is a PEO-PPO-PEO triblock polymer that takes the form as a stable gel at higher printing temperatures, but that exists as a liquid solution at temperatures less than about 10° C. In an example, the PLURONIC F-127 supporting material is printed at or around room temperature, and can then be removed by washing with a cold water-based solution having a temperature of less than 10° C., such as a solution at 5° C. or colder.

In another example, the sacrificial material that forms the one or more supporting structures is a material that can be dissolved in a solvent, wherein the solvent does not dissolve away the final polymer formed from the printed ink (or an intermediate). With this type of sacrificial material, once the printed ink is sufficiently structurally stable and self-supporting, then the solvent can be applied to the combination of the stable structure and the one or more supporting materials (such as by dipping the combined structure into a bath of the solvent), which will dissolve the one or more supporting structures away from the printed polymer material.

In yet another example, the sacrificial material that forms the one or more supporting structures is a material that can be relatively easily mechanically removed from the final printed polymer (or an intermediate). For example, the supporting material may be softer than the printed polymer formed from the printed ink so that it can be scraped away from the printed polymer relatively easily. In another example, the supporting material can be more brittle than the printed polymer so that it can be broken away, without damaging the final printed polymer. The supporting material can also be printed to be a noticeably different color than the color of the printed ink so that it will be visually apparent when there is still supporting structure remaining.

Method of Forming an Organ Model Specific to Patient Anatomy

As described above, the customizable printable inks described herein can be used to produce an organ model with a high degree of fidelity compared to a native organ or other tissue, such as the prostate model example described herein. The customizable printable inks can also be used to produce an organ model that is highly specific to a particular patient, not just with respect to the material properties of the final printed polymer (e.g., how the organ model physically reacts to manipulation and how it "feels" to the surgeon or other medical personnel handling the organ model), but also with respect to the particular patient's specific anatomical structure of the organ or other tissue.

In an example, a method of forming an organ model that is specific to a patient's anatomy includes one or more of the following steps: (a) analyzing one or more physical or material properties of the patient's organ to be simulated by the organ model and formulating the printable ink to match or substantially match the one or more material properties of the patient's organ, which is described above with respect to the formulation of the customizable printable ink; (b) scanning one or more images of the patient's organ; (c) extracting information about the anatomical structure of the patient's organ from the one or more images; (d) converting the information about the anatomical structure of the patient's organ to one or more instructions for the 3D printer to print the final polymer structure; and (e) printing the printable ink with the 3D printer according to the one or more instructions in order to form the final printed polymer having a printed geometrical structure that matches or substantially matches the anatomical structure of the patient's organ.

In an example, the one or more images are generated using one or more scanning techniques that are able to produce high-resolution three-dimensional scans of a patient's anatomy, even if the organ or tissue in question is internal to the patient's body. Examples of scanning techniques that can be used to scan the one or more images of the patient's organ (step (b)) includes, but is not limited to, one or any combination of: x-ray radiography imaging; magnetic resonance imaging ("MRI"); computerized tomography ("CT") scanning (also referred to as computerized axial tomography ("CAT") scanning); ultrasound imaging; endoscopy imaging; tactile imaging; thermal imaging (also referred to as thermography); or nuclear medicine imaging techniques such as positron-emission tomography ("PET") or single-photon emission computed tomography ("SPECT").

Extracting the information about the anatomical structure (step (c)) and converting the information to the one or more instructions for the 3D printer (step (d)) can include producing a three-dimensional model of the patient's organ from the one or more images or from the information about the anatomical structure extracted from the one or more images. In an example, the three-dimensional model produced from the one or more images can include a stereolithographic ("STL") model. Those of skill in the art of 3D printing will appreciate that an STL model is a common type of model generated during 3D printing processes. In some examples, an STL model generated from the one or more images of the patient's organ is then sliced into a plurality of parallel or substantially parallel layers that are planar or substantially planar, such as a plurality of planar or substantially planar layers that are oriented in a horizontal or substantially horizontal orientation, which is referred to herein as a "sliced STL model." In an example, the step of converting the information about the anatomical structure of the patient's organ to one or more instructions (step (d)) includes converting the STL model or the sliced STL model to 3D printing G-code, which one or more controllers of the 3D printer can interpret and use to control movement of one or more components of the 3D printer (such as the movement of a build extrusion head to print the printable ink to form the final printed polymer, and, in some examples, the movement of a support extrusion head to print one or more support materials to form one or more supporting structures).

Figure 3A:
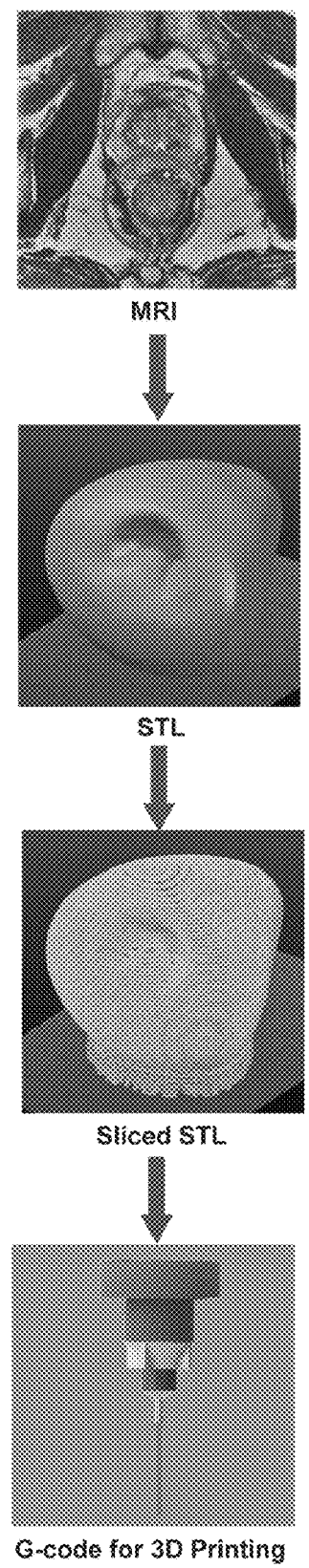
FIG. 3A is a conceptual flow diagram for an example procedure for analyzing an anatomical structure of a specific patient's organ or other tissues, such as that of the patient's prostate, and converting it to programming code usable by a 3D printer to print a polymer organ model that corresponds to the structure of the patient's organ and other tissues, in accordance with various embodiments of the present disclosure.
Figure 3B:
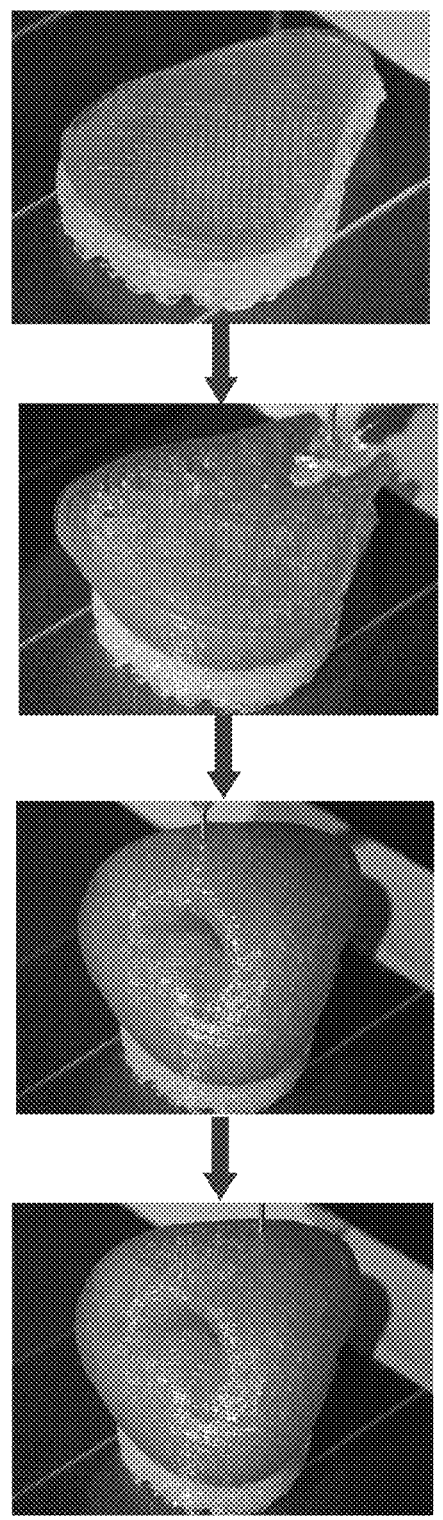
FIG. 3B is a series of photographs showing an example process of printing a model of an organ, i.e., a human prostate, using the example customizable printable polymeric ink of FIG. 2A, such as via the procedure of FIG. 3A, in accordance with various embodiments of the present disclosure.
Figure 3C:
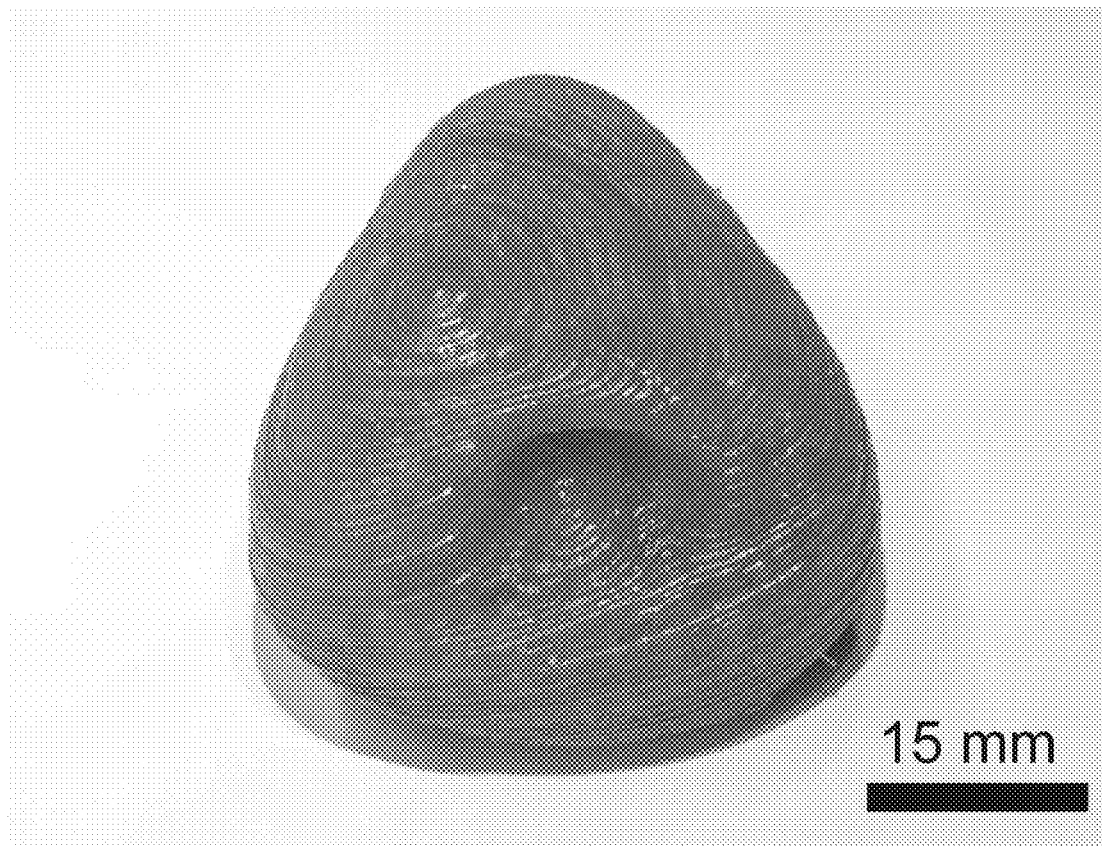
FIG. 3C is a photograph of a final 3D printed organ model, i.e., of a human prostate, that has been printed using the example customizable printable polymeric ink of FIG. 2A and the example procedure of FIG. 3A, in accordance with various embodiments of the present disclosure.
Figure 7:
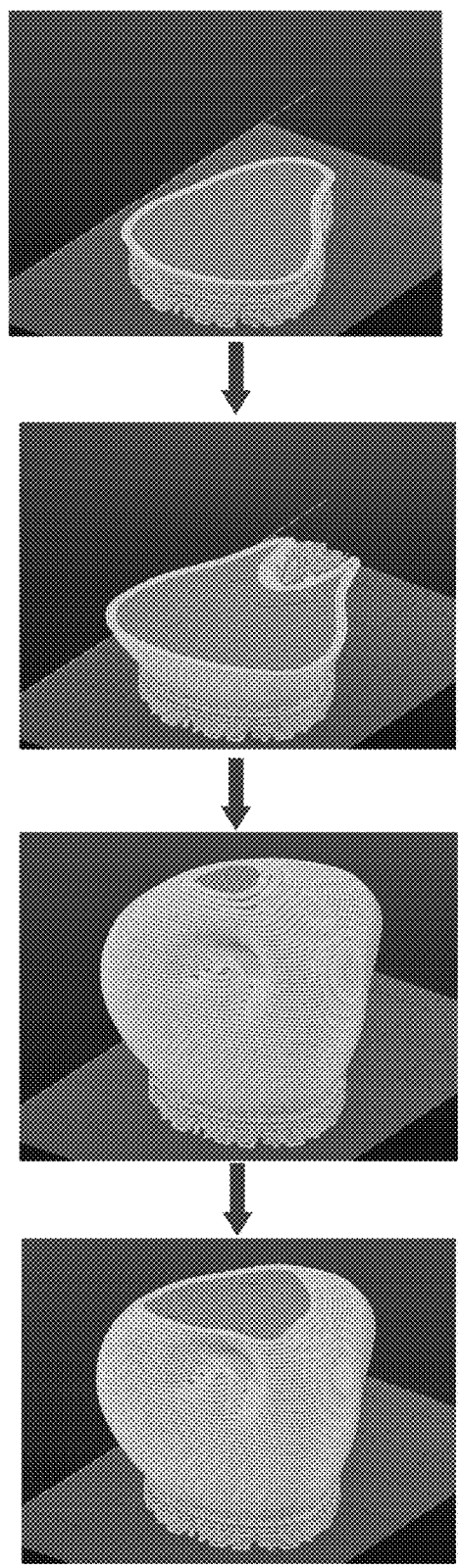
FIG. 7 shows a series of computer-generated images of a stereolithographic (STL) model that can be used for the printing of the 3D printed organ model of FIG. 3C, shown sliced at various stages of the printing process, in accordance with various embodiments of the present disclosure.

FIG. 3A shows an example of this method of producing a patient specific organ model in the context of the example prostate model shown throughout the Figures. In FIG. 3A, an MRI scan is performed on the patient's prostate (first step in FIG. 3A), which was used to create a computer-generated three-dimensional STL model of the patient's prostate (second step in FIG. 3A). The STL model was sliced into horizontal layers to form a sliced STL model of the patient's prostate (third step in FIG. 3A), which was then converted to G-code that is usable by the 3D printer to print the ink into the structure of the final printed polymer (fourth step in FIG. 3A). FIG. 3B includes photographs of several stages of the process of 3D printing the printable ink to form the prostate model and FIG. 7 shows the sliced STL model including the layers that correspond to each stage shown in FIG. 3B. The 3D printing of the printable ink to form the final printed polymer structure of the prostate model that is shown in FIG. 3B follows the pathways determined from the sliced STL model (FIG. 7) in order to generate the final 3D printed prostate model, shown in FIG. 3C.

Figure 3D:
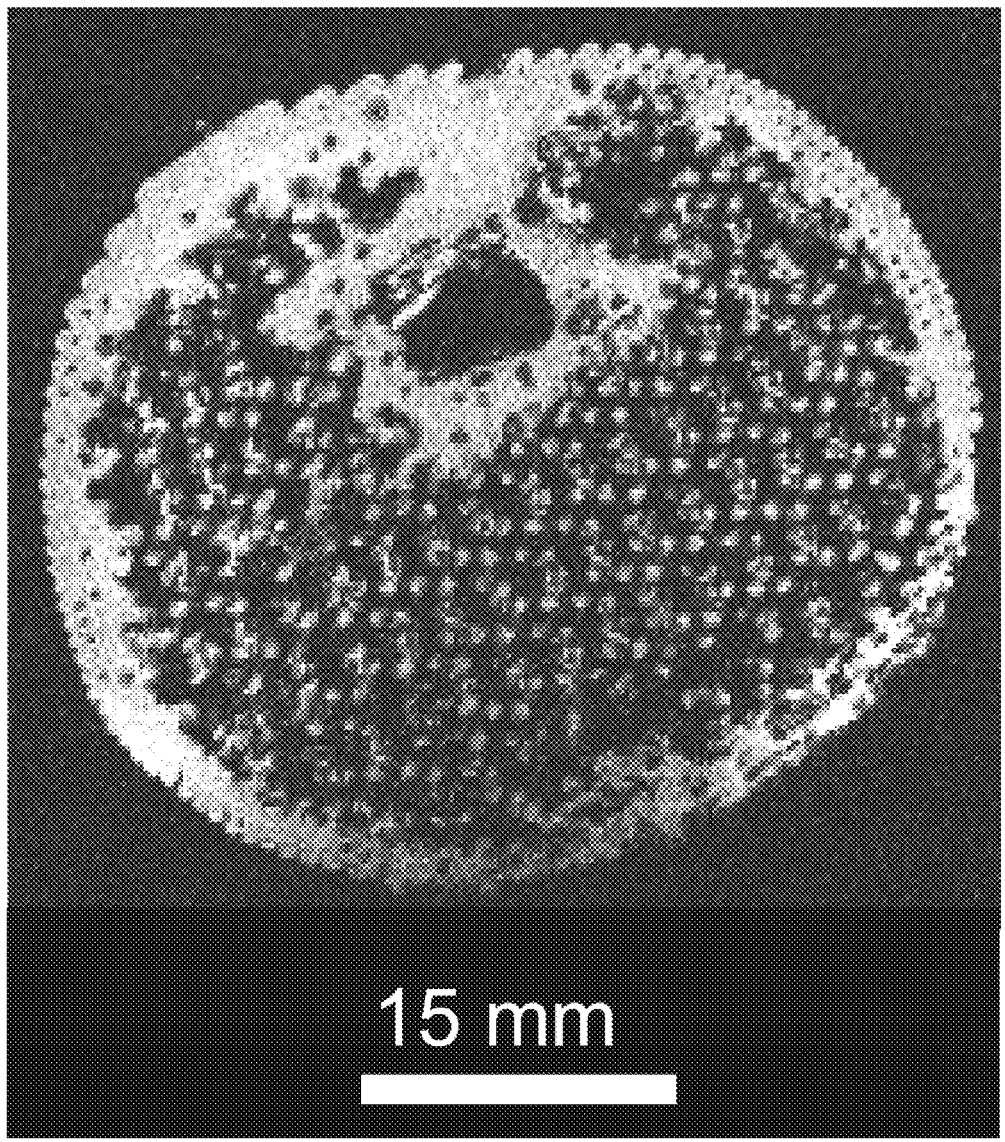
FIG. 3D is an example of a magnetic resonance imaging (MRI) scan of the example 3D printed organ model of FIG. 3C, in accordance with various embodiments of the present disclosure.
Figure 3E:
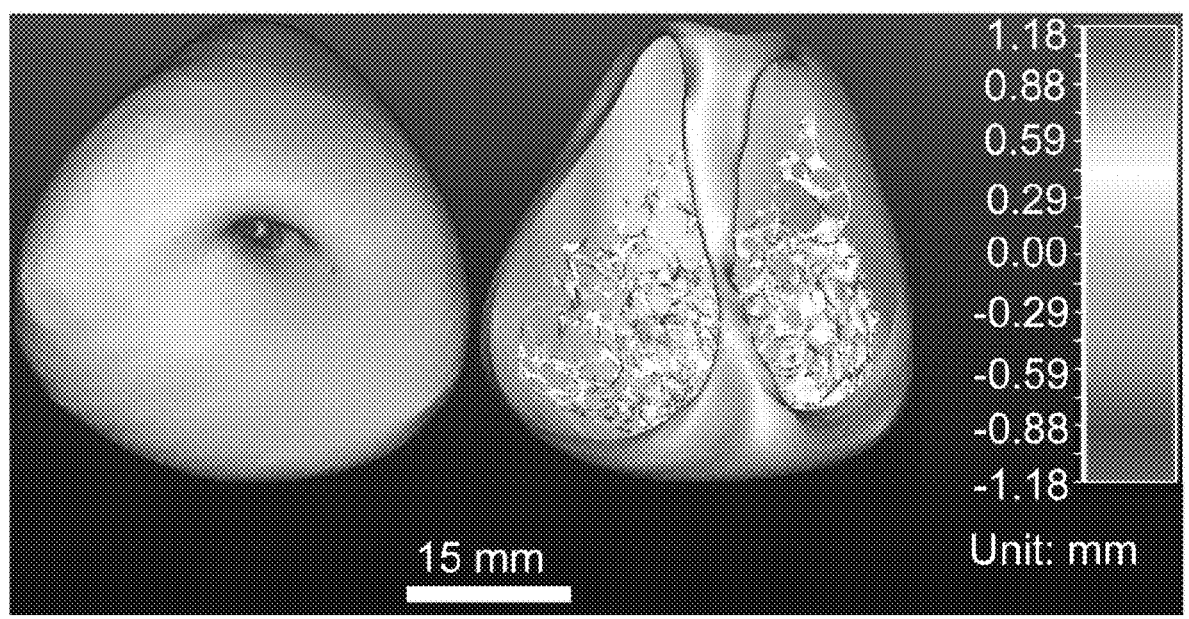
FIG. 3E is an example of a calibrated distance map for a comparison between an outer surface of the example 3D printed organ model of FIG. 3C and an outer surface of the prostate that was scanned and analyzed in the procedure of FIG. 3A to show anatomical fidelity of the 3D printed organ model and the scanned organ, in accordance with various embodiments of the present disclosure.
Figure 3F:
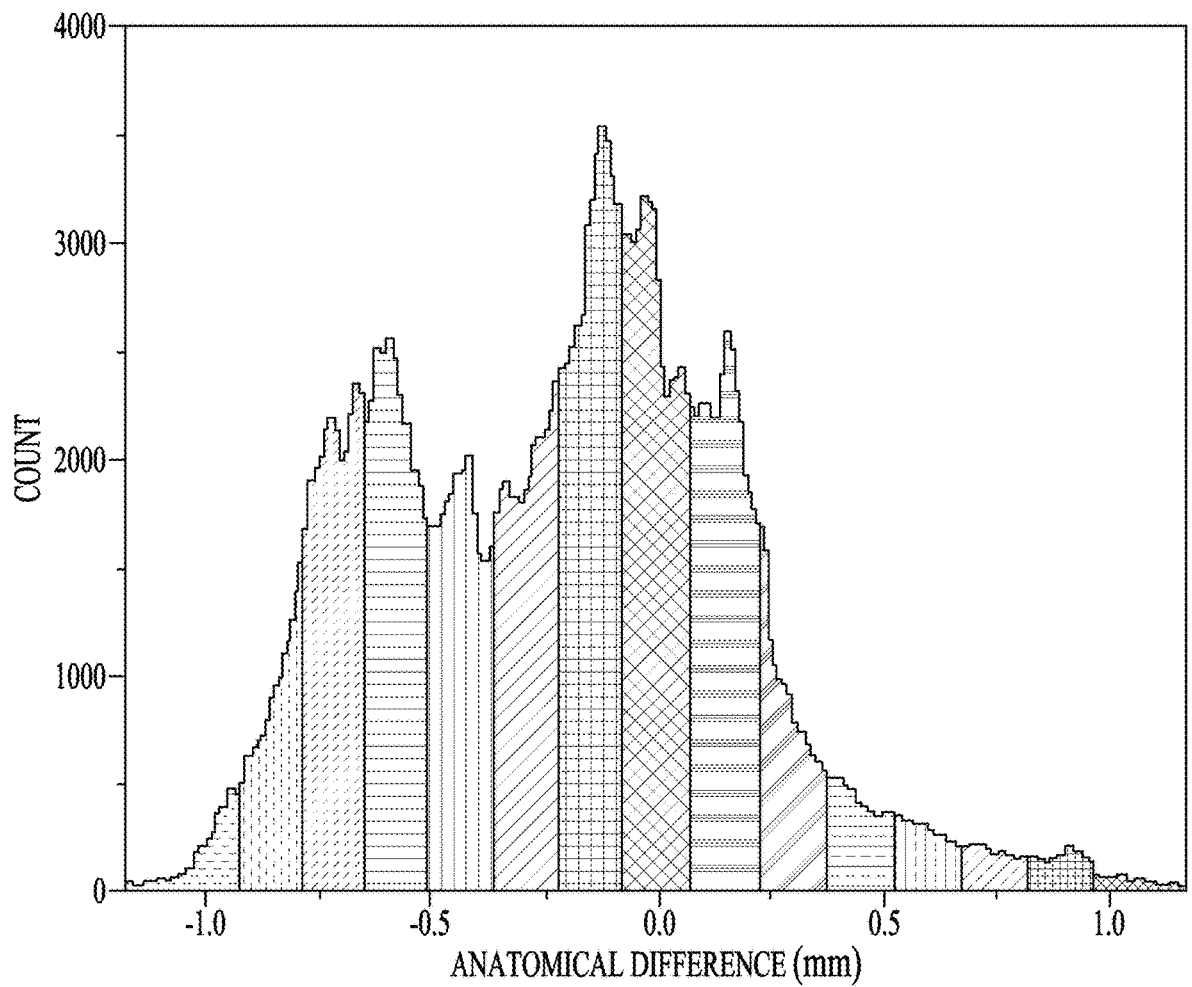
FIG. 3F is a histogram graph of the calibrated distances for selected surface points compiled from the calibrated distance map of FIG. 3E, in accordance with various embodiments of the present disclosure.

A quantitative analysis of the printed organ model can provide for a quantification of anatomical fidelity between the 3D printed organ model and the patient's specific organ. In an example, 3D registration of one or more structures of the printed organ model can be used to analyze anatomical fidelity, such as 3D registration of at least a portion of the outer surface of the organ model. In the example of the printed prostate model, the printed prostate model was scanned by MRI, and the resulting MRI image stack (FIG. 3D) was utilized to generate an STL model of the printed prostate model (similar to how the MRI stack of the patient's actual prostate was used to generate the STL model of the prostate itself in FIG. 3A). A specified set of comparison surface points was chosen on the STL model generated from the patient's prostate (i.e., on the STL model of the second step in FIG. 3A) and on the STL model generated from the printed prostate model (i.e., generated from the MRI image stack of FIG. 3D). 3D registration was used to compare each comparison surface point of the patient prostate STL model to a corresponding comparison surface point on the surface of the 3D printed prostate STL model. FIG. 3E shows an example of a calibrated distance map on the surface of the STL model of the printed prostate model, and FIG. 3F is a histogram of the calibrated distances between the STL model of the printed prostate model and that of the patient's actual prostate. The results indicated that the anatomical difference for the outer surface (left image in FIG. 3E) and the inner urethra surface (right image in FIG. 3E) is trivial. As can be seen in FIG. 3F, most of the calibrated distance points on the printed prostate model fell in the range of about −0.8 millimeters (mm) to about 0.3 mm compared to the corresponding point on the patient's actual prostate, with peaks close to 0 mm. The overall anatomical fidelity was found to be about 98%.

The Use of the Printed Organ Model to Predict Organ Physical Behavior

The high degree of fidelity for the material properties of the final polymer structure printed using the customizable printable inks described herein, and the high degree of anatomical fidelity that can be achieved, indicates that an organ model formed according to the concepts described herein can be used to predict the physical behavior of patient organs during surgical handling. The ability to accurately reflect actual physical behavior of an organ can help avoid the application of excessive deformation and force, and thus organ tissue damage during medical or surgical procedures. In order to confirm fidelity of the physical behavior of an organ model printed as described herein, both finite element modelling (FEM) simulations of the patient organ model and compression tests on the 3D organ model were used to evaluate the predicted deformation of a 3D printed organ model both geometrically and mechanically.

Figure 3G:
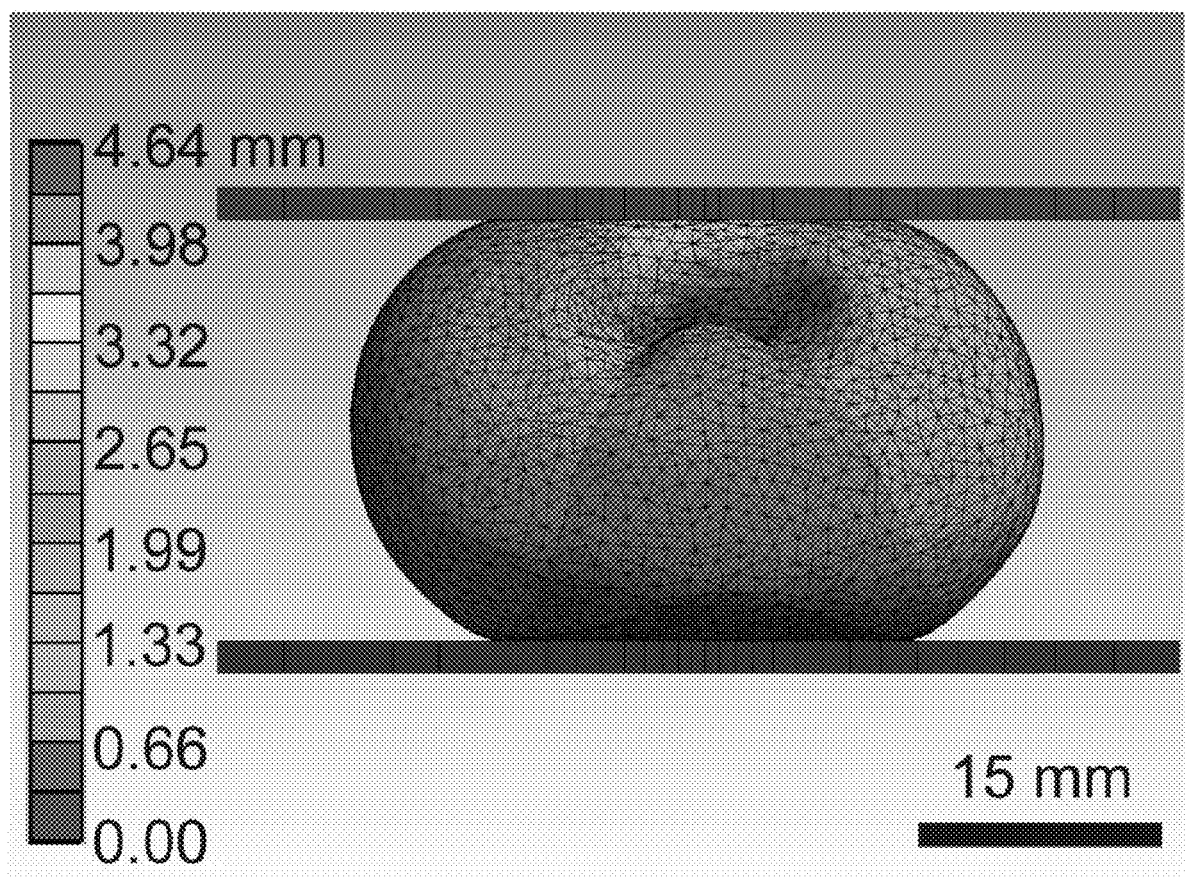
FIG. 3G is an image showing a graphical representation of results from a compression analysis of a finite element modeling (FEM) simulation model of a 3D printed organ model, wherein the FEM simulation model is comparable to the physical 3D printed organ model of FIG. 3C, in accordance with various embodiments of the present disclosure.
Figure 8A:
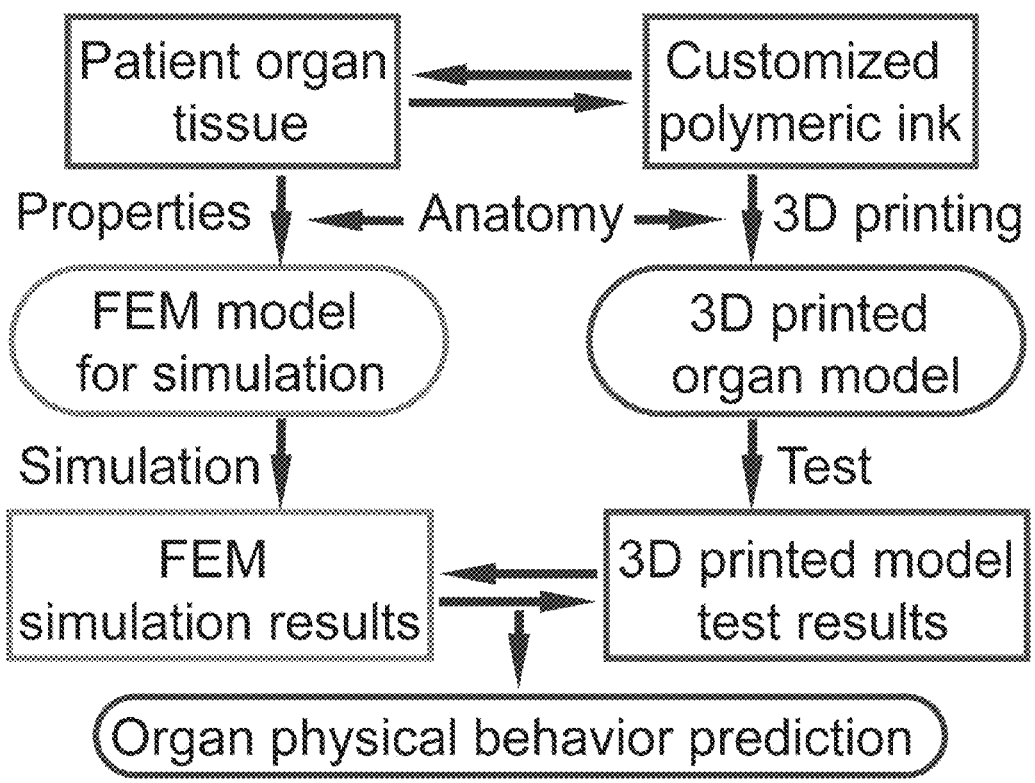
FIG. 8A is a flow diagram of an example procedure for preparing a printed organ model, such as the 3D printed organ model of FIG. 3C, and for studying behavioral response of the organ model under specified conditions, in accordance with various embodiments of the present disclosure.
Figure 8B:
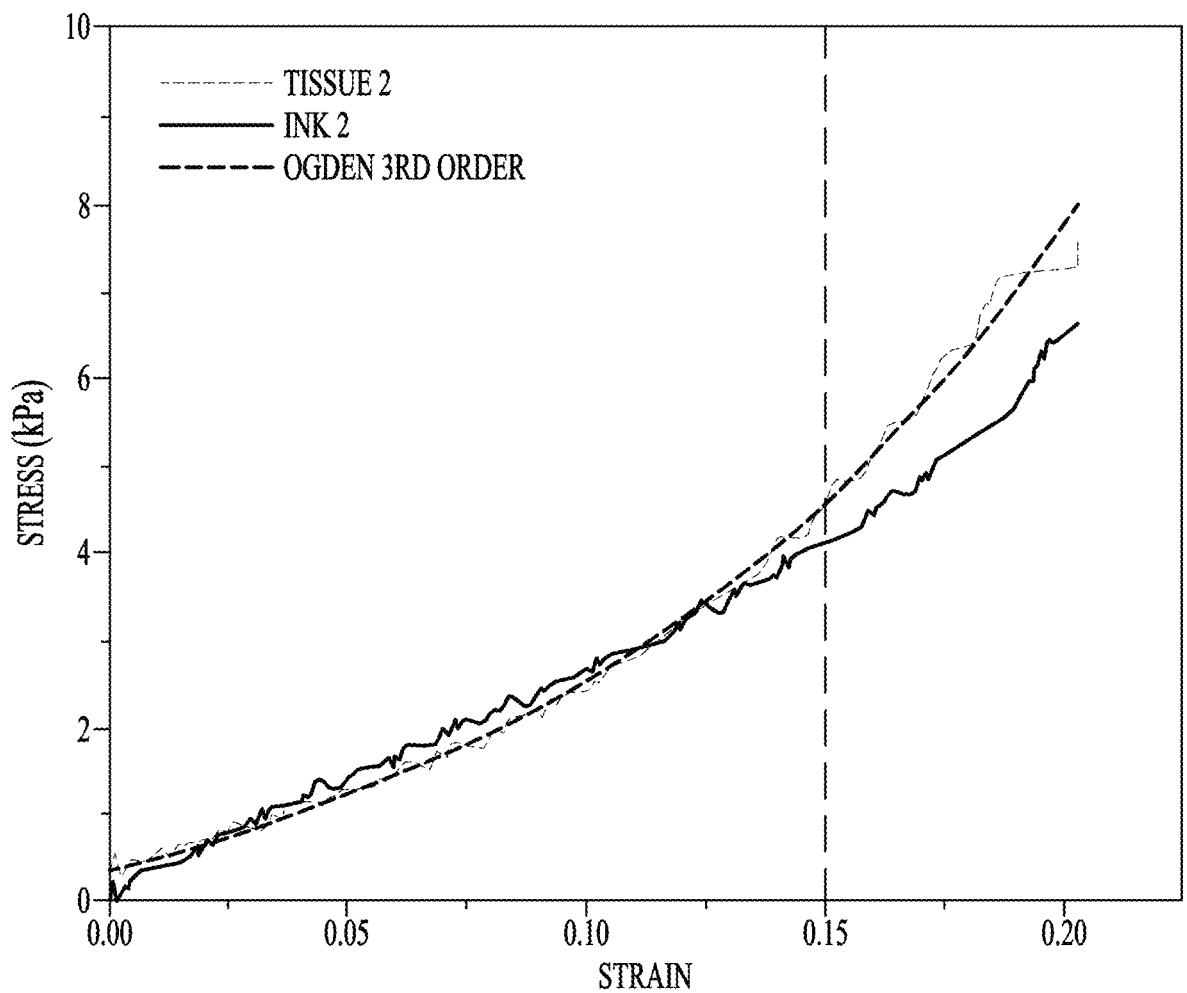
FIG. 8B is a graph of stress relative to strain for the same human prostate tissue sample as in FIGS. 2F-2I, for a 3D printed organ model as in FIG. 3C printed using the same customized printable polymeric ink as in FIGS. 2F-2I, and the stress predicted by an FEM simulation created according to an Ogden third order model, in accordance with various embodiments of the present disclosure.
Figure 8C:
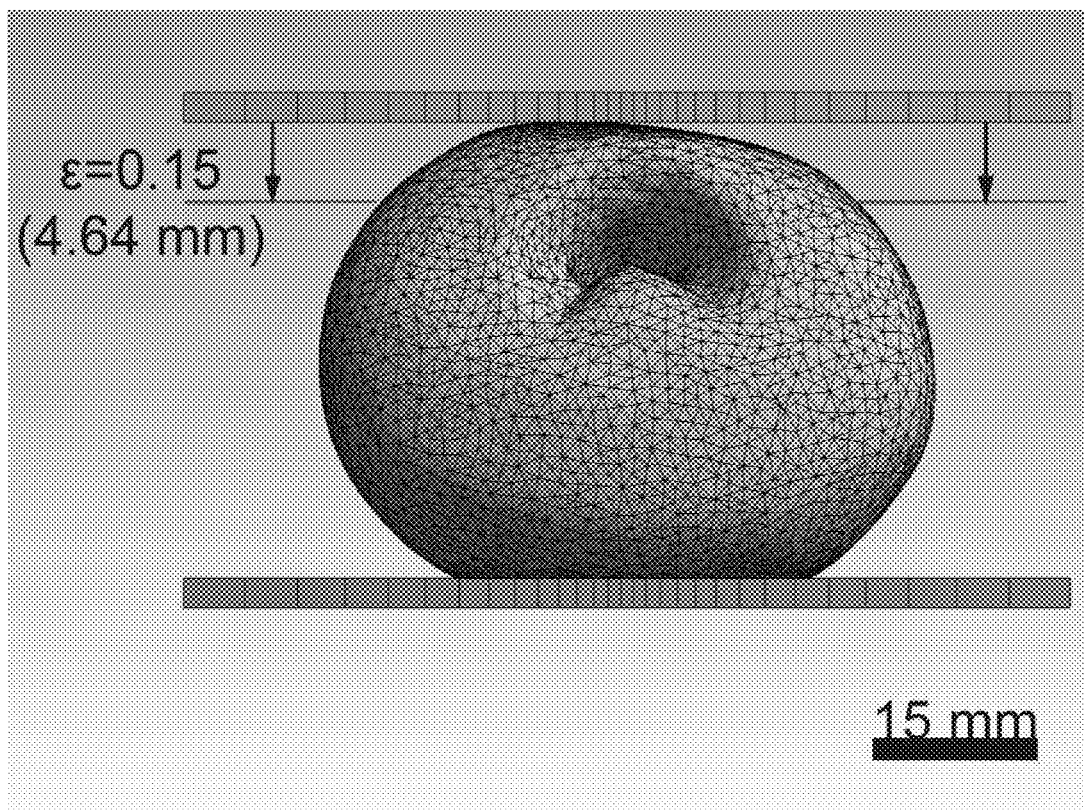
FIG. 8C is a computer-generated image of the simulated prostate of the FEM simulation created in accordance with the Ogden third order model of FIG. 8B in a non-deformed state, in accordance with various embodiments of the present disclosure.

An Ogden third order model was used to fit the stress-strain curves of the prostate Tissue Sample 2 and Customized Ink 2 (described above with respect to FIG. 2E) within the strain range of 0-0.15, which is shown in FIG. 8B and Table 2 below. An FEM simulation in accordance with the Ogden third order model was used to simulate a compression test wherein the FEM model compressed between a bottom plate and a top plate that was lowered a distance equal to 15% of the entire model height (or about 4.64 mm) away from its original position while leaving the bottom plate fixed (shown in FIG. 8C). FIG. 3G is a graphical representation of the deformation experienced by various locations on the FEM model under the simulated compression test. The reaction force of the model during compression was also predicted. The results from the FEM simulation provide a reference for organ physical behavior.

TABLE 2

Parameters of the Ogden third order model for the FEM simulation.

| | $\alpha_1$ | $\alpha_2$ | $\alpha_3$ | $\mu_1$ | $\mu_2$ | $\mu_3$ |
|---|---|---|---|---|---|---|
| Tissue 2 | 12.84 | 13.00 | 12.84 | 33.20 | 11.44 | 490.74 |

Figure 3H:
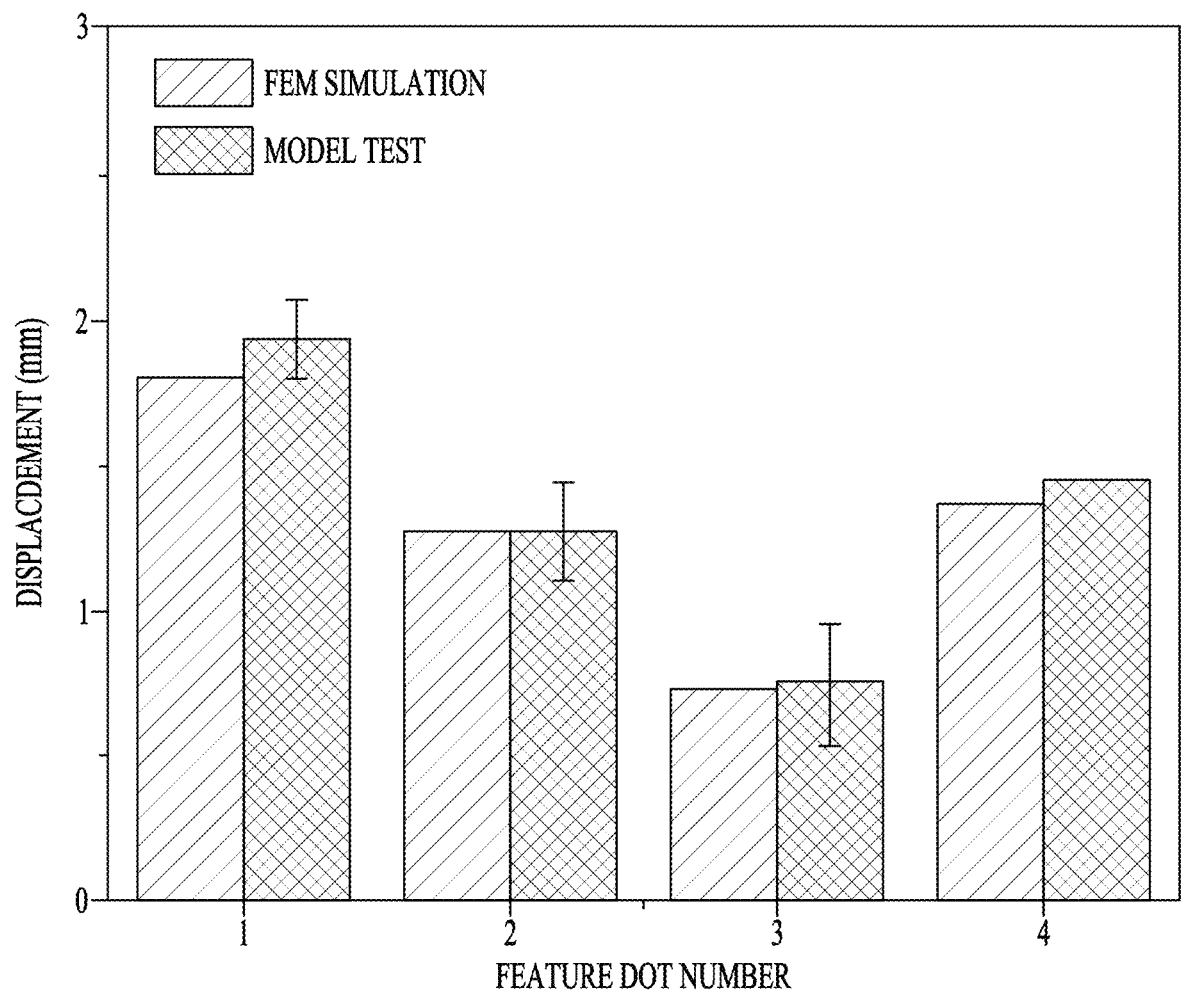
FIG. 3H is a bar graph of the displacement of four selected points, referred to as "feature dots," on the physical 3D printed organ model of FIG. 3C and on the FEM simulation model of FIG. 3G, in accordance with various embodiments of the present disclosure.
Figure 3I:
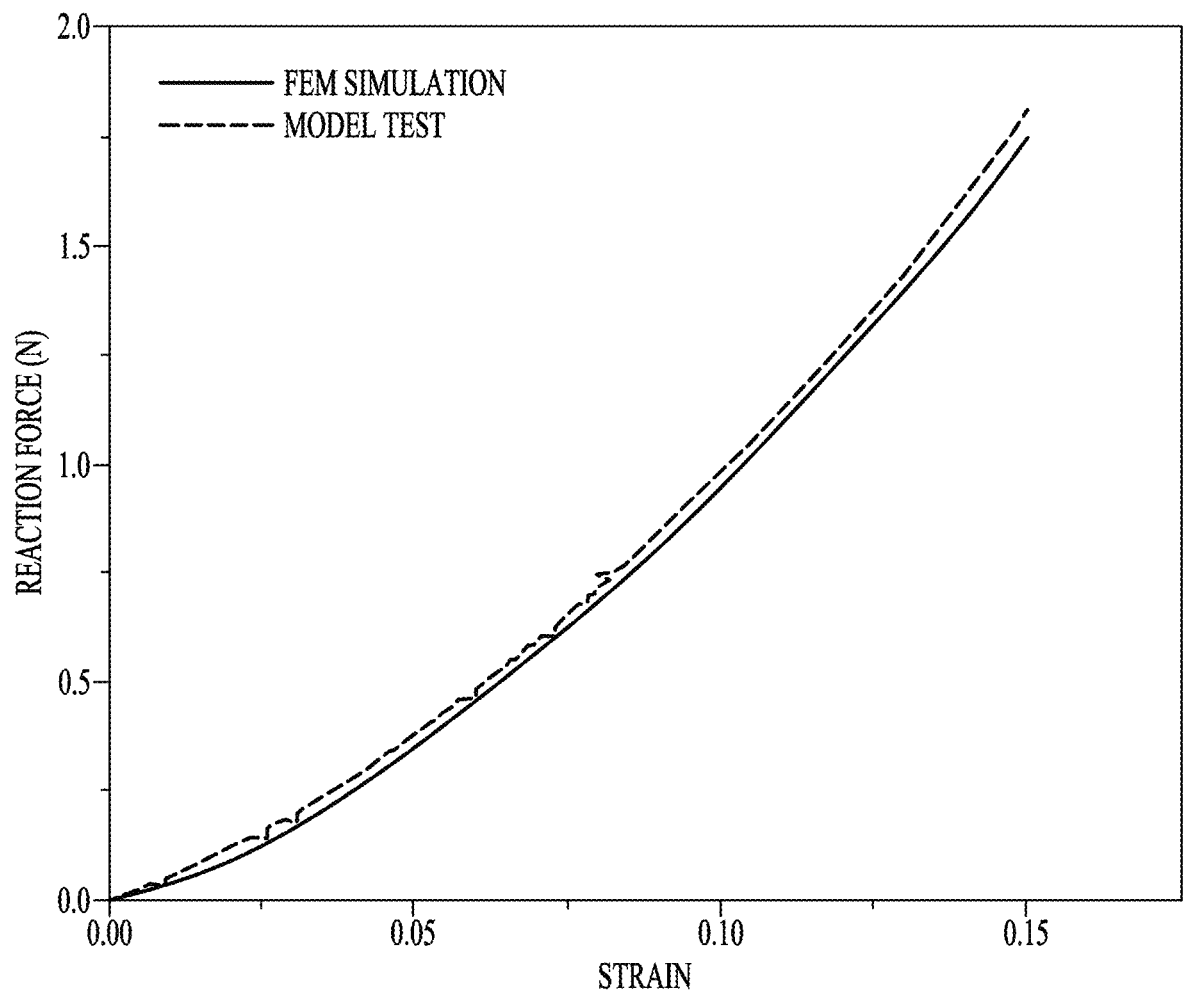
FIG. 3I is a graph of reaction force relative to strain for both the physical 3D printed organ model of FIG. 3C and on the FEM simulation model of FIG. 3G, in accordance with various embodiments of the present disclosure.
Figure 8D:
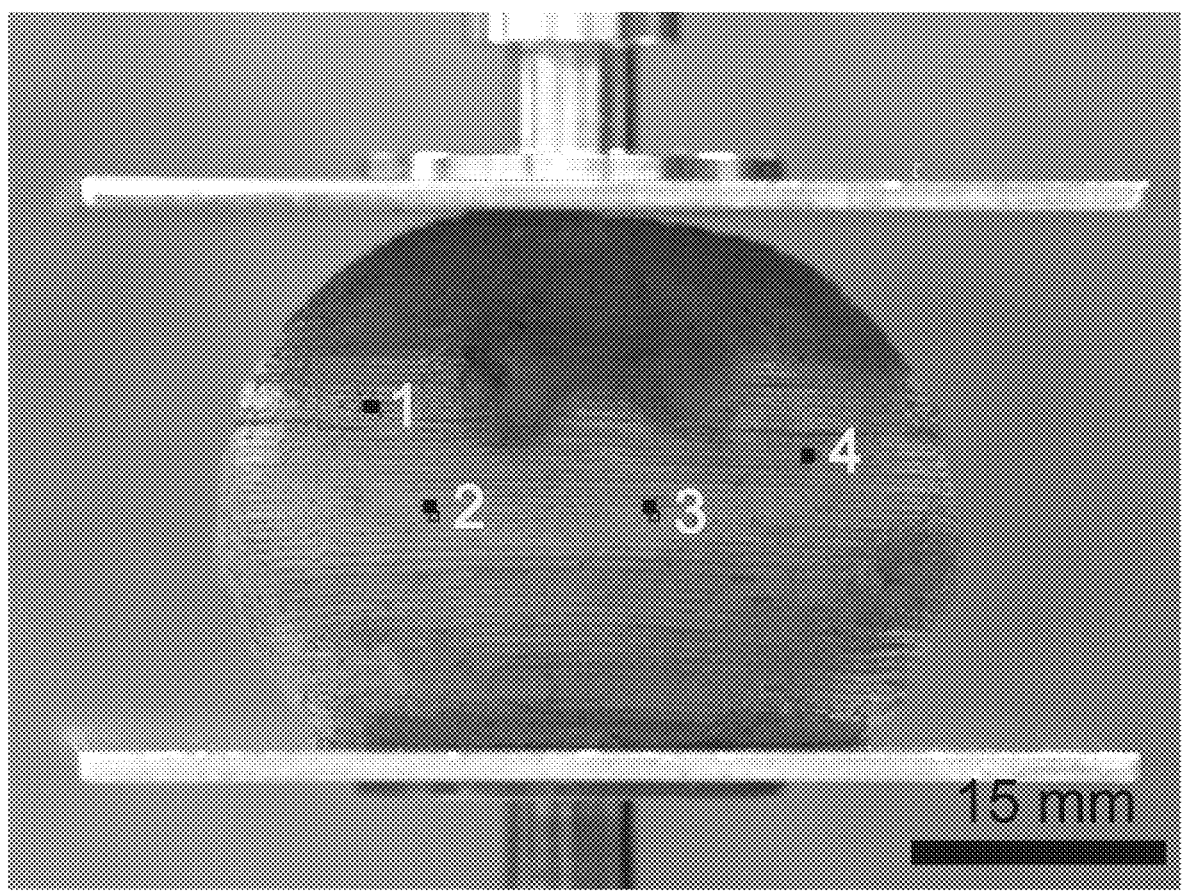
FIG. 8D is a photograph of the 3D printed organ model as in FIG. 3C printed using the same customizable printable polymeric ink as in FIGS. 2F-2I in a non-deformed state with the location of four specified feature dots shown before the model is compressed, in accordance with various embodiments of the present disclosure.
Figure 9A:
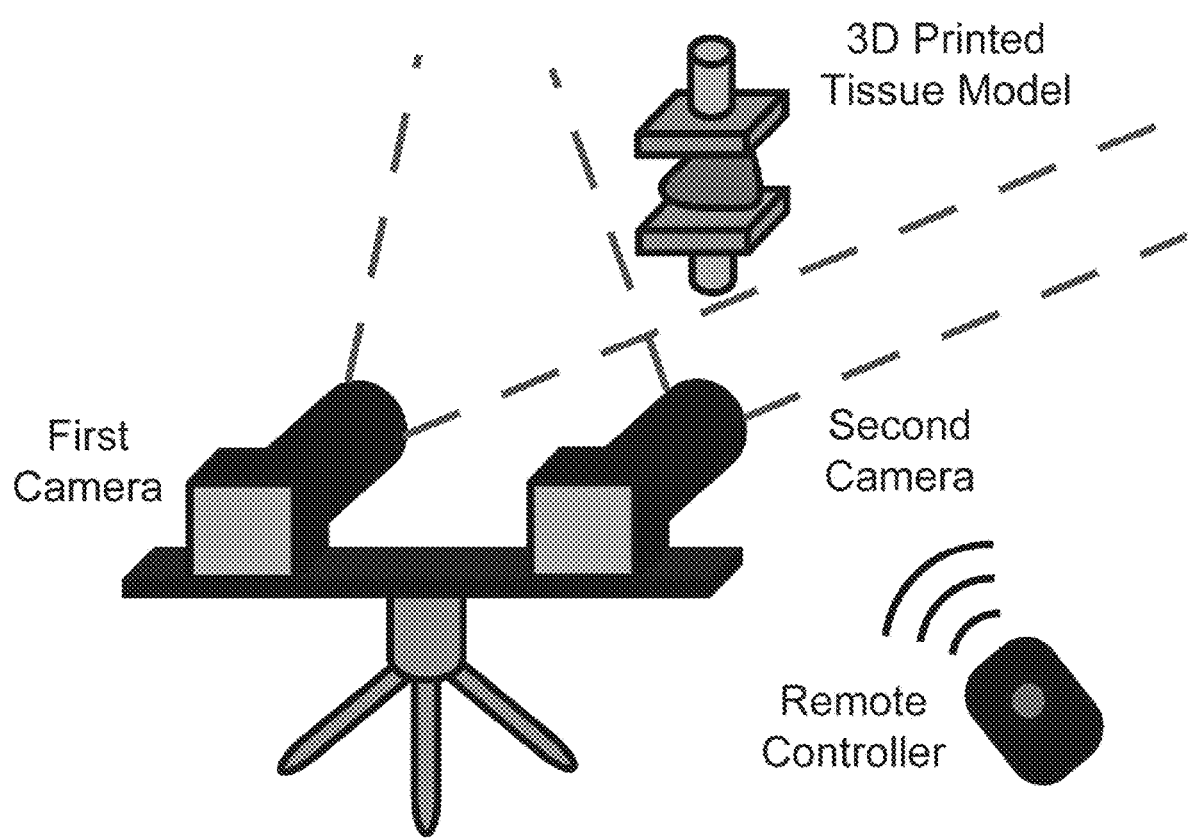
FIG. 9A is a conceptual perspective view of an example system for tracking and analyzing deformation of the 3D printed organ model with feature dots of FIG. 8D using a set of two or more coordinated cameras to capture images or video of the 3D printed organ model during or before and after deformation, in accordance with various embodiments of the present disclosure.
Figure 9B:
FIG. 9B is a photograph of the example system shown schematically in FIG. 9A, in accordance with various embodiments of the present disclosure.

The 3D printed prostate model was subjected to the same conditions as in the simulated compression test "performed" on the FEM model (shown in FIG. 8D). A customized stereo imaging system was designed to track deformation by the printed prostate model (shown in FIG. 9A-9C). Four randomly selected feature dots on the surface of the printed prostate model were tracked on the model before compression (FIG. 8D) and after compression (FIG. 3H). Corresponding feature dots were also located on the FEM simulated model. A 3D scanned model (with surface texture) of the 3D printed prostate was matched to the original CAD model in order to register the feature dots in the FEM simulation (summarized in FIGS. 10A-10C), after which time displacement values for the corresponding feature dots were read from the FEM model, which allowed for a comparison of displacement for the feature dots during the compression test of the printed prostate model with the displacement of the corresponding feature dots on the FEM simulation during the simulated compression test. FIG. 3H is a bar graph showing the simulated displacement for the FEM simulation model during the simulated compression test and the actual displacement for the printed prostate model during the compression test. As can be seen in FIG. 3H, the difference in average displacement for each feature dot was within 10% of the displacement of the simulated feature dots on the FEM simulation model. In addition, a comparison of the measured reaction force versus strain for the printed prostate model compression test to that of the FEM simulation model (FIG. 3I) shows a reaction force for the printed prostate model that is similar to that of the FEM simulation results (e.g., 1.82±0.11 N for the compression test of the printed prostate model versus 1.74 N for the FEM simulation at a strain of 0.15, and 1.04±0.06 N for the compression test of the printed prostate model versus 1.02 N for the FEM simulation at a strain of 0.10). These results demonstrate the feasibility of utilizing a 3D printed organ model as described herein for organ physical behavior prediction.

The Use of the Printed Organ Model for Procedure Rehearsal

The high degree of fidelity for the material properties of the final polymer structure printed using the customizable printable inks described herein, and the high degree of anatomical fidelity that can be achieved, indicates that an organ model formed according to the concepts described herein can be used for rehearsal of a medical or surgical procedure to be performed on the actual organ in the patient.

Figure 4A:
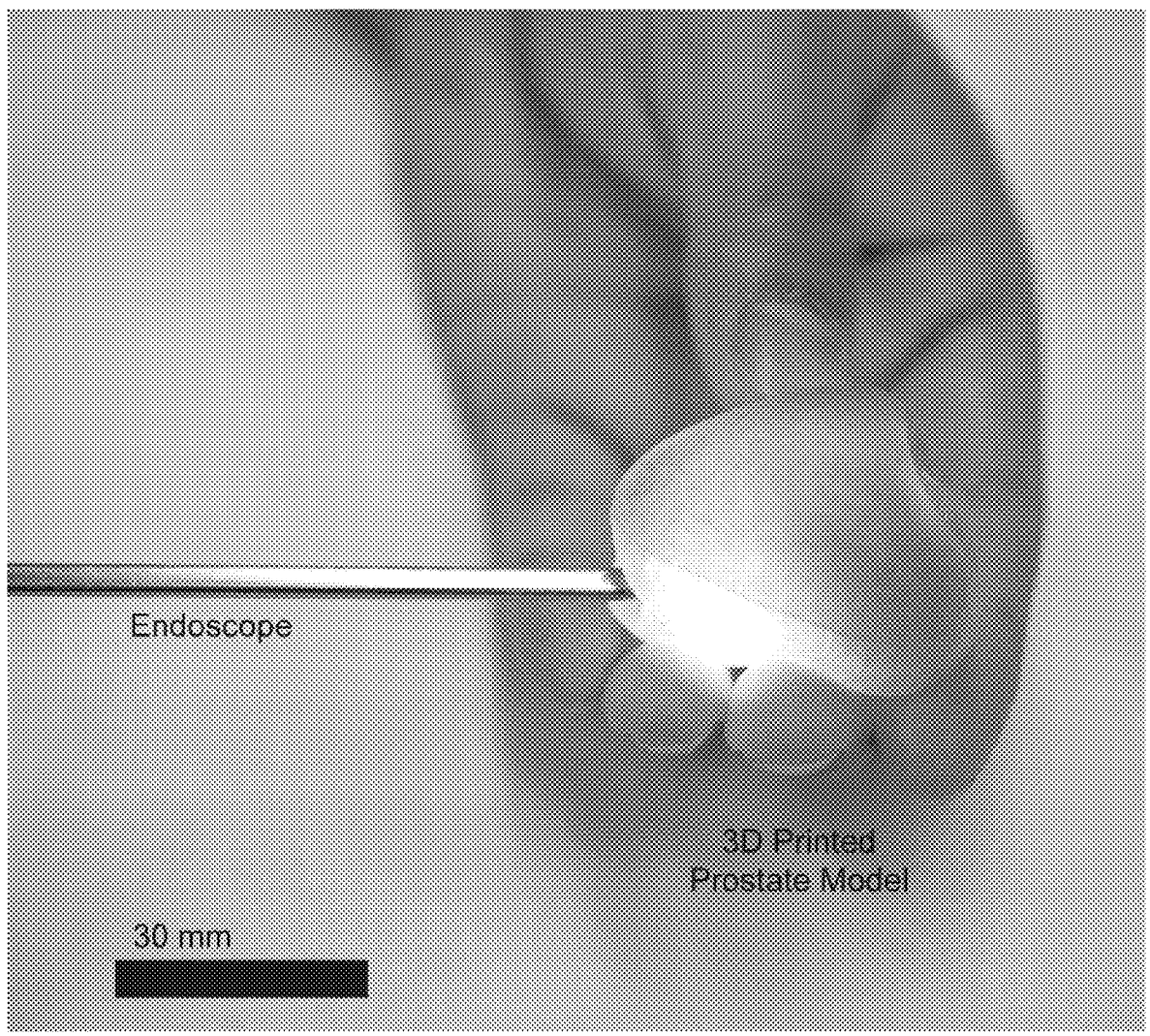
FIG. 4A is a photograph of an example surgical procedure including inserting an endoscope into a model urethra of the example 3D printed organ model of FIG. 3C, in accordance with various embodiments of the present disclosure.
Figure 4B:
FIG. 4B is a photograph of an example endoscope view inside the model urethra of the example 3D printed organ model of FIG. 3C, in accordance with various embodiments of the present disclosure.
Figure 11:
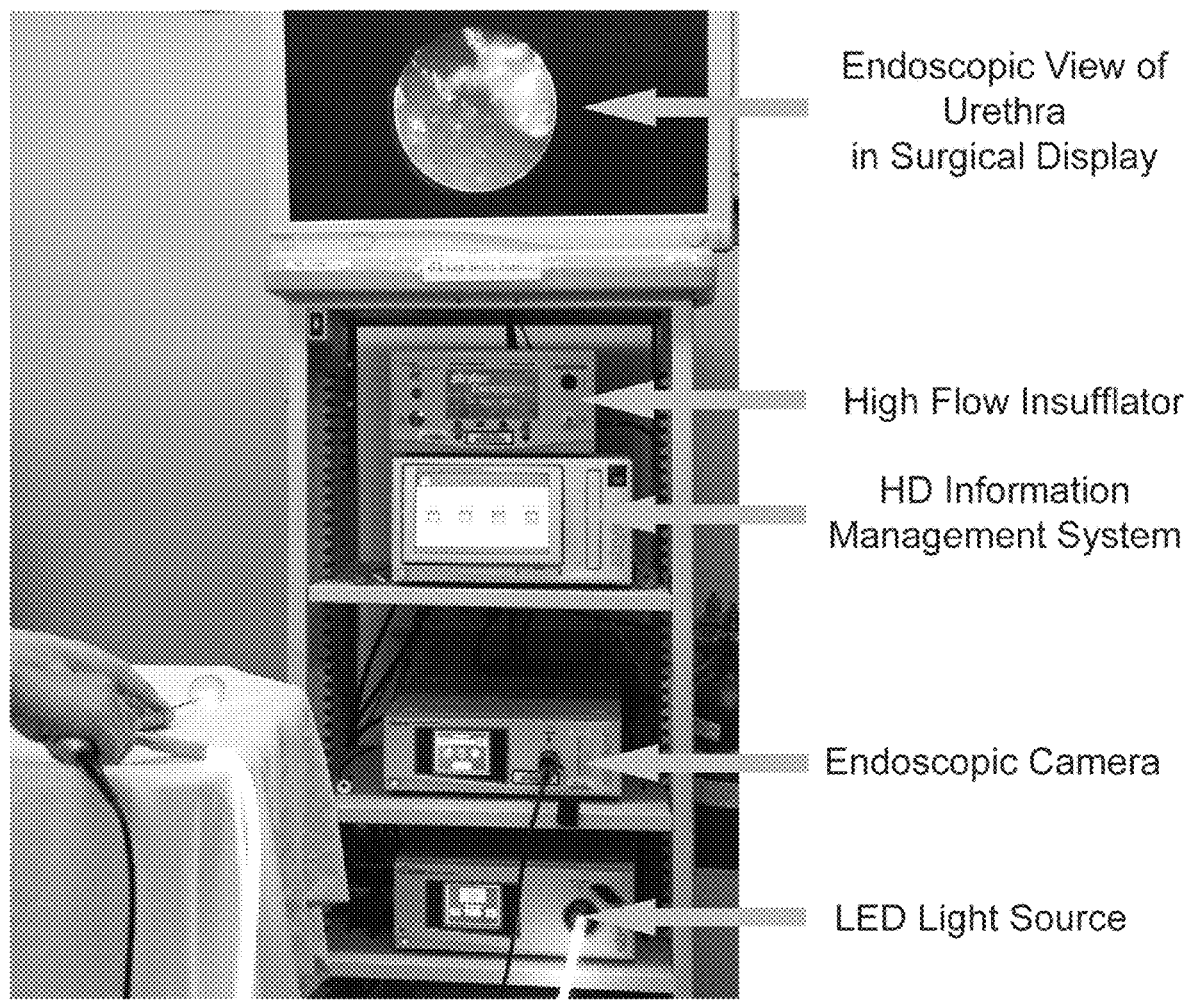
FIG. 11 is a photograph of an example endoscope station during a surgical rehearsal procedure including applying an endoscope to the example 3D printed organ model of FIG. 3C or FIG. 8D, in accordance with various embodiments of the present disclosure.

As an example of the usefulness of the organ models described herein for the purpose of procedure rehearsal, the printed prostate model example described above was subjected to a procedure that is common for the human prostate—examination with an endoscope. Specifically, an endoscope was applied to a urethra channel that had been printed into the printed prostate model (e.g., by printing a sacrificial support material to form a supporting cylinder around which the ink was printed). FIGS. 4A and 11 show photographs of the example procedure of inserting the endoscope into the urethra in the printed prostate model. To further enhance the effectiveness of the model as a surgical aid, this endoscopic procedure was repeated with the printed prostate model embedded in a kidney-urethra-bladder (KUB) model (shown in FIG. 12), which was originally developed at the Center for Research in Education and Simulation Technologies (CREST) at the University of Minnesota (now part of the University of Washington), and that is described in "The CREST Simulation Development Process: Training the Next Generation," published in Volume 31, Issue S1 of the Journal of Endourology on Apr. 1, 2017 (published online on Dec. 22, 2016), the disclosure of which is incorporated by reference herein in its entirety. Due to the matching physical properties of the printed prostate model with human prostate tissue, the endoscope can be easily inserted into the urethra to obtain an endoscopic view for any region of the urethra's inner surface, even under conditions of pressing or squeezing, as is shown in the example endoscope camera view in FIG. 4B. The endoscopic view from the 3D printed prostate model shows the unfilled prostatic urethra in the patient's MRI which is neither dilated by the endoscope, nor filled by irrigating fluid and urine. Thus, this application suggests the effectiveness of these organ models in assisting medical professionals for more efficient planning and rehearsal from organ inner channels via the use of an endoscope.

Figure 4C:
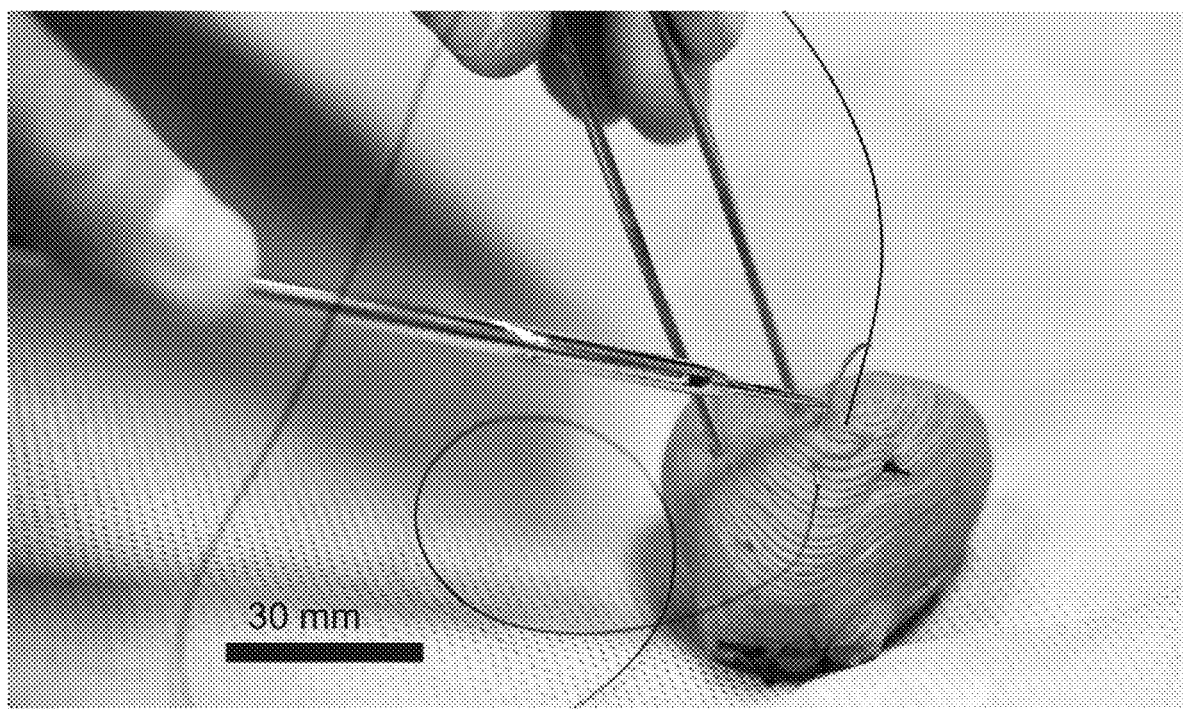
FIG. 4C is a photograph of an example suturing procedure being performed on the example 3D printed organ model of FIG. 3C, in accordance with various embodiments of the present disclosure.

A second rehearsal procedure was performed that included suturing the printed prostate model with the aid of a surgeon, as shown in FIG. 4C. Although this is not a common procedure for the human prostate, the ability to be sutured indicates that 3D printed organ models according to the present disclosure exhibit sufficiently good strength to avoid excessive damage during invasive surgical procedures, such as needle penetration. Furthermore, feedback from the surgeon indicated that the printed prostate model remained robust during suturing, it did not exhibit any tearing, and the surgical knot did not pull through the final printed polymer.

Integrated Electronic Device

In addition to the organ models printed from the customizable printable inks described herein, the organ models of the present description can include one or more electronic devices that can be incorporated into or onto the 3D printed organ model in order to provide one or more desired functionalities to the organ model, such as sensing, actuation (e.g., to simulate movement and dynamic function of the actual organ under certain conditions), or energy harvesting. In some examples, the electronic devices described herein can be conformally integrated into a printed organ model or onto a surface of the printed organ model.

As used herein, the term "integrated," when referring to an electronic device, refers to the device being included with or adjacent to one or more structures of a 3D printed organ model. "Integrated" can refer to a process where the device is formed separately from the organ model, and then coupled into or onto the organ model after the device has been formed. "Integrated" can also refer to a process where the electronic device is also formed by 3D printing, and the printing of the device is combined into or included as part of the overall method of printing the organ model such that the device is printed into or onto the final printed polymer of the organ model or onto or with the ink that forms the final printed polymer. Examples of types of transduction mechanisms for the electronic device that can be incorporated into or onto the organ model include, but are not limited to, capacitive, resistive, piezoresistive, piezoelectric, magnetic, inductive, and optical.

As used herein, a "capacitive device" refers to an electronic device that functions based on measuring the changes in capacitance of the device due to an external stimuli. In an example, a capacitive device can comprise a capacitive sensor to measure proximity, position, displacement, force, humidity, fluid level, or acceleration.

As used herein, a "resistive device" refers to an electronic device that functions based on measuring changes in electrical resistance due to an external stimuli. In an example, a resistive device can comprise a resistive sensor to measure strain, force, pressure, and temperature.

As used herein, a "piezoresistive device" refers to an electronic device that utilizes the piezoresistive effect (e.g., a material or device that exhibits a change in electrical resistance when subjected to mechanical strain). In an example, a piezoresistive device can comprise a piezoresistive sensor to measure mechanical stress or change in position.

As used herein, a "piezoelectric device" refers to an electronic device that utilizes the piezoelectric effect (e.g., a material or device that exhibits a change in electric charge in response to applied mechanical stress). In an example, a piezoelectric device can comprise a piezoelectric sensor to measure pressure, force, strain, acceleration, or temperature.

As used herein, the term "magnetic device" refers to a device that functions based on measuring changes in a magnetic field. In an example, a magnetic device can include a magnetic sensor to measure mechanical stress, force, or contact detection.

As used herein, the term "inductive device" refers to an electronic device that uses changes in inductance or inductive coupling. In an example, an inductive device can comprise an inductive sensor to measure position or force.

As used herein, the term "optical device" refers to an electronic device that uses light radiation (either visible, infrared, or ultraviolet), and in particular can refer to a device that converts light waves into an electrical signal. In an example, an optical device can comprise an optical sensor to measure pressure, force, strain, location, and contact.

3D Printed Sensor

Figure 4D:
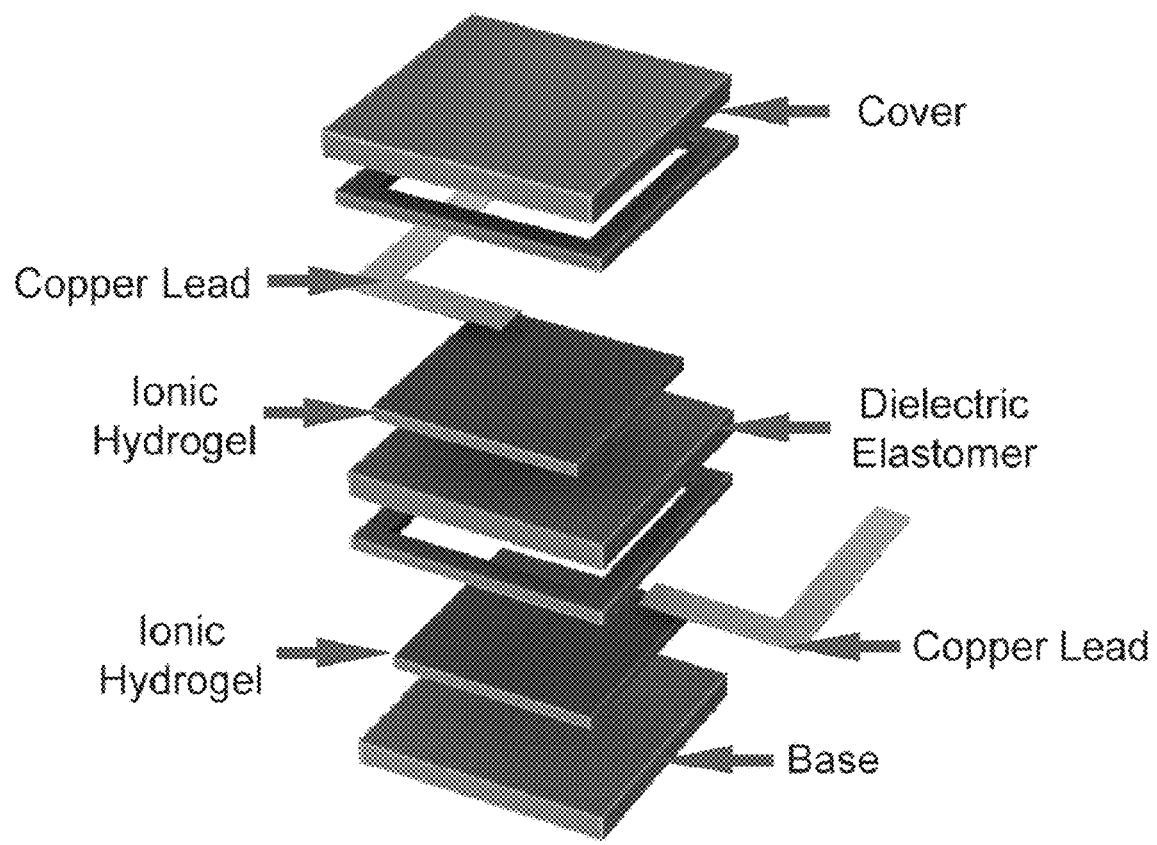
FIG. 4D is a schematic diagram and a photograph of an example 3D printed sensor that can be incorporated into the 3D printed organ model of FIG. 3C, in accordance with various embodiments of the present disclosure.
Figure 4D:
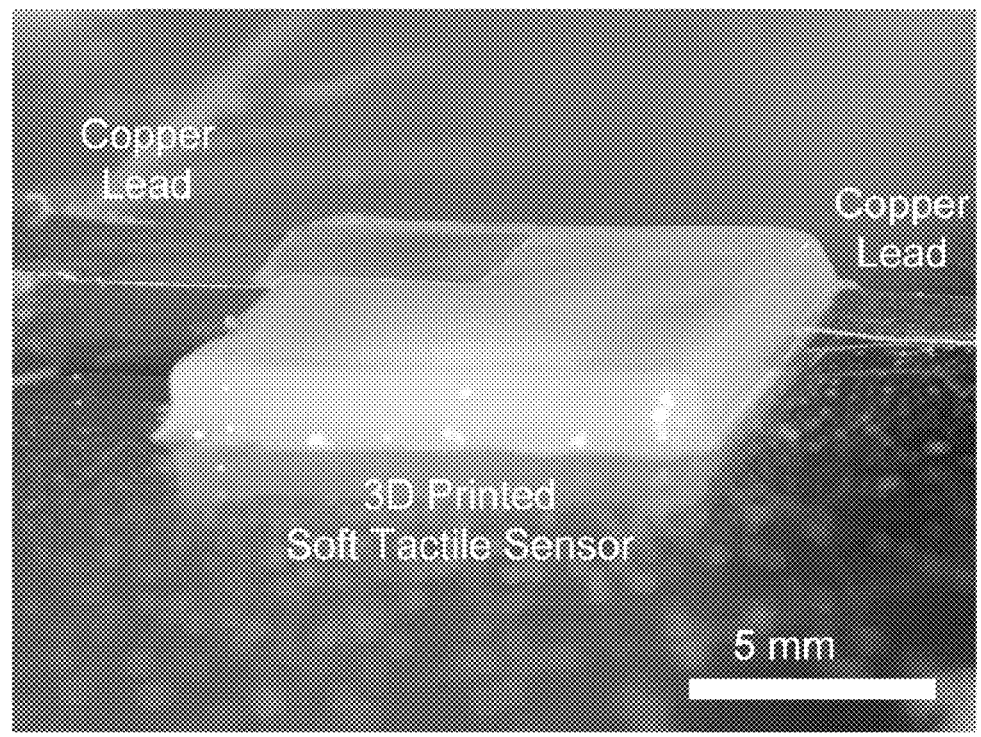

In an example, the electronic device comprises a 3D printed device, such as a 3D printed sensor. An example 3D printed sensor (also referred to as a "printed sensor" or simply as "the sensor") is shown in FIG. 4D. Both an exploded view of the printed sensor (top drawn view in FIG. 4D) and an assembled view of the sensor (bottom photograph in FIG. 4D) are shown. In an example, the sensor comprises one or more printable conductive structures, such as an ionic hydrogel structure, that is printed to be adjacent to a printed dielectric elastomer. Each of the one or more printable ionic hydrogel structures can form the compliant electrodes of the sensor, while the printable dielectric elastomer can form the electroactive component of the sensor. In an example, the sensor includes a set of two or more ionic hydrogel structures positioned on opposite sides of the dielectric elastomer, such as with the sandwich structure shown in FIG. 4D with a first ionic hydrogel layer on a first side of the dielectric elastomer and a second ionic hydrogel layer on a second side of the dielectric elastomer, such that the first ionic hydrogel layer forms a first electrode and the second ionic hydrogel layer forms a second electrode.

A lead can be electrically connected to each electrode (e.g., a lead connected to each ionic hydrogel structure), such as a copper lead. In an example, at least one of the leads can be placed into position to be in electrical contact with its corresponding electrode (that is a copper lead can be placed so that it is in electrical contact with one of the ionic hydrogel layers, or so that it will be in electrical contact once the hydrogel material is printed. In an example, each ionic hydrogel structure is formed from a polyacrylamide-based printable ionic hydrogel material. In an example, the dielectric elastomer is formed from a silicone-based printable material. In an example of the printed sensor, the hydrogel electrodes and the dielectric elastomer layer were found to have elastic moduli of 11.05±2.97 kPa and 75.47±12.65 kPa at 100% strain rate, respectively.

It was also found that the polyacrylamide-based printable ionic hydrogel material that forms the one or more hydrogel electrodes and the silicone-based printable material that forms the dielectric elastomer both exhibit shear thinning behavior, which facilitates printing via a similar 3D printing process as was used to form the printed polymer structure from the printable inks described above. In an example, a silicone cover and a silicone base were also added on the top and bottom of the hydrogel-dielectric sandwich structure described above to facilitate handling and longevity of the sensor.

Further details of the materials and methods for 3D printing a sensor like the tactile sensor described herein is described in U.S. patent application Ser. No. 15/107,770, filed on Dec. 19, 2014 and entitled "PRINTABLE ELASTOMER MATERIALS," which was published on Nov. 3, 2016 as U.S. Publication No. 2016/0319150 A1, and in Robinson, Sanlin S., et al., "Integrated soft sensors and elastomeric actuators for tactile machines with kinesthetic sense." Extreme Mechanics Letters, vol. 5 (2015), at pp. 47-53, the disclosures of which are incorporated by reference herein in their entirety.

Figure 4E:
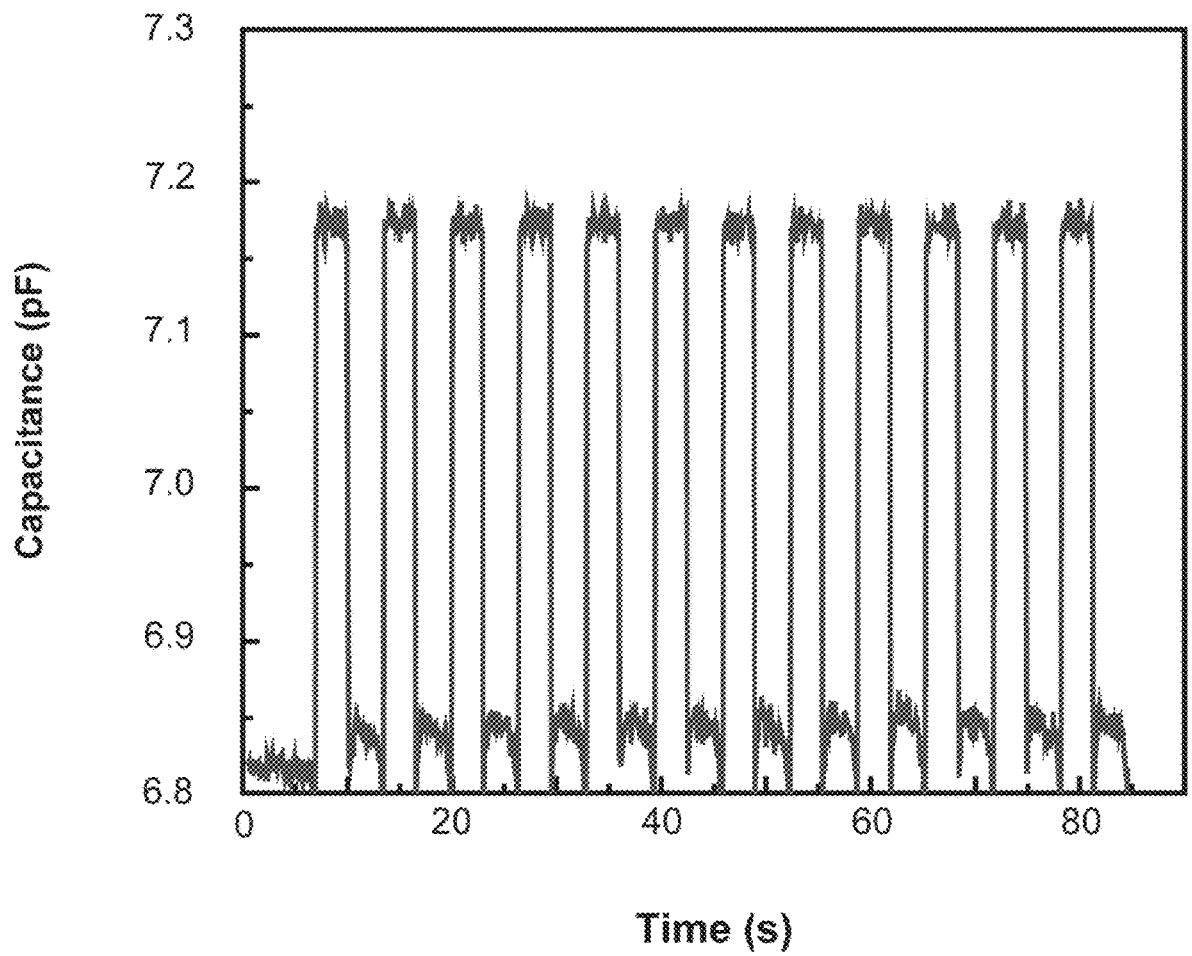
FIG. 4E is a graph of measured capacitance of the example 3D printed sensor of FIG. 4D over time during a test where 50 kPa of pressure is cyclically applied to the 3D printed sensor, in accordance with various embodiments of the present disclosure.
Figure 4F:
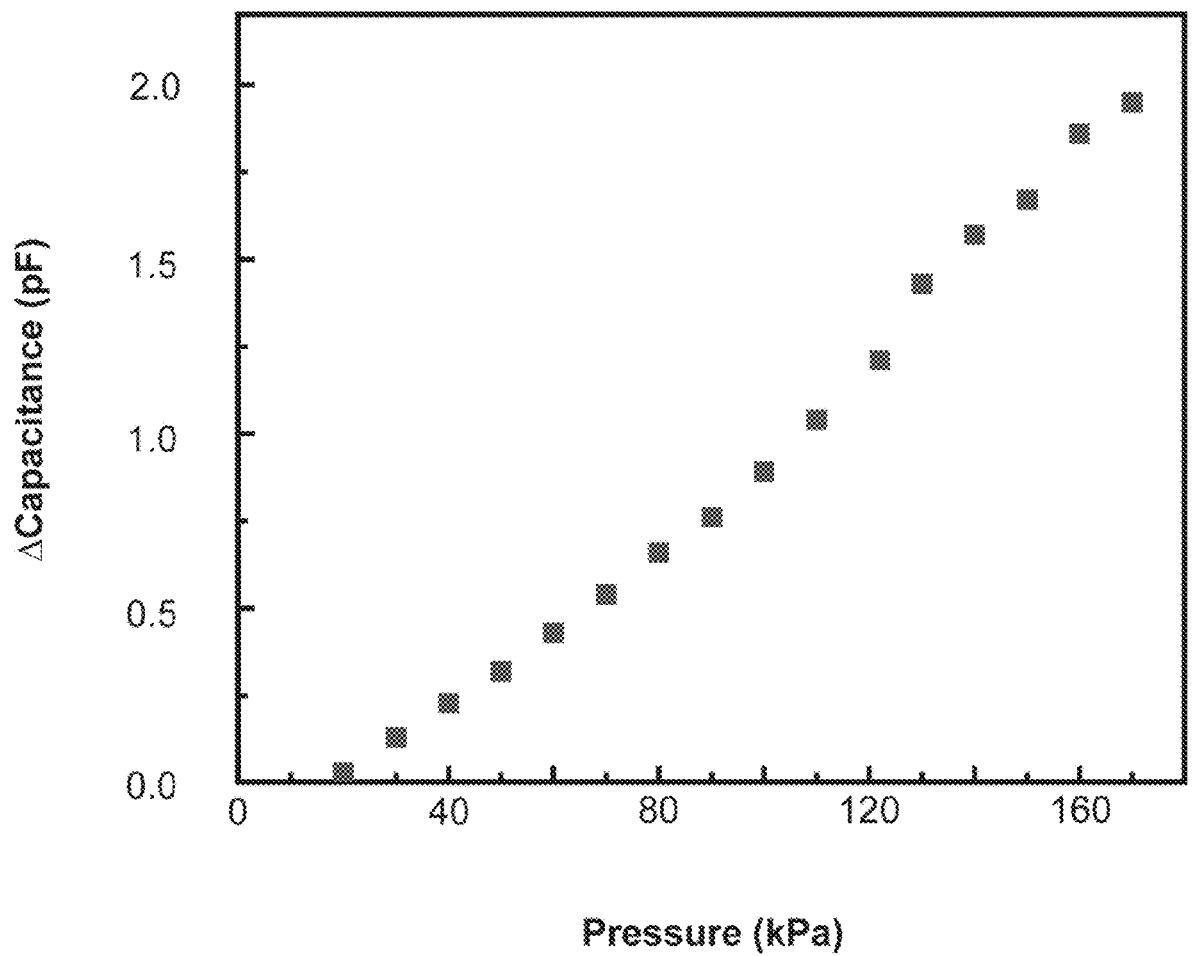
FIG. 4F is a graph showing measured capacitance of the example 3D printed sensor of FIG. 4D at various specified pressures applied to the 3D printed sensor in order to calibrate the sensor for use in measuring applied pressure, in accordance with various embodiments of the present disclosure.
Figure 13A:
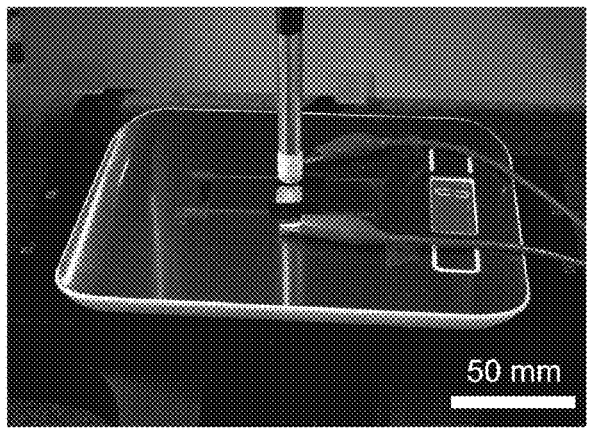
FIGS. 13A and 13B are photographs of a system for calibrating the example 3D printed sensor of FIG. 4D before and under pin compression, respectively, in order to calibrate the sensor, in accordance with various embodiments of the present disclosure.
Figure 13B:
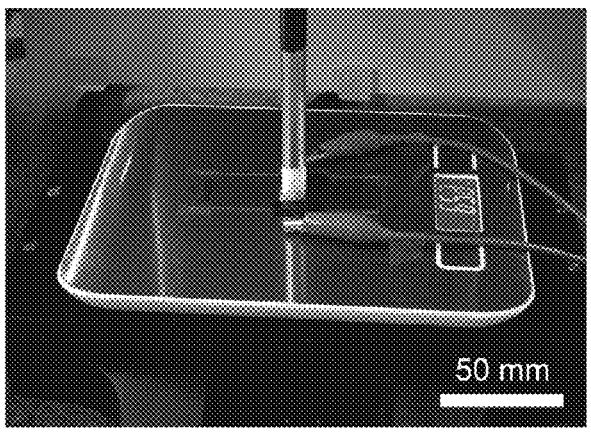

The example sensor shown in FIG. 4D had the dimensions of about 10 mm×about 10 mm×about 1.2 mm (length (L)×width (W)×thickness (T)). Upon the application of external pressure to the sensor, the dielectric elastomer experiences a deformation, such as a compression of the thickness (T) and an expansion in area (e.g., an increase in one or both of the length (L) and the width (W)), which results in a change in the device's capacitance. After printing, the sensor was calibrated using pin compression under various applied pressures (as shown in FIGS. 13A and 13B). The response of the sensor exhibited excellent repeatability in terms of capacitance change under applied pressure. For example, FIG. 4E shows the sensor's capacitance response under a demonstration example where cyclical and repeated application of 50 kPa of pressure was applied to the sensor. The example sensor's capacitance change relative to the applied pressure exhibited a linear correlation at a pressure range of from about 20 kPa to about 120 kPa, as shown in FIG. 4F. The reliable repeatability of the calibration data shows that the example sensor can be used to calculate the pressure applied to the tactile sensor by measuring the corresponding changes in capacitance.

Figure 4G:
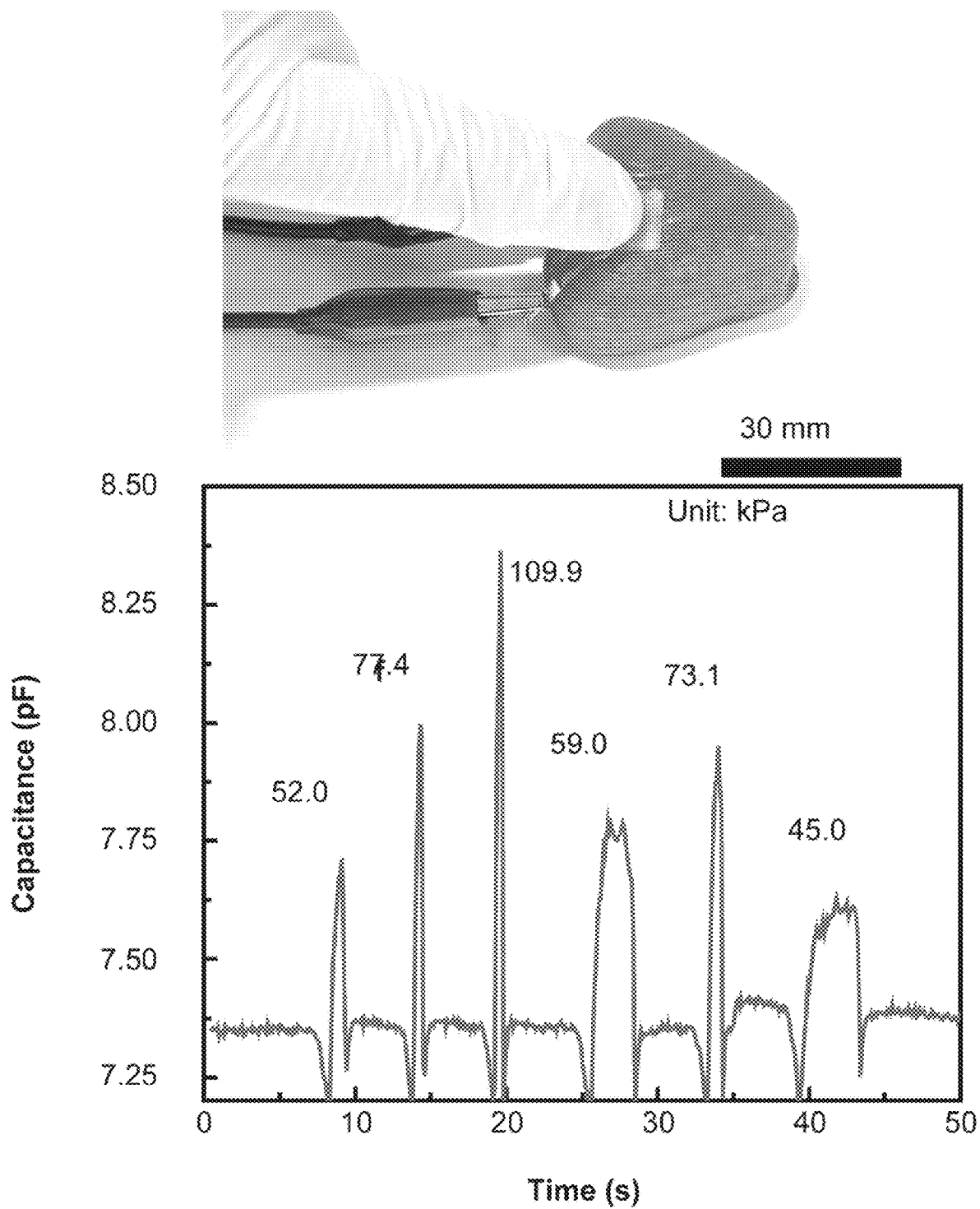
FIG. 4G includes a photograph of a surgical rehearsal procedure where the example 3D printed organ model of FIG. 3C is palpated with a user's finger, and a graph showing the resulting responses for the capacitance of an example 3D printed sensor that is integrated with an outer surface of the 3D printed organ model, in accordance with various embodiments of the present disclosure.
Figure 4H:
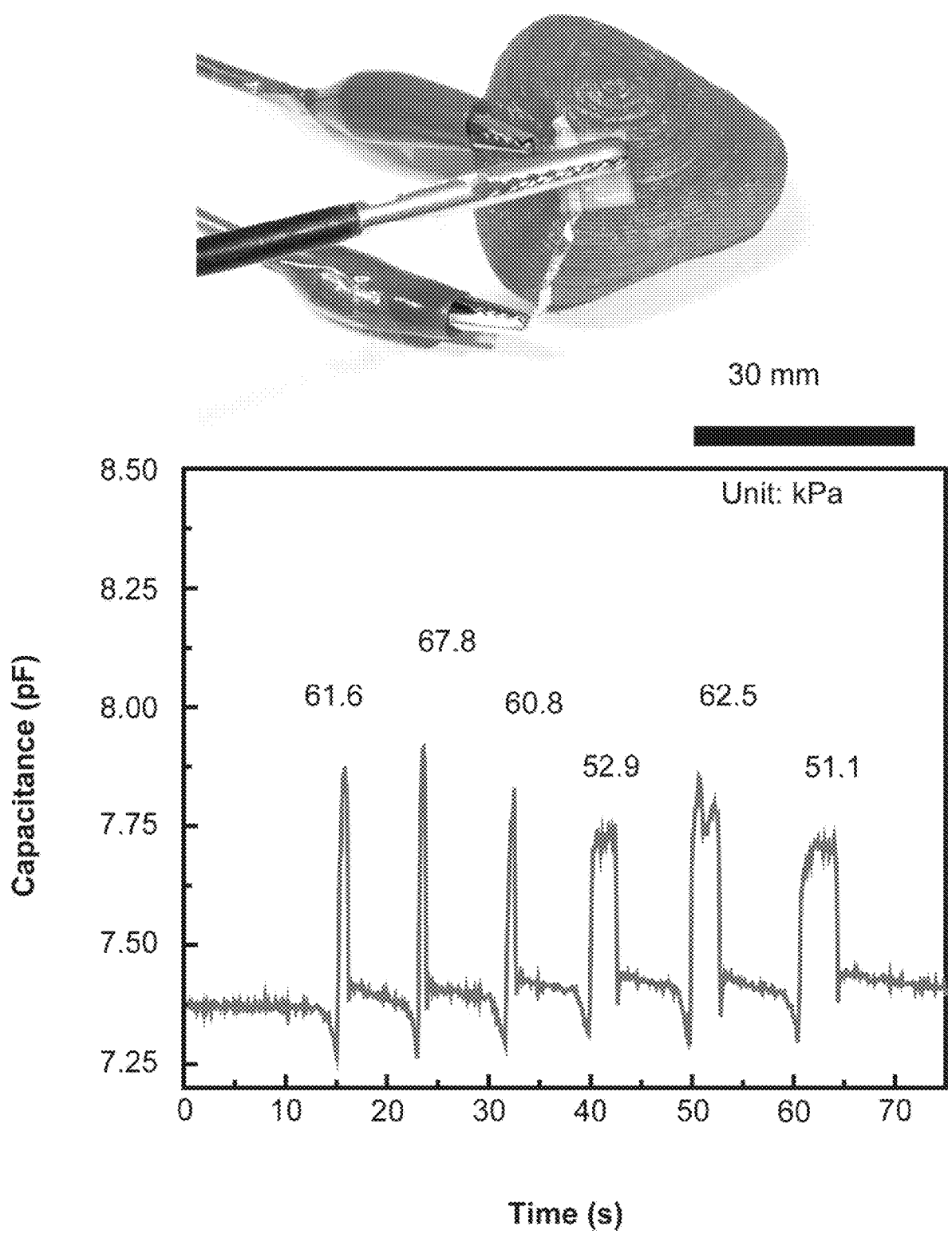
FIG. 4H includes a photograph of a surgical rehearsal procedure where a surgical grasper was applied on the 3D printed organ model of FIG. 3C, and a graph showing the resulting responses for the capacitance of an example 3D printed sensor that is integrated with an outer surface of the 3D printed organ model, in accordance with various embodiments of the present disclosure.
Figure 4I:
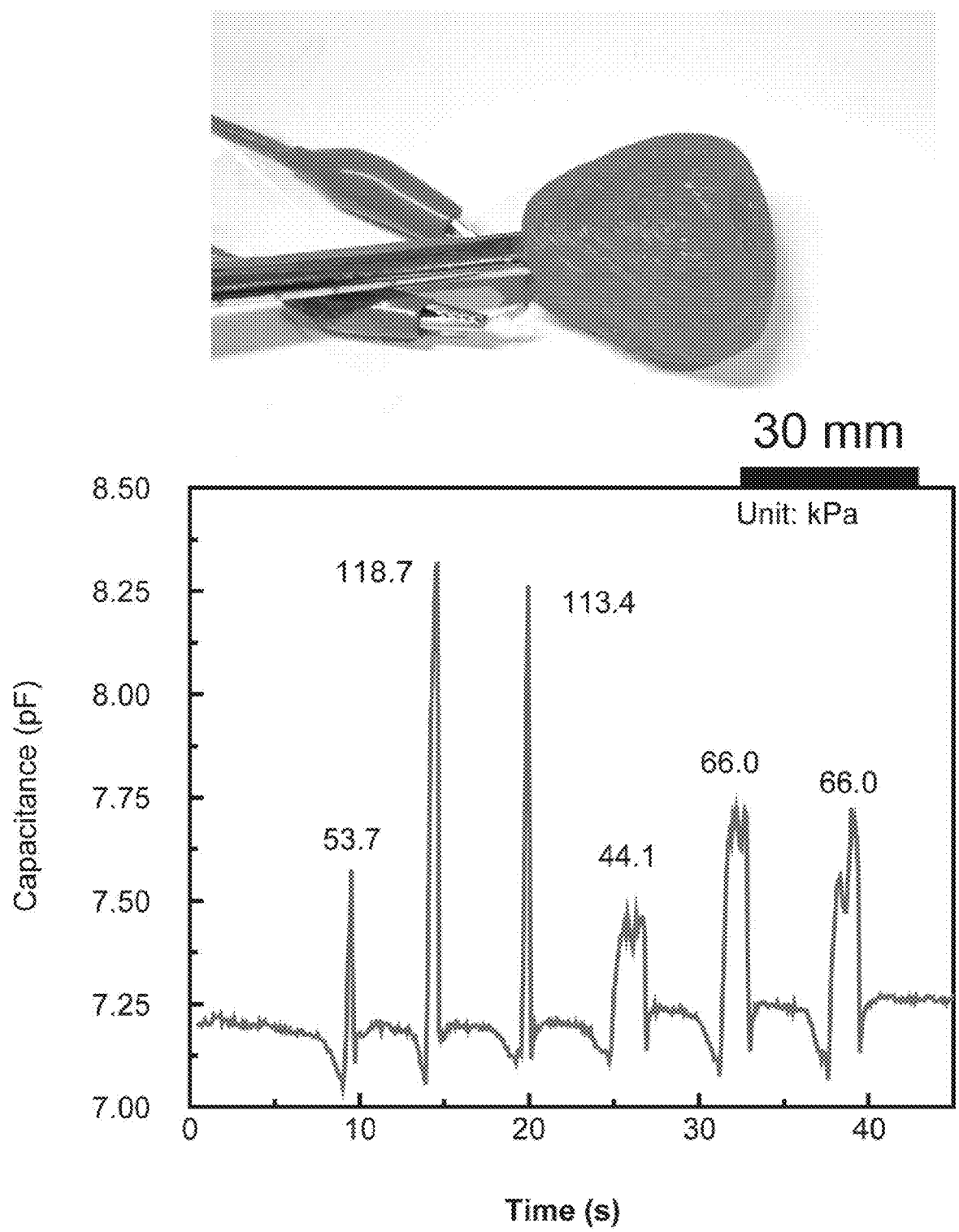
FIG. 4I includes a photograph of a surgical rehearsal procedure where an endoscope is inserted into the 3D printed organ model of FIG. 3C, and a graph showing the resulting responses for the capacitance of an example 3D printed sensor that is integrated with a urethra surface inside of the 3D printed organ model, in accordance with various embodiments of the present disclosure.
Figure 4J:
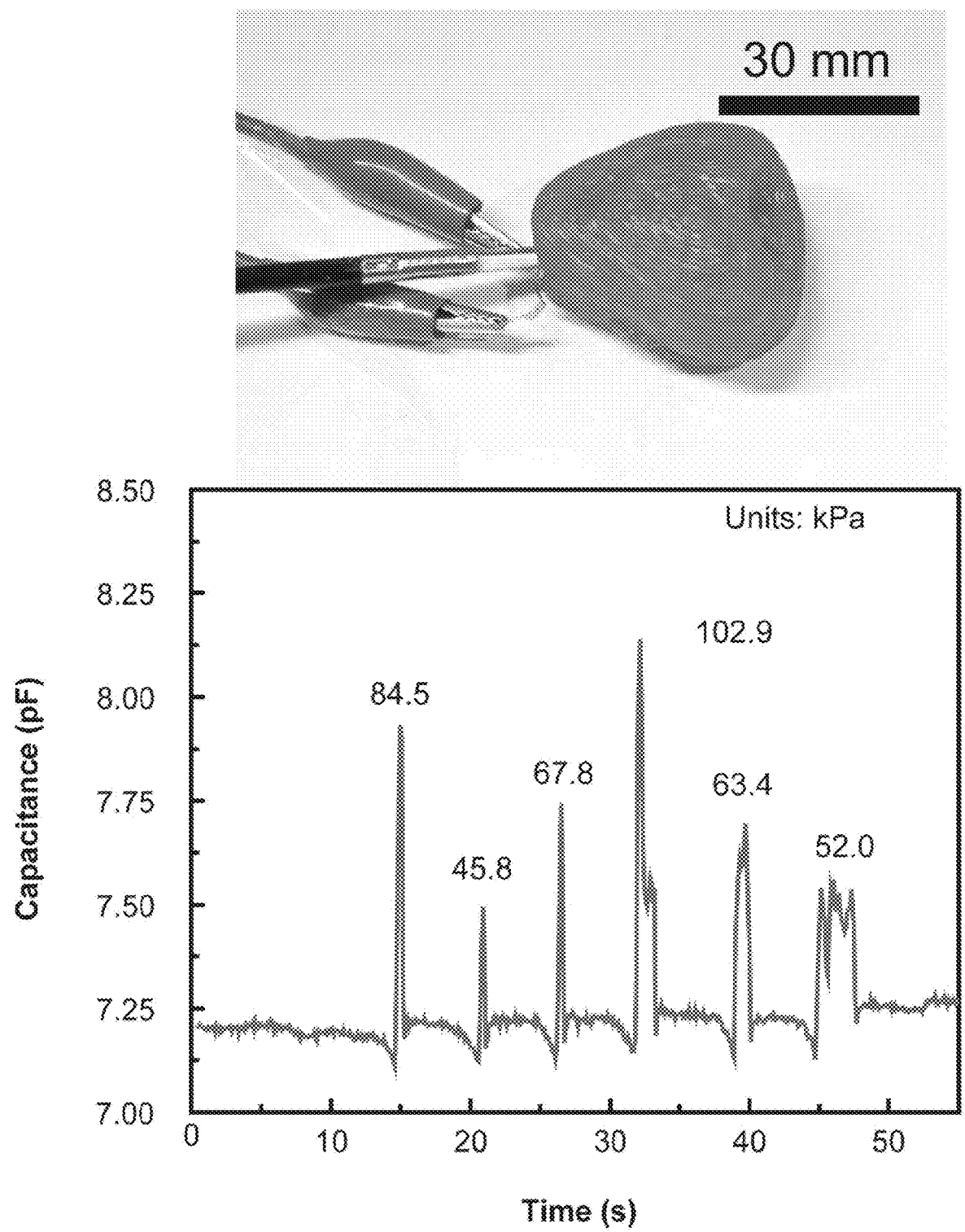
FIG. 4J includes a photograph of a surgical rehearsal procedure where surgical scissors are inserted into the 3D printed organ model of FIG. 3C, and a graph showing the resulting responses for the capacitance of an example 3D printed sensor that is integrated with a urethra surface inside of the 3D printed organ model, in accordance with various embodiments of the present disclosure.
Figure 14A:
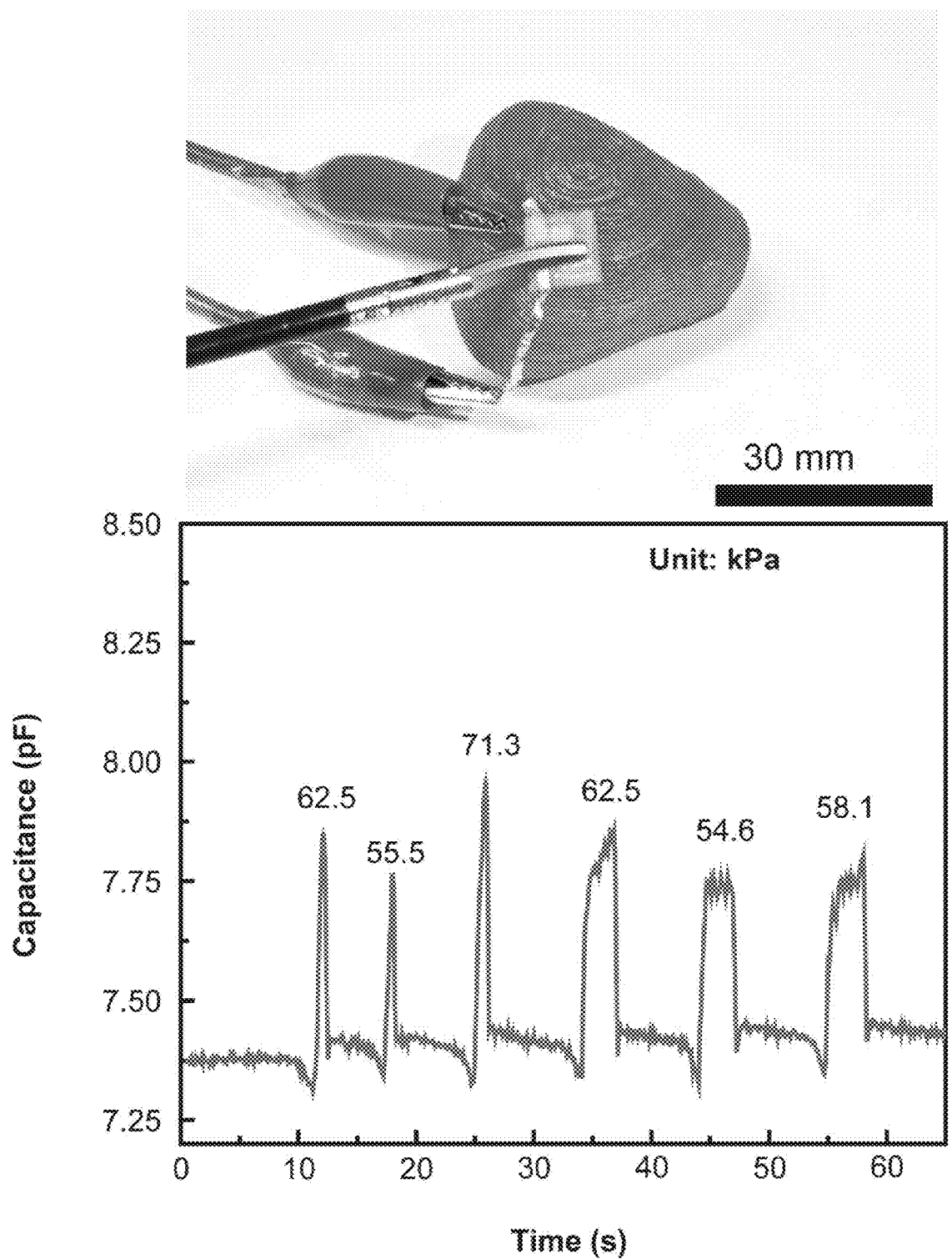
FIG. 14A is a photograph of an example surgical rehearsal procedure that includes applying surgical scissors to the 3D printed organ model of FIG. 3C or FIG. 8D and a graph of the capacitance recorded during said procedure of an example 3D printed sensor integrated with an outer surface of the 3D printed organ model, in accordance with various embodiments of the present disclosure.
Figure 14B:
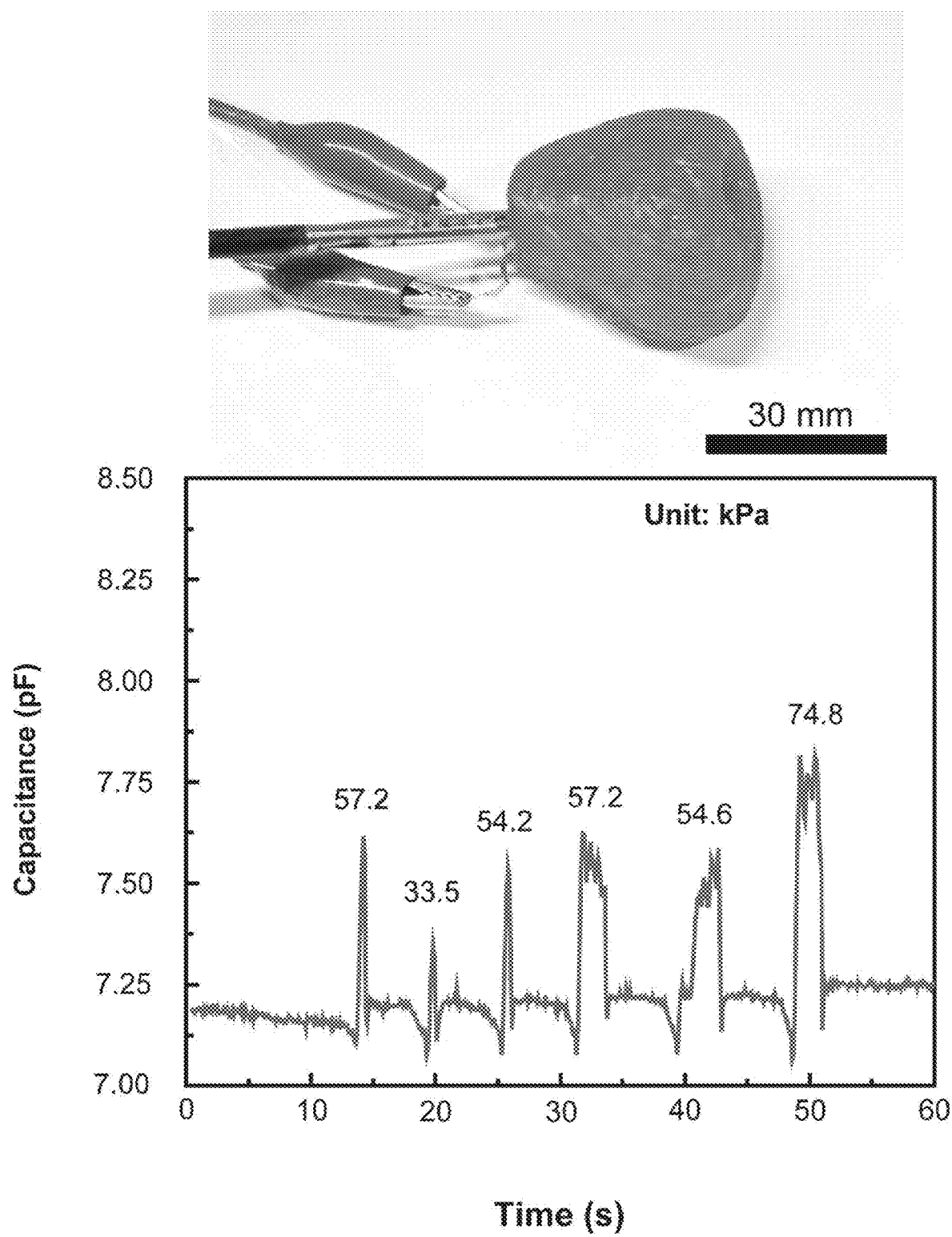
FIG. 14B is a photograph of an example surgical rehearsal procedure that includes applying a surgical grasper to the 3D printed organ model of FIG. 3C or FIG. 8D and a graph of the capacitance recorded during said procedure of an example 3D printed sensor of FIG. 4D that has been integrated onto a urethra surface inside the 3D printed organ model, in accordance with various embodiments of the present disclosure.
Figure 15A:
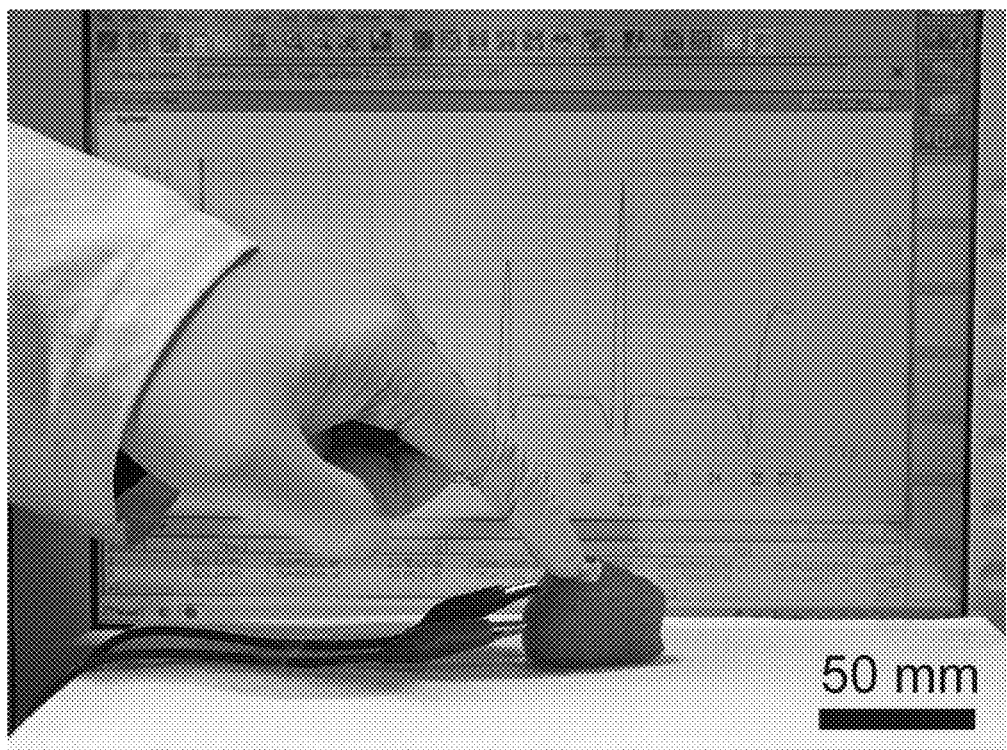
FIGS. 15A-15C are photographs of example real-time surgical rehearsal procedures on the 3D printed organ model of FIG. 3C or FIG. 8D including palpating the organ model with a user's finger (FIG. 15A), applying a surgical grasper to the outer surface of the organ model (FIG. 15B), and applying surgical scissors to the outer surface of the organ model (FIG. 15C), and the corresponding change in capacitance of an example 3D printed sensor that is integrated with an outer surface of the 3D printed organ model, in accordance with various embodiments of the present disclosure.
Figure 15B:
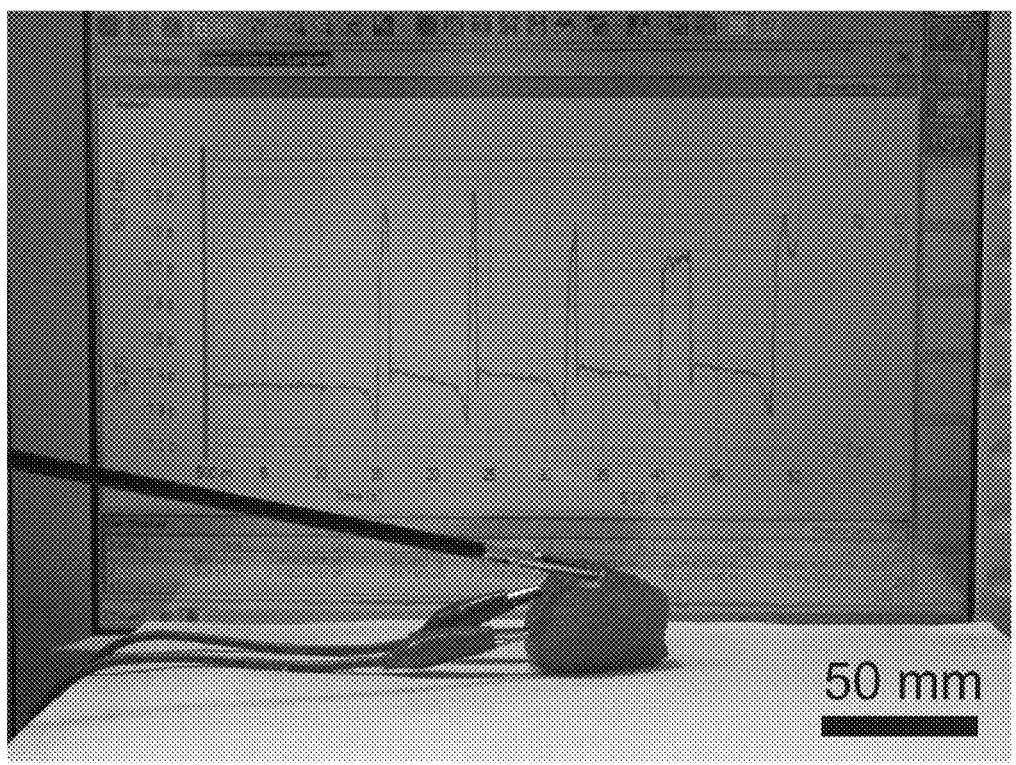
Figure 15C:
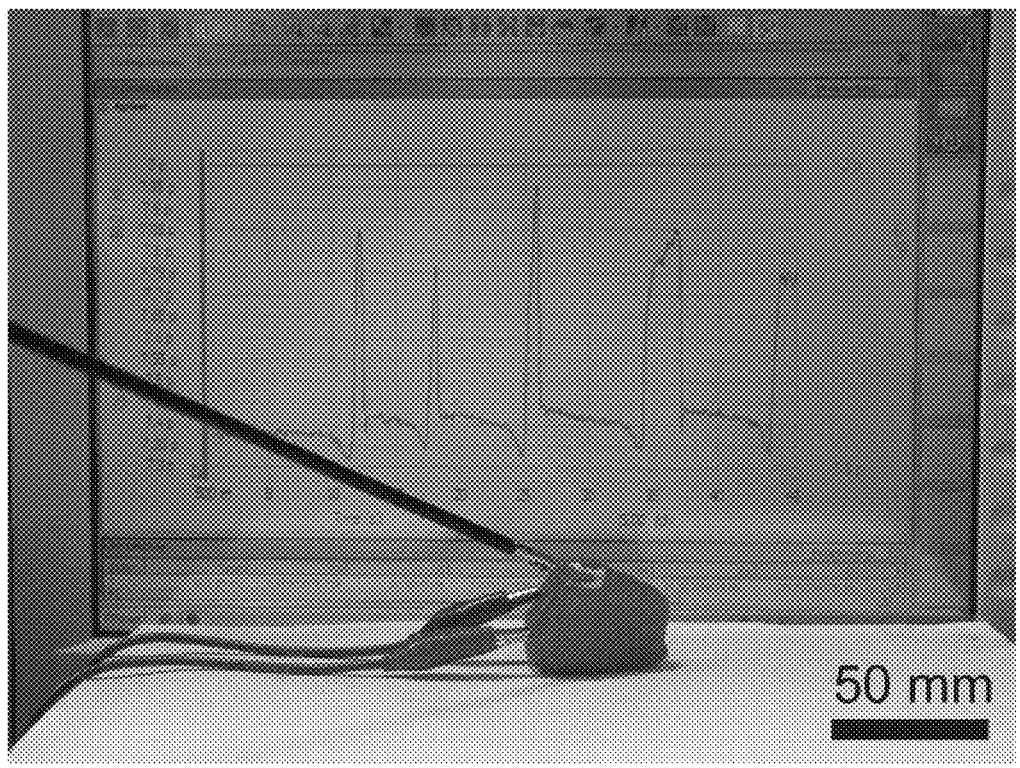
Figure 15D:
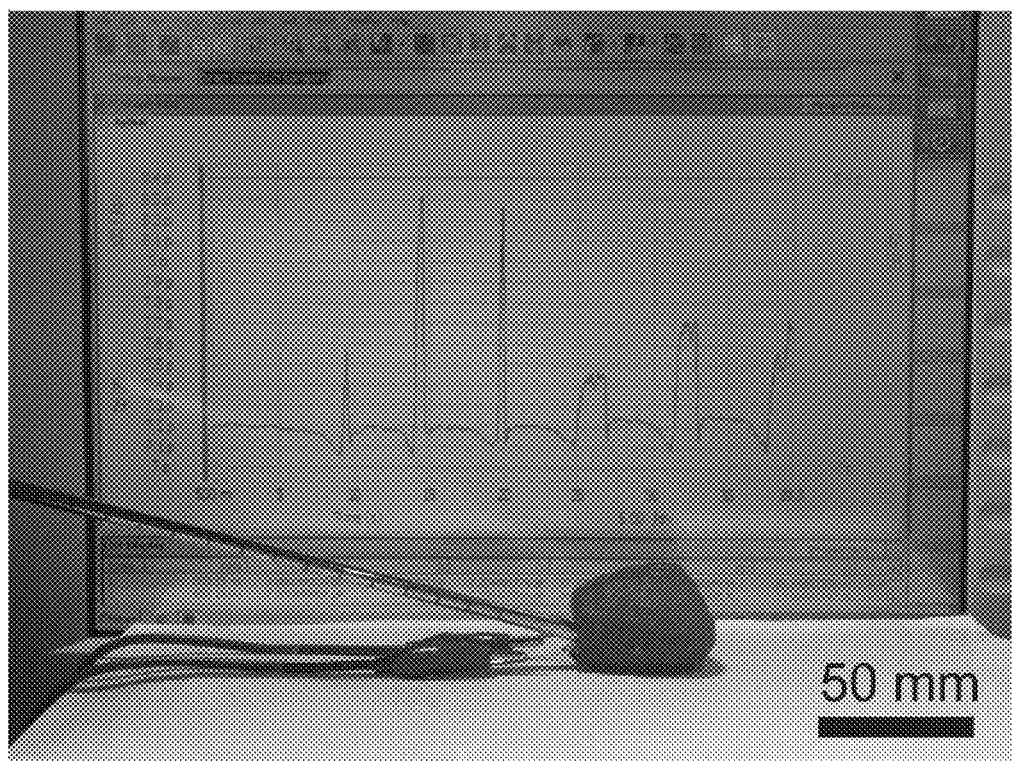
FIGS. 15D-15F are photographs of example real-time surgical rehearsal procedures on the 3D printed organ model of FIG. 3C or FIG. 8D including inserting an endoscope into the organ model (FIG. 15D), applying a surgical grasper to an interior of the organ model, such as to the urethra of the organ model (FIG. 15E), and applying surgical scissors to an interior of the organ model, such as to the urethra of the organ model (FIG. 15F), and the corresponding change in capacitance of an example 3D printed sensor that is integrated with a urethra surface inside the 3D printed organ model, in accordance with various embodiments of the present disclosure.
Figure 15E:
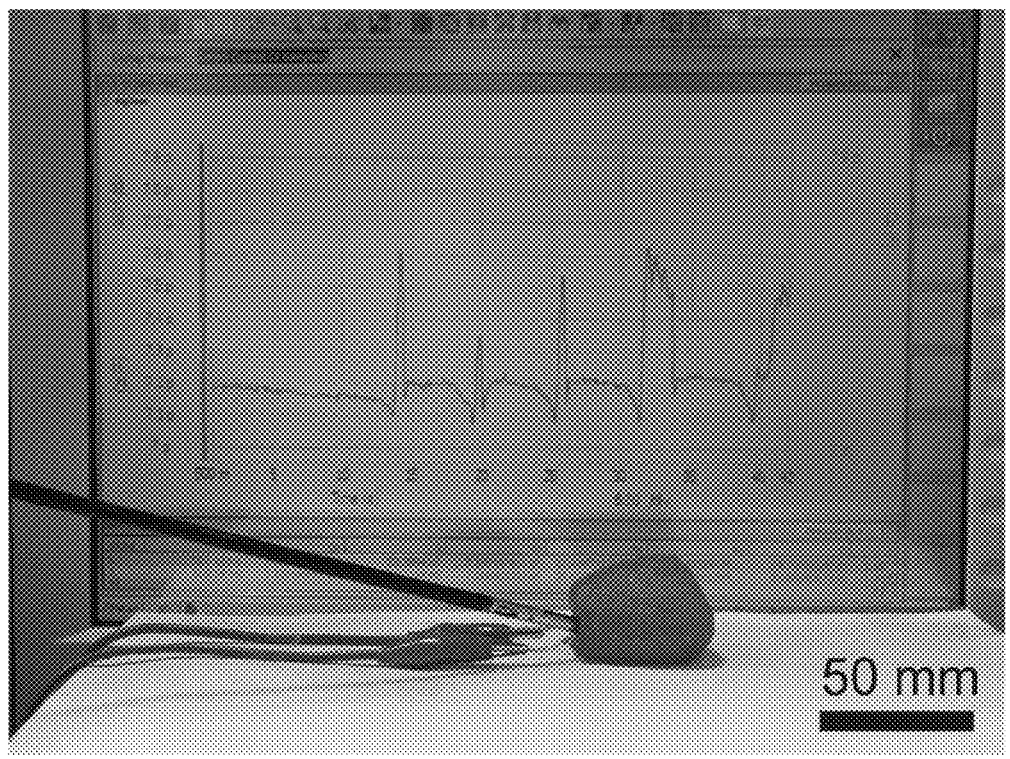
Figure 15F:
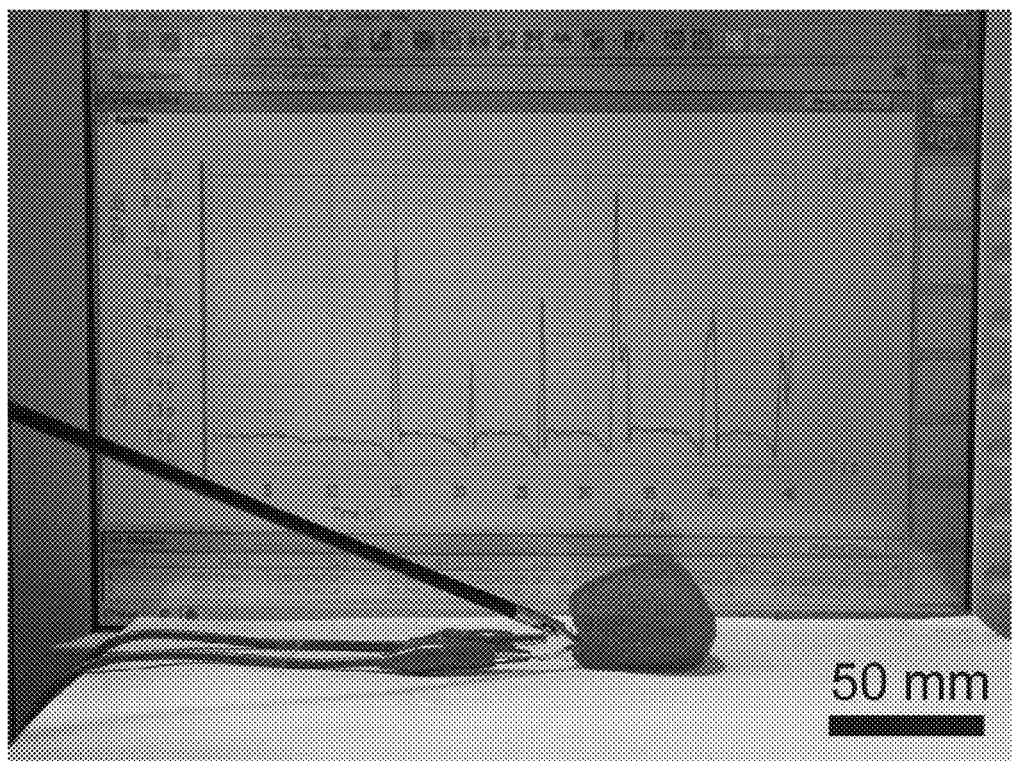

Several example surgical rehearsal applications were performed using a 3D printed organ model, such as the example prostate model described with respect to the figures, with one or more of the example 3D printed sensor integrated into the structure of the organ model or onto a surface of the organ model. These applications can be refined with a goal of training medical professionals to quantitatively realize and control the amount of applied pressure and its duration within reasonable ranges before operating on patient organs. For each application, three quick press-release and three press-hold-release cycles were applied to the sensor using either a finger or a tool, such as a surgical or diagnostic tool. For the first application examples, a first sensor was integrated onto an outer surface of the printed prostate model. Then, pressure was applied via finger pressing (FIG. 4G), a surgical grasper (FIG. 4H), and surgical scissors (FIG. 14A) to the sensor and deduced their corresponding pressure responses from the capacitance changes. For the second application examples, a second sensor was integrated on a urethra surface in the interior of the printed prostate model. Then, pressure was applied inside the urethra of the printed prostate model using an endoscope (FIG. 4I), a surgical grasper (FIG. 4J), and surgical scissors (FIG. 14B). Real-time applications and corresponding capacitance changes for the outer sensor in the first application examples are shown in FIGS. 15A-15C, and real-time applications and the corresponding capacitance changes for the inner sensor in the second application examples are shown in FIGS. 15D-15F.

EXPERIMENTAL EXAMPLE

Various embodiments of the present invention can be better understood by reference to the following EXPERIMENTAL EXAMPLE which is offered by way of illustration. The present invention is not limited to the EXPERIMENTAL EXAMPLE given herein. Further details regarding details of the EXPERIMENTAL EXAMPLE can also be found in Kaiyan Qiu et al., "3D Printed Organ Models with Physical Properties of Tissue and Integrated Sensors," to be published as manuscript number admt.201700235 in Advanced Materials Technologies, the disclosure of which is incorporated by reference herein in its entirety (including incorporation by reference herein of the entirety of the disclosures of each document cited in the "References" sections of the main article text and the Supporting Information).

Experimental Setup

1. Fabrication of Customized Polymeric Inks with Physical Properties of Tissue

Customized Silicone-Based Printable Ink

The ink formulation consists of a silicone-based active agent comprising a silicone sealant material (LOCTITE SI 595 CL with acetoxy-based room temperature vulcanization formulation sold by the Henkel Corp., Rocky Hill, Conn., USA) and a silicone-based bulking agent comprising a silicone grease (LP20 Silicone Grease sold by the Trident Diving Equipment, Chatsworth, Calif., USA), a coloring agent (Procyinyl Red GS sold by ICI Americas Inc., Bridgewater, N.J. USA), and a fumed silica thickening agent (S5130 7 nm fumed silica powder sold by Sigma-Aldrich Corp., St. Louis, Mo., USA). The active agent and bulking agent were mixed at specified weight ratios via a mixer (ARE-310 Mixer sold by Thinky Corp., Chiyoda, Tokyo, Japan) at 2,000 rpm for 10 mins to form the customized polymeric inks with different mechanical properties. Three separate Samples of the printable ink were made. The weight ratio of active agent to bulking agent for Ink Samples 1, 2, 3 are about 0.95:3.05, 0.90:3.10, and 0.82:3.18, respectively, to achieve different values of Young's modulus, and the ratio values were slightly varied for fine-tuning mechanical properties in different batches. The customized Ink Samples (10 g) were then mixed with a 1% (w/v) solution comprising the coloring agent and dichloromethane (DCM) solvent at a 20:1 (w/v) ratio via the mixer at 2,000 rpm for 10 mins. The DCM solvent was removed from the customized polymeric inks via vacuum evaporation before printing. A trivial amount of the thickening agent was added in a few of the formulations if the viscosity of the precursor needed to be elevated to achieve proper printability.

Alternative Customized PU-Based Inks

Polyurethane ("PU") with a number average molecular weight of 4 kDa with ester linkage on the polymer backbone and pendant double bond side groups was used as an alternative active agent composition for crosslinking, with the same bulking agent (LP20 Silicone Grease), coloring agent (Procyinyl Red GS), and thickening agent (7 nm fumed silica powder) as in the silicone-based Ink Samples 1, 2, and 3. The weight ratio of the PU active agent to the silicone-grease bulking agent was 2:5. In addition, poly (propylene glycol) diacrylate with a $M_n$ of 800 (sold by Sigma-Aldrich Corp.) was added as a crosslinking promotor (8% of PU weight) and 2-hydroxy-4'-(20hydroxyethoxy)-2-methylpropiophenone (sold by Sigma-Aldrich Corp.) was added as a photoinitiator (1% of PU weight) to facilitate the UV-initiated crosslinking. The fabrication procedure was otherwise the same as the silicone-based Ink Samples 1-3. By varying the crosslinking degrees of the inks, the stress-strain curves of the ink can be adjusted to fit the tissue samples. However, the inventors found that the PU-based inks possess a few disadvantages, including heterogeneous mechanical properties, color fading, creep, and the need for light-based (UV) initiation of the crosslinking, which, among other things, can involve inconvenient operation due to the inhomogeneous UV irradiation, and believe that the silicone-based inks are preferable for most applications.

2. 3D Printing of Organ Models

The MRI image pack (1 mm resolution) of a patient organ (prostate) was edited via VITREA software (Vital Images, Inc., Minneapolis, Minn., USA) to form a patient organ (prostate) STL model. The STL model was then sliced via Slic3r open source G-code generation software to generate G-code for printing using a custom-built 3D printing system (built on an AGS 100 gantry sold by Aerotech, Inc., Pittsburgh, Pa., USA) with two independent z-axis heads. The customized Ink Samples 1-3 and support material ink (LOC-TITE SI 595 CL) were deposited from two dispensing apparatuses controlled by two high precision dispensers (ULTIMUS V dispensers sold by Nordson Corp., EFD Division, East Providence, R.I., USA) through nozzles with 610 μm inner diameters (20 Gauge GP.023X.25 sold by Nordson Corp, EFD Division) and 500 μm layer heights. The supporting ink was removed after the model was fully cured at ambient temperature in air. In some examples, such as for more complex organ models, the supporting material can be replaced with a 33 wt. % solution of PLURONIC F-127 (sold by Sigma-Aldrich Corp.) in water. The Pluronic F-127 supporting material can be easily removed via flushing with water at 4° C. The resolution of the model can be adjusted by changing the nozzle sizes.

3. Characterization Tests for Prostate Tissue and Final Printed Polymer

The human prostate was collected immediately following radical prostatectomy. The tissue was cut into approximately 8 mm×5 mm (diameter (D)×height (H)) cylindrical samples with substantially flat top and bottom surfaces via a surgical punch biopsy instrument with a circular hollow blade (8 mm diameter) for static/dynamic compression and hardness tests. The customized printable inks were 3D printed into cylindrical structures with similar dimensions as the tissue samples for comparison. Both static and dynamic compression tests were carried out using a mechanical analyzer (RSA-G2 Solids Analyzer, TA Instruments, Inc., New Castle, Del., USA) while the tissue samples were placed on the paten. The static compression tests were conducted for up to 0.20 strain at a rate of 0.1 s$^{-1}$ (0.5 mm/s). The dynamic compression tests were conducted at frequencies of 0.1-20 Hz and at strains of 0.05, 0.10, and 0.20. The hardness tests were conducted on a nanoindentation system (MTS Nano Indenter XP sold by Agilent Technologies, Inc., Santa Clara, Calif., USA) at a strain rate of 0.5 s$^{-1}$ for both loading and unloading with a depth limit of 20 μm. For optical reflection tests, the outer gross tissue of prostate and colored 3D printed samples were directly evaluated using fiber optic equipment (sold by Ocean Optics, Inc., Largo, Fla., USA) within a visible light wavelength range of about 390 nanometers to about 700 nanometers.

4. Rheological Characterization

The rheology characterization of the customized polymeric ink and its corresponding active agent and bulking agent components were performed on a magnetic bearing rheometer (AR-G2, sold by TA Instruments, Inc.) with a steel plate (25 mm diameter) in Smart Swap geometry at 25° C. Flow experiments were conducted via a logarithmic sweep of shear rate at 0.1-1000 s$^{-1}$ with a 500 μm gap between the Smart Swap geometry and the lower geometry.

5. MRI of 3D Printed Prostate Model

Imaging was carried out using an MRI system (9.4 Tesla), while the 3D printed prostate model was placed in a 31 cm bore (sold by Magnex Scientific, Inc., Oxford, United Kingdom). The field of view (FOV) was set to 5 mm×5 mm×5 mm. The number of scans and views were set to 200 and 128,000, respectively.

6. 3D Registration for Anatomical Fidelity

A 3D model of the printed prostate was obtained from the MRI image stack using the Mimics software package (Materialise Nev., Leuven, Belgium). 3D registration of the STL files between the 3D printed prostate model and the patient prostate model was achieved using CloudCompare open source software. CloudCompare was also used to obtain a distance map and a histogram of the distances of the corresponding points on the surface for the overlaid 3D models, using a comparison of 3×10$^5$ data points on the surface in 40 iterations. The arbitrary distance scale generated by CloudCompare was calibrated to mm scale and the root-mean-square (RMS) value for the histogram was obtained (0.45 mm). By comparing the RMS value of the calibrated distances with the highest dimension of the patient prostate model (22.33 mm), the error in the printing process was obtained (0.02). The quantitative fidelity (98%) was obtained by deducting the error value in printing from 100%.

7. FEM Simulation

The FEM software employed was ANSYS Workbench 17.1 (sold by ANSYS, Inc., Canonsburg, Pa., USA) and the used component was "Static Structural." The first step of the simulation was to create a material model that was assigned to the prostate geometry in the subsequent step. The density of the ink was set to be 1.05 mg/ml for human prostate tissue. The uniaxial compression strain-stress relationship of the prostate tissue was added to the engineering data in a table format. A third order Ogden hyperelastic model was employed to fit the data and generate the strain-stress curve (FIG. 8B). The strain energy density function for the third order Ogden hyperelastic model is provided by Equation [1]:

$$\psi = \frac{\mu_1}{\alpha_1}(\lambda_1^{\alpha_1} + \lambda_2^{\alpha_1} + \lambda_3^{\alpha_1} - 3) + \frac{\mu_2}{\alpha_2}(\lambda_1^{\alpha_2} + \lambda_2^{\alpha_2} + \lambda_3^{\alpha_2} - 3) + \frac{\mu_3}{\alpha_3}(\lambda_1^{\alpha_3} + \lambda_2^{\alpha_3} + \lambda_3^{\alpha_3} - 3) + \frac{1}{d_1}(J-1)^2 + \frac{1}{d_2}(J-1)^4 + \frac{1}{d_3}(J-1)^6 \qquad [1]$$

where $\lambda_p$ (p=1, 2, 3) are the deviatoric principal stretches of the Left Cauchy-Green tensor (in the case of uniaxial test $\lambda_2=\lambda_3=0$), J is the determinant of the elastic deformation gradient, and $\mu_p$, $a_p$, and $d_p$ are material constants which can be retrieved from the input data. The initial shear modulus is provided by Equation [2]:

$$\mu = \frac{1}{2}(\alpha_1\mu_1 + \alpha_2\mu_2 + \alpha_3\mu_3) \qquad [2]$$

and the initial bulk modulus is provided by Equation [3].

$$K = \frac{2}{d_1} \qquad [3]$$

The strain-stress relation derived from this model is shown in Equation [4]:

$$\sigma = \sum_{p=1}^{3} \mu_p \left[(1+\varepsilon)^{\alpha_p - 1} - (1+\varepsilon)^{-\frac{1}{2}\alpha_p - 1}\right] \qquad [4]$$

where σ is stress and ε is strain. In the case of compressive deformation, 1+ε=λ.

The geometric model of the prostate was obtained from the MRI scan of a human prostate and was exported as an STL file which was then imported into the MeshLab open source software to reduce the number of surfaces to 5,000. In order to generate an identical initial orientation between the geometric model and the printed model in the following compression test, a 2 mm section was cut and removed from the bottom of the geometric model to form a flat plane and make it stably sit on the bottom plate. The geometry had a size of 45.14 mm×41.70 mm×30.95 mm (length (L)×width (W)×height (H)). The simplified geometry was resaved as a SolidWorks part file for SolidWorks CAD Software (Dassault Systèmes SolidWorks Corp., Waltham, Mass., USA), which can then be imported into ANSYS Workbench 17.1. After importing the SolidWorks part file into the "Geometry Modeler" section of the Workbench 17.1 software, two plates with the same size of 60 mm×60 mm×2 mm (length (L)×width (W)×height (H)) were created contacting the top and bottom boundaries of the prostate model. In the "Model" section of the Workbench 17.1 software, structural steel was assigned to these two plates, and tested tissue data fitted by the Ogden third order model was assigned to the prostate. The contacting interfaces between the prostate and the testing plates were defined as frictional, with a friction coefficient of 10 to avoid sliding of the model on the plates. 137,905 nodes were generated after meshing the three geometries with the interfacial surface meshing size being 0.7 mm. In the mesh section, the element size of the prostate model was set to be 3 mm, and the surface size of the contacting areas with the top and bottom plates was set to be 1 mm. The top and bottom plates were meshed by sweeping in the Z-axis with one division separately, and the edges were divided into 20 segments each with a bias factor of 5. The element types were determined via ANSYS Workbench. A displacement of about 4.64 mm from the original position in the Z direction was assigned to the top plate, and the bottom plate was set as fixed to compress the prostate model for about 15.0% of its height. A total compression time of 9.28 seconds was set to make the simulation speed the same as the actual testing speed. After the solution was complete, total deformation (3D displacement) of the feature dots was extracted. Reaction force (up to 1.74 N at 15%) for the entire compression in the Z direction from the top plate was also recorded.

8. 3D Displacement Measurement Using Stereo System During Model Compression Test In order to track 3D trajectories of the feature points on the 3D printed prostate model during the compressing process, a 3D displacement measurement procedure based on a dual camera stereo system was designed and applied. The inventors believe that the advantages of using a computer stereo vision approach to capture the 3D spatial information include: tracking 2D patterns on a smooth surface without identifiable 3D features, monitoring 3D deformation with high-frequency data sampling, customizing the system with good flexibility and off-the-shelf equipment, and good portability.

Notations

Vectors are expressed with bold and skew letters in lower case, while matrices are expressed with bold letters in upper case. The frames mentioned here are in 3D spaces by default, each with an origin and three orthogonal coordinates (x, y, and z). As with the subscript and superscript notations, given two frames {A}, {B} in 3D space, $^A p_B \in \mathbb{R}^{3 \times 1}$ and $^A_B C \in SO(3)$ denote the translation and rotation from frame B to frame A, respectively. For any point $^A q$ expressed in frame A, its expression can be found in frame B by Equation [5]

$$^B q = {}^B p_A + {}^B_A C\, {}^A q \quad [5]$$

Hardware Setup

The surface of the 3D printed prostate model (printed based on the modified geometric model in FEM simulation for comparison) was marked with four black points as feature dots, whose trajectories during the compression test were monitored by the stereo vision system. Before setting up the hardware for 3D displacement measurement, the marked model (printed with Ink Sample 2, 100% fill density) was set up on the RSA-G2 mechanical analyzer between two aluminum plates (60 mm×60 mm×2 mm (length (L)×width (W)×height (H))), according to the requirement of the compression test procedure. To minimize sticking of the model to the plates during the test due to inherent tackiness of the material, baby powder (sold by Johnson & Johnson, New Brunswick, N.Y., USA) was applied to the contact surface of the marked model.

Two DSLR cameras (D750 with Nikon AF Micro NIKKOR 200 mm f/4D lenses, both sold by Nikon Corp., Shinagawa, Tokyo, Japan) were mounted on a single tripod. The camera-tripod system was placed in front of the RSA-G2 mechanical analyzer with a distance of about 1 meter (see FIGS. 9A and 9B). The relative position and orientation of the first and second cameras (e.g., the left-most and the right-most camera, respectively) were carefully adjusted to get a good field of view that covers all the dots on the model, and then fixed on the slide rail attached to the tripod. The foci of the lenses were adjusted and fixed to be on the model so that the dots on it were sharply projected onto the image planes of the first and second cameras. The two cameras shot in continuous mode at a rate of 5 frames per second (FPS). All the other camera parameters such as the shutter speed, aperture, ISO, exposure compensation and image quality were set to be identical to minimize timing differences during the continuous shooting mode due to different software and hardware settings. A remote controller (ML-L3 controller sold by Nikon Corp.) was used to wirelessly control the first and second cameras so that the continuous shooting of the two cameras were triggered simultaneously with the pressing of the shutter button on the controller. The remote shutter control also resulted in minimum image blur by insulating the vibration when the shutter was triggered by hand. According to a shooting test with 100 frames in 20 s, the maximum difference in the shooting time of the two cameras was about 20 milliseconds.

Individual Camera Calibration

The main calibration procedure of the left or right camera individually is based on the Camera Calibration Toolbox in the MATLAB software (sold by Mathworks, Inc., Natick, Mass., USA). 20 images of a 12×12 checkerboard in different locations were taken with each camera, followed by post-processing of grid corner extraction and calibration optimization. The camera model used in the software package was similar to the model of Heikkilä and Silvén (described in J. Heikkila et al., presented at Proc. 13$^{th}$ Int. Conf. Pattern Recogn., Vienna, Austria, August, 1996; and in J. Heikkila et al., presented at IEEE Comp. Soc. Conf. Comp. Vision Pattern Recogn., San Juan, Puerto Rico, USA, June, 1997) with the intrinsic parameters consisting of focal length, principal point, skew coefficient and distortions. The radial and tangential distortion model, which is also known as the "Plumb Bob" model, was originated by Brown (described in C. B. Duane, Photogramm. Eng. 1971, vol. 37, p. 855; and in J. G. Fryer et al., Photogramm. Eng. Remote Sens. 1986, vol. 52, p. 51). Its reduced version was implemented in the software package. The camera extrinsic parameters were computed during the calibration optimization as well, including the translation vector and the rotation matrix from the checkerboard-fixed frame to the camera frame, which was used in the stereo system calibration step. The calibration optimization is a nonlinear minimization problem based on Maximum Likelihood Estimation.

Stereo Camera System Calibration

The stereo camera system was calibrated to recover the relative pose of the second camera (e.g., the right-most camera) relative to the first camera (e.g., the left-most) camera or vice versa, given the relative pose of the calibration checkerboard to each camera from the individual camera calibration step. $\{K_i\}$ denotes the frame fixed to the calibration checkerboard located in the ith position where two pictures were taken from the first and second cameras during the individual camera calibration step. {A} and {B} denote the frame of the first camera and the frame of the second camera, respectively. Given the intrinsic and extrinsic parameters from the individual camera calibration procedure, the relative poses of the checkerboard in the ith position with respect to the left and right cameras can be recovered as: ${}^A p_K^{(i)}, {}^A_K C^{(i)}, {}^B p_K^{(i)}, {}^B_K C^{(i)}$. The relative pose of the second camera (i.e., the right-most camera) with respect to the first camera (i.e., the left-most camera) can be computed from Equations [6] and [7]:

$$ {}^A p_B^{(i)} = {}^A p_K^{(i)} - {}^A_K C^{(i)} {}^B_K C^{(i)T} {}^B p_K^{(i)} \qquad [6] $$

$$ {}^A_B C^{(i)} = {}^A_K C^{(i)} {}^B_K C^{(i)T} \qquad [7] $$

After transforming the rotation matrix ${}^A_B C^{(i)}$ the rotation vector ${}^A_B r^{(i)} \in \mathbb{R}^{3 \times 1}$ with Rodrigues' rotation formula, the relative pose of the two cameras can be estimated by simply taking the element-wise median of the transformation and rotation vectors in different checkerboard locations, as in Equations [8] and [9].

$$ {}^A \tilde{p}_B = \underset{i}{\mathrm{median}} \, {}^A p_B^{(i)} \qquad [8] $$

$$ {}^A_B \tilde{r} = \underset{i}{\mathrm{median}} \, {}^A_B r^{(i)} \qquad [9] $$

The estimated rotation matrix ${}^A_B \tilde{C}$ can then be acquired using the reverse Rodrigues rotation formula.

Image Processing (Feature Extraction)

The simultaneous, continuous shooting of the two cameras began with the compressing of the 3D printed prostate model. On each of the images taken from the model, the feature dots were to be located pixel-wise in the 2D image frame. The 2D image coordinates of the feature dots were computed by finding the pixel with the closest RGB values to a preset reference value in the neighborhood of the initial guess. The Red, Green, and Blue value of the pixel located at indices (x, y) are $R_{(x,y)}, G_{(x,y)}, B_{(x,y)}$, respectively, which are integers ranging from 0 to 255. If $\mathcal{L}$ denote the neighborhood around the initial guess of the feature location, than an estimation of the feature point location (x*, y*) can be calculated according to Equation [10]:

$$ (x^*, y^*) = \underset{x,y \in \mathcal{L}}{\mathrm{argmin}} \{ (R_{(x,y)} - R_{ref})^2 + (G_{(x,y)} - G_{ref})^2 + (B_{(x,y)} - B_{ref})^2 \} \qquad [10] $$

To eliminate the noise in the image RGB values, the Gaussian blur filter was applied to the neighborhood of the initial guess before solving the minimization problem. The initial guess and the reference RGB values were manually initialized only for the first image frames from the left and right cameras, simply by picking the feature points by hand in the image and recording its RGB values. The same set of initial parameters were utilized by subsequent image frames and all the computations were performed automatically.

Post Processing (3D Trajectory Reconstruction)

In an example, Estimating the 3D position of each feature point expressed in the first and second camera frames at every time step, which can be viewed as solving a ray triangulation problem. For simplicity, only the estimation of the 3D trajectory in the first (i.e., the left-most) camera frame {A} was considered. Given the intrinsic parameters from the individual camera calibration procedure, the 2D pixel projection information was transformed to the 3D unit bearing measurements ${}^A a_j^{(k)}, {}^B b_j^{(k)}$, for feature point j on the 3D printed prostate model at the time step k, from the first and second cameras, respectively, as represented by Equation [11]:

$$ {}^A b_j^{(k)} = {}^A_B \tilde{C} {}^B b_j^{(k)} \qquad [11] $$

To express all bearing measurements from the second camera in the first camera frame, the relative pose estimation $\tilde{C}^B$ from the Image processing (feature extraction) step was used.

The computations for each time step and for each feature point were identical, and the notation of the bearing measurements in the first camera frame was simplified to Equation [12]:

$$ v_1 = {}^A a_j^{(k)}, v_2 = {}^A b_j^{(k)} \qquad [12] $$

Figure 9C:
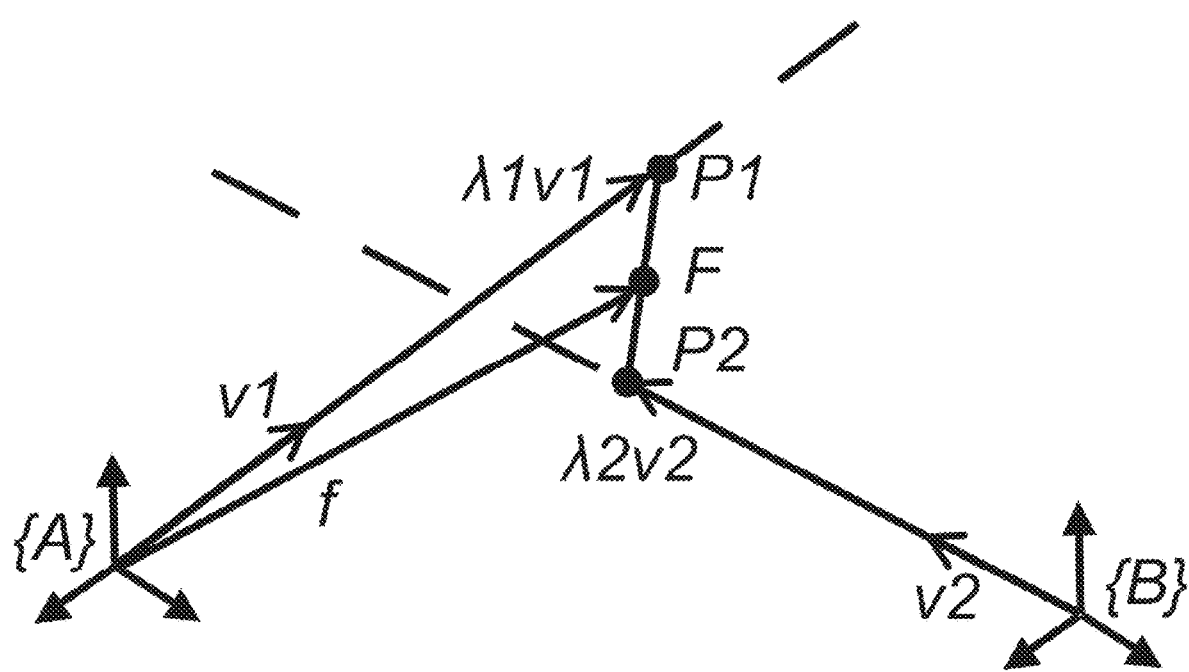
FIG. 9C is a schematic of an example of triangulation geometry that can be used to analyze deformation of the 3D printed organ model of FIG. 8D by the system of FIGS. 9A and 9B, in accordance with various embodiments of the present disclosure.
Figure 10A:
FIG. 10A is a photograph of an example system setup for scanning the 3D printed organ model with specified feature dots of FIG. 8D, in accordance with various embodiments of the present disclosure.
Figure 10B:
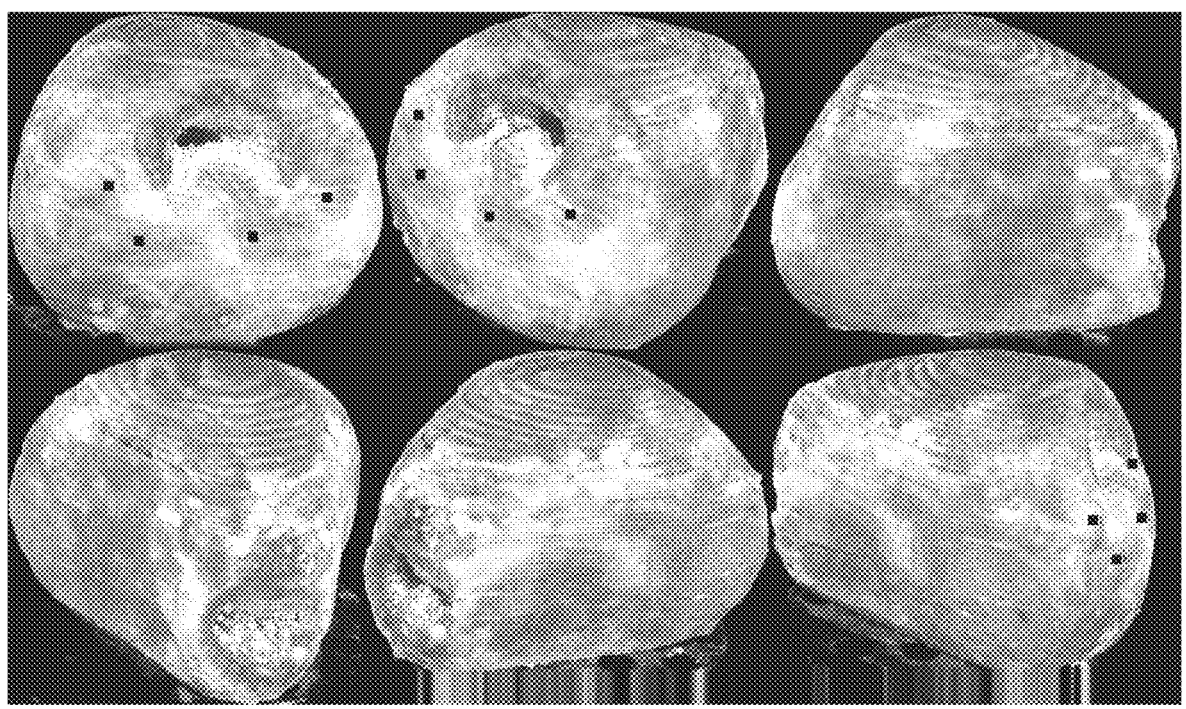
FIG. 10B includes various images of the 3D printed organ model with specified feature dots of FIG. 8D as scanned by the system of FIG. 10A, in accordance with various embodiments of the present disclosure.
Figure 10C:
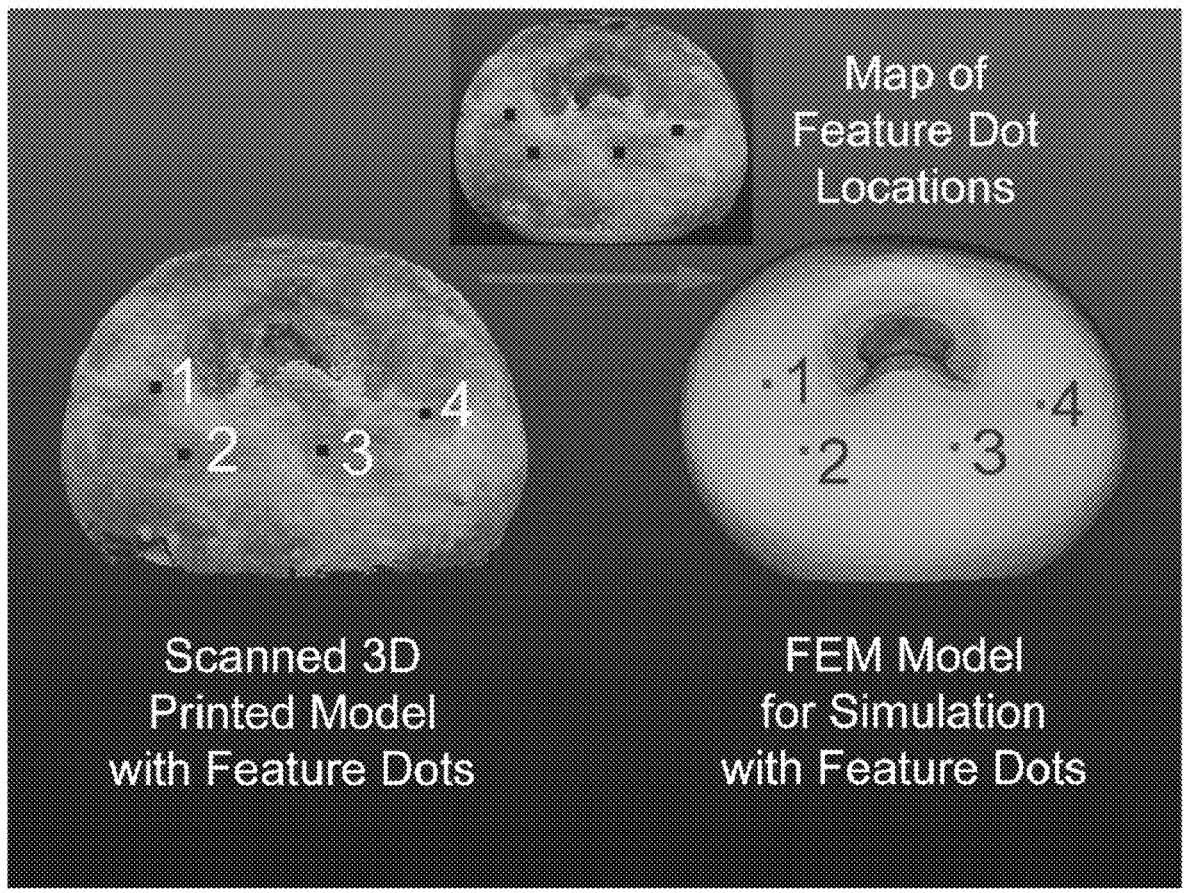
FIG. 10C is a conceptual diagram of a method of mapping the specified feature dots of the 3D printed organ model of FIG. 8D onto corresponding locations on the FEM simulation model of FIG. 8C, in accordance with various embodiments of the present disclosure.

Due to the error of the 2D feature extraction on the sampled images in the image processing step, the two projected light rays of the bearing measurements $v_1, v_2$ may not intersect at a point, which is the ideal estimation of the feature point location in 3D space. An alternative approach is to find the shortest line segment $P_1 P_2$ that connects the two projected light rays, and estimate the 3D location of the feature point to be the midpoint F of the line segment, as illustrated in FIG. 9C. Because $\overrightarrow{{}^A P_1 P_2}$ is perpendicular to the bearing vectors $\lambda_1 v_1$ and $\lambda_2 v_2$ with scaling factors $\lambda_1$ and $\lambda_2$, $\overrightarrow{{}^A P_1 P_2} = \lambda_1 v_1 - \lambda_2 v_2 - {}^A \tilde{p}_B$ is in the null space of the 2×2 matrix $[v_1 - v_2]^T$, as shown by Calculations [13]

$$ [v_1 - v_2]^T (\lambda_1 v_1 - \lambda_2 v_2 - {}^A \tilde{p}_B) = 0 \qquad [13] $$

$$ \Rightarrow [v_1 - v_2]^T (\lambda_1 v_1 - \lambda_2 v_2) = [v_1 - v_2]^T \, {}^A \tilde{p}_B $$

$$ \Rightarrow \begin{bmatrix} \|v_1\|_2^2 & -v_1^T v_2 \\ -v_2^T v_1 & \|v_2\|_2^2 \end{bmatrix} \begin{bmatrix} \lambda_1 \\ \lambda_2 \end{bmatrix} = \begin{bmatrix} v_1^T \, {}^A \tilde{p}_B \\ -v_2^T \, {}^A \tilde{p}_B \end{bmatrix} $$

$$ \Rightarrow \begin{bmatrix} \lambda_1 \\ \lambda_2 \end{bmatrix} = \begin{bmatrix} \|v_1\|_2^2 & -v_1^T v_2 \\ -v_2^T v_1 & \|v_2\|_2^2 \end{bmatrix}^{-1} \begin{bmatrix} v_1^T \, {}^A \tilde{p}_B \\ -v_2^T \, {}^A \tilde{p}_B \end{bmatrix} $$

The matrix inversion is valid as long as $v_1$ and $v_2$ are not parallel to each other. Given the scale factors $\lambda_1, \lambda_2$, the estimated 3D location of the feature point F in the left camera frame {A} can be computed by Equation [14]:

$$ {}^A \tilde{f} = \frac{1}{2} (\lambda_1 v_1 + \lambda_2 v_2 + {}^A \tilde{p}_B) \qquad [14] $$

Finally, the estimated 3D locations at every time step were connected to form the 3D trajectory of each feature point during the compression test of the 3D printed prostate model.

9. Mapping of the Feature Dots on the 3D Printed Prostate Model to the Corresponding Locations on the FEM Simulation Model A 3D printed prostate model with feature dots was coated with a thin layer of baby powder (Johnson & Johnson) to increase the scanning quality. A blue light scanner (HDI 109, sold by GoMeasure3D, Amherst, Va., USA) was used to obtain the 3D geometry and 2D texture mapping. Six scans were carried out every 60° of rotation to obtain a 360° overall scanning. The scanned images were fused together via David 3D laser scanner software (v3.10.4). The scanned digital model and the FEM simulation were then placed into the CloudCompare open source software for 3D registration with a universal coordinate system. The location coordinates (x, y, z) of the feature dots on the scanned digital model were used to map the corresponding location with the same coordinates on the FEM simulation (as summarized in FIGS. 10A-10C).

10. 3D Printing and Calibration of the Soft Tactile Sensor

Fabrication of Inks for the Soft Tactile Sensor

In an example, the composition of an ionic hydrogel used to print one or more compliant electrode structures of the tactile sensor includes 21.48 wt. % lithium chloride (sold by Sigma-Aldrich Corp.), 7.90 wt. % acrylamide monomer (sold by Sigma-Aldrich Corp.), 3.16 wt. % polyacrylamide ($M_w$ from about 5,000,000 to about 6,000,000, sold by Sigma-Aldrich Corp.), 29.64 wt. % ultrapure water (obtained from a MILLI-Q ultrapure water purification system, sold by Millipore Corp., Billerica, Mass., USA), 37.60 wt. % ethylene glycol (sold by Fisher Scientific International, Inc., Pittsburgh, Pa., USA), 0.13 wt. % N,N'-methylenebisacrylamide crosslinking agent (sold by Sigma-Aldrich Corp.), and 0.08 wt. % IRGACURE 1173 photoinitiator (sold by BASF SE. Ludwigshafen, Germany).

In an example, a silicone elastomer used to print the dielectric elastomer of the sensor was prepared by mixing LOCTITE 5039 NUVA-SIL (sold by Henkel AG & Co., Düsseldorf, Germany) and SEMICOSIL 912 (sold by Wacker Chemie AG, Munich, Germany) at a ratio of 3:2, with the addition of ELASTOSIL CAT UV catalyst (sold by Wacker Chemie AG) at a ratio of 1:10 with respect to the SEMICOSIL 912 base.

3D Printing of the Soft Tactile Sensor

A 1 cm×1 cm sensor device was printed by alternately depositing layers of the ionic hydrogel and the silicone elastomer, followed by photopolymerization of the printed layers via exposure to a UV system (OMNICURE S1500, sold by Excelitas Technologies Corp., Waltham, Mass., USA). To facilitate the testing of the devices, copper tape was used as electric contact leads and was inserted into the build area during the printing process. Specifically, a first copper lead was inserted after printing a silicone base layer and prior to deposition of a first (bottom-most) ionic hydrogel electrode layer. A second copper contact lead was inserted after printing the dielectric elastomer layer and the top ionic hydrogel electrode layer and prior to depositing a top silicone cover layer. In addition, to facilitate the uniform printing of the ionic hydrogel on the hydrophobic surface of the silicone base layer and the silicone elastomer, in some examples, one or both of the underlying silicone surface of the base layer and the underlying silicone surface of the dielectric elastomer layer were treated with 10 wt. % solution of benzophenone (sold by Sigma-Aldrich Corp.) in acetone.

Calibration of the Soft Tactile Sensor

The 3D printed sensor was calibrated by applying different pressures to the device and measuring the changes in the capacitance. For this purpose, a metal bar was mounted on a vertical axis of a nanopositioning stage (ANT130-L-ZS nanopositioning stage, sold by Aerotech Inc.) to apply cycles of press-release to the device by varying the vertical position of the bar to obtain different values for the applied forces (FIGS. 13A and 13B). The applied forces were recorded using a digital scale with a flat surface (Elec3) which was placed underneath the sensor. The applied pressure values were then calculated by dividing the recorded forces by the sensor area before deformation. In addition, the sensor was connected to a characterization system (B1500A, sold by Agilent Technologies, Inc.) to observe the changes in device capacitance at each of the press-release cycles. A calibration plot can be obtained for the sensor based on the capacitance changes at each applied pressure. After integration of the sensor onto the 3D printed prostate model, this calibration plot was used to translate the amount of pressure applied to the model using the surgical tools based on the changes in capacitance of the device.

11. Advanced Surgical Rehearsal Using the 3D Printed Prostate Model

Endoscopy System for Endoscopic View

Figure 12:
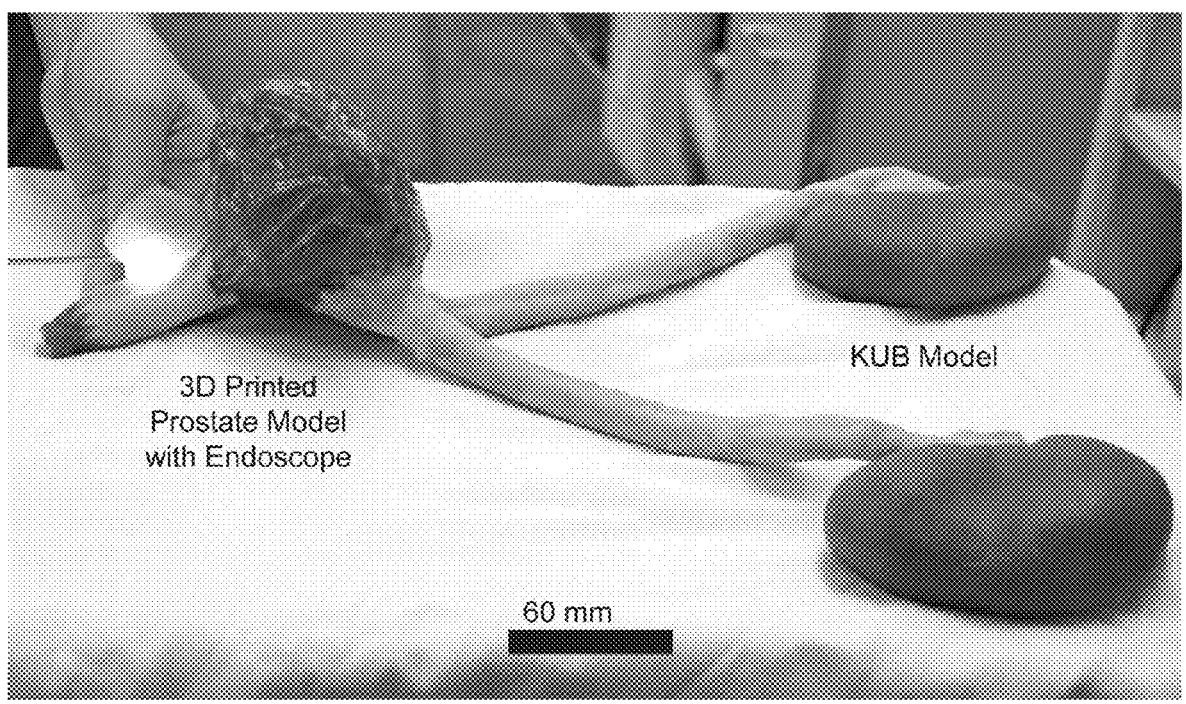
FIG. 12 is a photograph of an example surgical procedure including inserting an endoscope into a 3D printed prostate model of FIG. 3C coupled to a kidney, ureter, and bladder model structure (labeled as "KUB model"), in accordance with various embodiments of the present disclosure.

An example endoscopy system is shown in FIG. 11 and includes an endoscope (Gyrus ACMI, sold by Olympus America, Inc., Center Valley, Pa., USA), an LED light source (L9000, sold by Stryker Corp., Kalamazoo, Mich., USA), an endoscopic camera (1288 HD 3-Chip, sold by Stryker Corp.), an HD information management system (SDC Ultra, sold by Stryker Corp.), a high flow insufflator (40 L, sold by Stryker Corp.) and an HDTV surgical display (WiSe™ display, sold by Stryker Corp.). The endoscope was inserted into the urethra of the model and the endoscopic view was observed from the surgical display for the application. The preoperative rehearsal was further carried out under KUB background while placing the 3D printed prostate model between kidney and bladder models for the endoscope application (FIG. 12).

Surgical Suturing

Suturing was conducted on the surface of the 3D printed prostate model with the aid of a surgeon (shown in FIG. 4C) and by utilizing a surgical needle for penetration and surgical thread (3-0 PERMA-HAND SILK sutures, sold by Ethicon, Inc., Sommerville, N.J., USA) for suturing.

Rehearsal with 3D Printed Soft Tactile Sensor for Pressure Detection

A finger and different diagnostic/surgical tools were applied on the sensor integrated on the surfaces of the 3D printed prostate model (outer surface and urethra inner surface) (FIGS. 4G, 4H, 4I, 4J, 14A, 14B, and 15A-15F). For each application, three quick press-release and three press-hold-release cycles were applied. The signal responses of capacitance changes of the sensor (shown on the computer screen in FIGS. 15A-15F) were then converted into the values of applied pressures via the sensor pre-calibration of capacitance change vs pressure.

The above detailed description includes references to the accompanying drawings, which form a part of the detailed description. The drawings and detailed description disclose, by way of illustration, specific examples of a series of novel methodologies and customized printable inks for fabricating a 3D printed organ model with physical properties of native tissue. In some examples, the organ model can include integrated sensing capabilities that can be used for quantitative, advanced surgical rehearsal. The 3D printed organ model demonstrates high fidelity with the patient's organ in anatomical, static and dynamic mechanical, hardness, and optical properties. Therefore, the printed organ models described herein can aid medical professionals to perform more effective preoperative planning and rehearsal, and predict organ physical behavior more accurately. The tissue-like tactile sensation can help to hone surgical skills for training purposes. In addition, the ability to print organ channels via the use of printable sacrificial support structures provides the possibility of practicing with tools within flexible organ channels. Conformal integration of a printed soft tactile sensor onto a surface or into a structure of a 3D printed organ model allows the model to provide quantitative feedback. In addition, those of skill in the art will appreciate that various modifications to the specific examples described above can be performed and still fall within the scope of the present disclosure, including, but not limited to, fabrication of organ models with heterogeneous mechanical properties, durometers, and dynamic functionalities; direct integration of 3D printed electronics for multi-dimensional feedback; incorporation of virtual and assisted reality tools; and manipulation of anisotropic properties of different organ models, since previous work has shown that by controlling the orientation of printing pathways and imbedding fillers, anisotropic properties can be introduced into 3D printed materials such as those of the printed organ models.

The above detailed description referred to various specific embodiments as "examples." However, the scope of the present invention is not limited to the specific embodiments or examples described in the detailed description or shown in the figures, but rather can include elements in addition to those shown or described. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. The present inventors also contemplate examples in which only those elements shown or described are provided.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An organ model comprising:
a polymer body formed from one or more selectively deposited substructures of a printable polymer-based ink composition, wherein the one or more selectively deposited substructures form a printed geometrical structure that corresponds to at least a portion of an anatomical structure of an organ, wherein a formulation of the printable polymer-based ink is selected such that the printed geometrical body has one or more material properties that match or substantially match one or more corresponding tissue material properties of an organ tissue; and
an electronic sensor integrated onto a surface or into a structure of the printed geometrical structure, wherein the sensor is configured to measure one or more of: a pressure applied to the polymer body, a stress on the polymer body, a force applied to the pol -mer body, a temperature of the polymer body, or a strain induced in the polymer body.

2. An organ model according to claim 1, wherein the printable polymer-based ink composition comprises at least one of silicone, a silicone-based polymer composition, polyurethane, a polyurethane-based polymer composition, polyvinyl chloride, a polyvinyl chloride polymer composition, polyvinyl alcohol, a polyvinyl alcohol polymer composition, nylon, a nylon-based composition, polytetrafluorethylene, a polytetraftuoroethylene-based polymer compositions, or a. hydrogel composition.

3. An organ model according to claim 1, further comprising an actuation device to move at least a portion of the polymer body or an energy harvesting device.

4. An organ model according to claim 1, wherein the electronic device comprises one or more of a capacitive device, a resistive device, a piezoresistive device, a piezoelectric device, a magnetic device, an inductive device, or an optical device.

5. An organ model according to claim 1, wherein the printable polymer-based ink composition comprises a silicone-based active polymeric material and a silicone-based hulking polymeric material.

6. An organ model comprising:
a polymer body formed from one or more selective' deposited substructures of a printable polymer-based ink composition comprising a silicone-based active polymeric material and a silicone-based bulking polymeric material,
wherein the one or more selectively deposited substructures form a printed geometrical structure that corresponds to at least a portion of an anatomical stricture of an organ wherein a. formulation of the printable polymer-based ink is selected such that the printed geometrical body has one or more material properties that match or substantially match one or more corresponding tissue: material properties of an organ tissue; and
an electronic device integrated onto a surface or into a structure of the printed geometrical structure.

7. An organ model according to claim 6, wherein:
molecules of the silicone-based active polymeric material crosslink with other molecules of the silicone-based active polymeric material to provide for formation of a solid or substantially solid silicone-based polymer body.

8. An organ model according to claim 6, wherein a weight ratio of the silicone-based active polymeric material relative to the silicone-based bulking polymeric material in the printable polymer-based ink composition is selected to provide for the one or more material properties match or substantially matching the one or more corresponding tissue material properties.

9. An organ model according to claim 6, wherein a weight ratio of the silicone-based active polymeric material relative to the silicone-based bulking polymeric material in the printable polymer-based ink composition is up to about 4.

10. An organ model according to claim 6, wherein the electronic device comprises a sensor configured to measure one or more of pressure, stress, force, contact, deformation of the polymer body, temperature of the polymer body, or strain induced in the polymer body.

11. An organ model according to claim 6, wherein the electronic device comprises at least one of a sensor, an actuation device to move at least a portion of the polymer body, or an energy harvesting device.

12. An organ model according to claim 6, wherein the silicone-based active polymeric material undergoes a chemical or physical transformation after being selectively deposited so that the printable polymer-based ink composition sets to form the polymer body.

13. An organ model according to claim 12, wherein the silicone-based bulking polymeric material increases an overall volume of the printable polymer-based ink or the polymer body compared to a comparable volume that a comparable ink or comparable printed polymer that did not include the silicone-based bulking polymeric material.

14. An organ model comprising:
a polymer body formed from one or more selectively deposited substructures of a printable polymer-based ink composition, wherein the one or more selectively deposited substructures form a printed geometrical structure that corresponds to at least a portion of an anatomical structure of an organ, wherein a formulation of the printable polymer-based ink is selected such that the printed geometrical body has one or more material properties that match or substantially match one or more corresponding tissue material properties of an organ tissue: and
an electronic device integrated onto a surface or into a structure of the printed geometrical structure,
wherein the electronic device comprises one or more selectively deposited ionic hydrogel conductive structures.

15. An organ model according to claim 14, wherein the selectively deposited ionic hydrogel conductive structures comprise a polyacrylamide-based ionic hydrogel material.

16. An organ model according to claim 14, wherein the electronic device further comprises a selectively deposited dielectric structure, wherein the one or more selectively deposited ionic hydrogel conductive structures are adjacent to the selectively deposited dielectric structure.

17. An organ model according to claim 16, wherein the electronic device comprises a set of two or more ionic hydrogel electrodes positioned on opposite sides of the selectively deposited dielectric structure.

18. An organ model according to claim 16, wherein the selectively deposited dielectric structure comprises a silicone-based material.

19. An organ model according to claim 14, wherein the electronic device comprises one or more compliant electrodes formed from the one or more selectively deposited ionic hydrogel conductive structures.

20. An organ model according to claim 14, wherein the electronic device comprises a sensor configured to measure one or more of pressure applied to the polymer body, stress on the polymer body, force applied to the polymer body, temperature of the polymer body, or strain induced in the polymer body.

* * * * *